Figure 1:
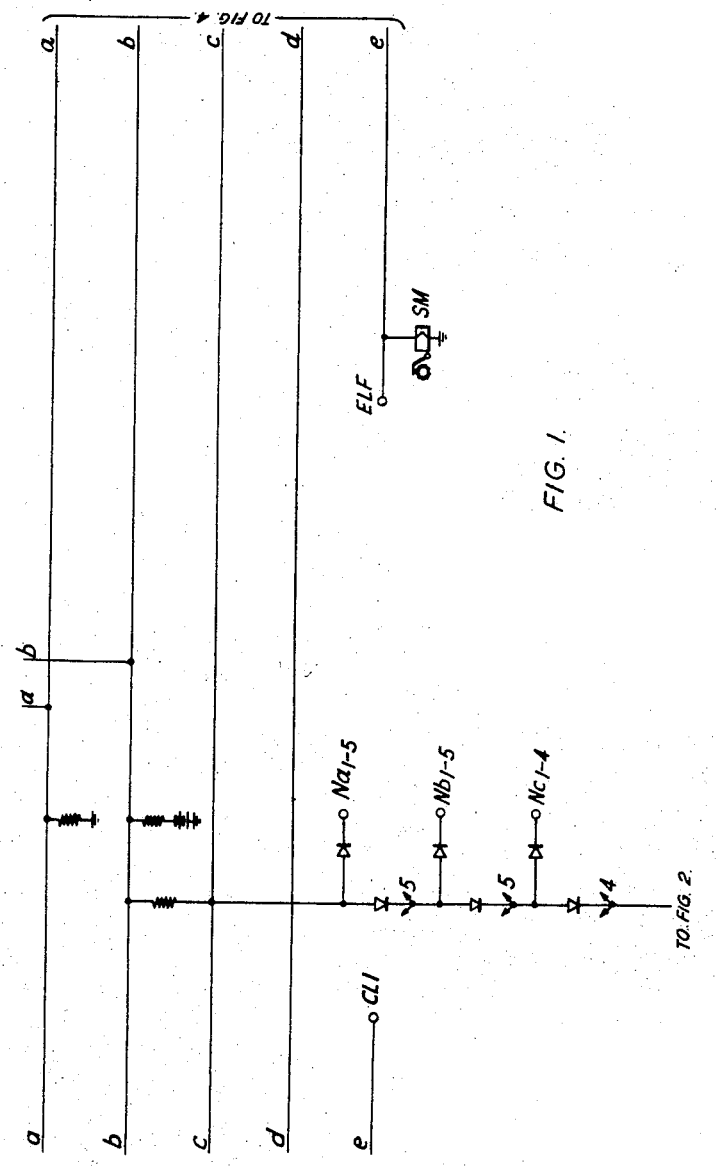

Nov. 10, 1959 M. DEN HERTOG ET AL 2,912,510
TELECOMMUNICATION EXCHANGE SYSTEMS
Filed June 26, 1953 73 Sheets-Sheet 1

*Inventor*
M. den Hertog - C. de Zeeuw
By Robert Hardey
*Attorney*

Inventor
M. den Hertog - C. de Zeeuw
Attorney

Inventor
M. den Hertog - C. de Zeeuw
By Robert Harding Jr.
Attorney

Inventor
M. den Hertog - C. de Zeeuw

Nov. 10, 1959 M. DEN HERTOG ET AL 2,912,510
TELECOMMUNICATION EXCHANGE SYSTEMS
Filed June 26, 1953 73 Sheets-Sheet 11

Inventor
M. den Hertog - C. de Zeeuw
By
Attorney

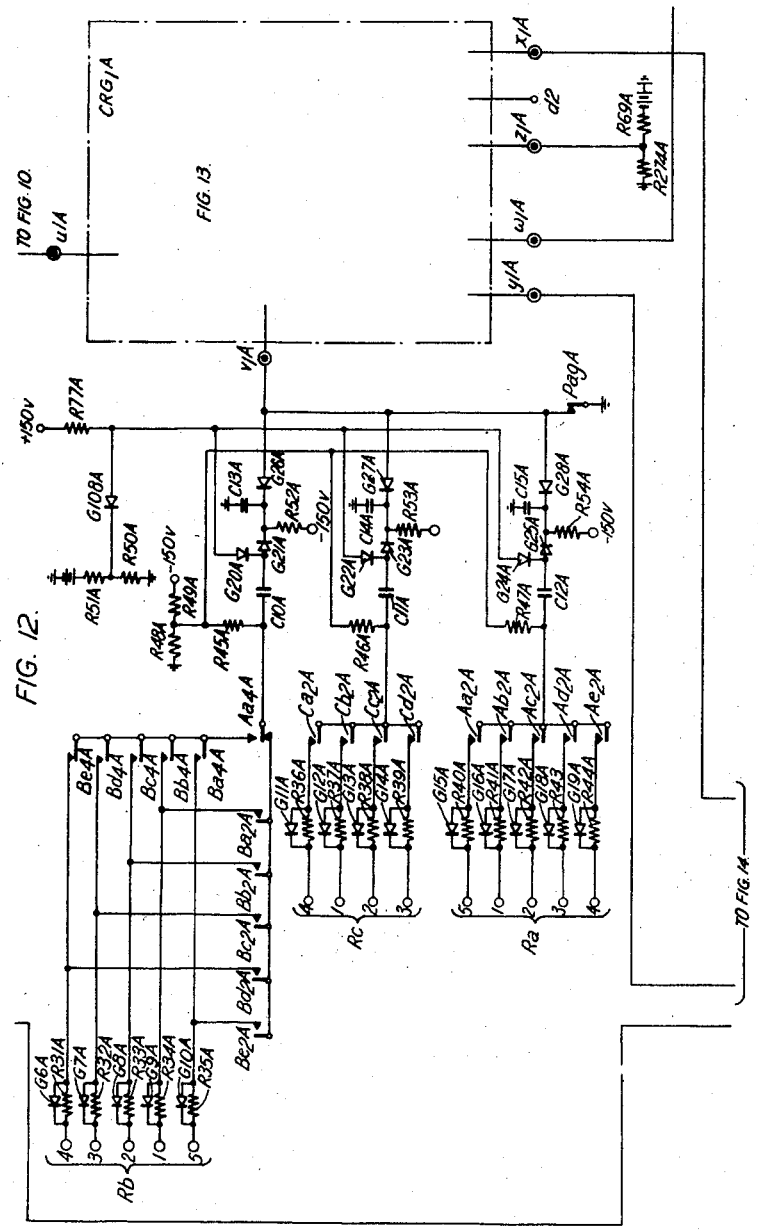

Inventor
M. den Hertog - C. de Zeeuw

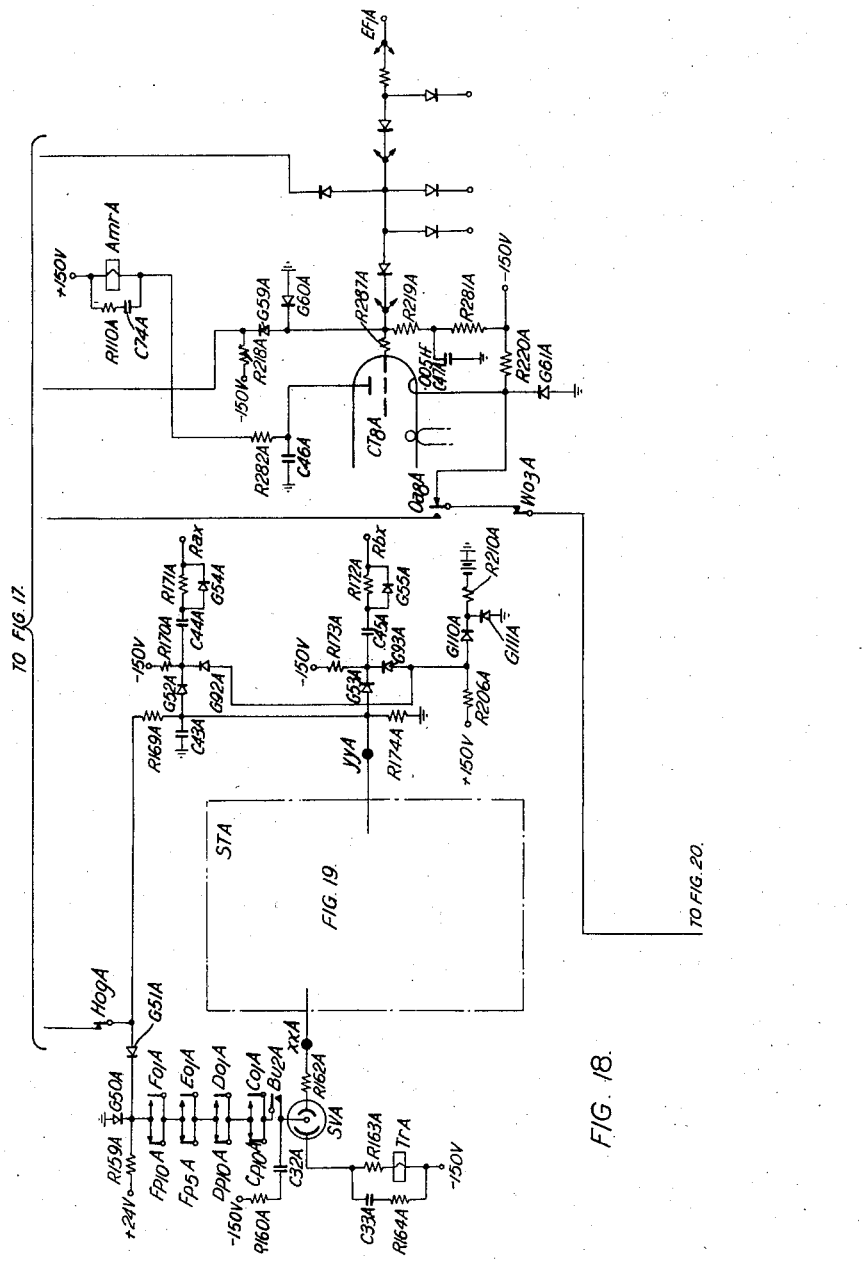

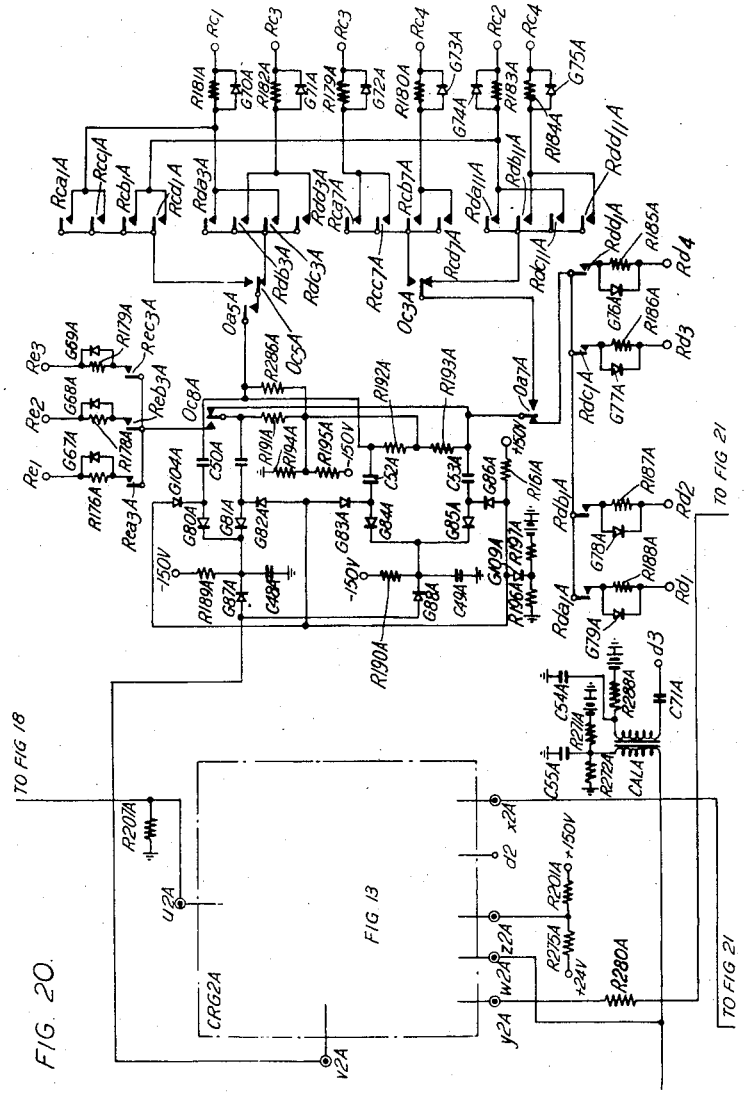

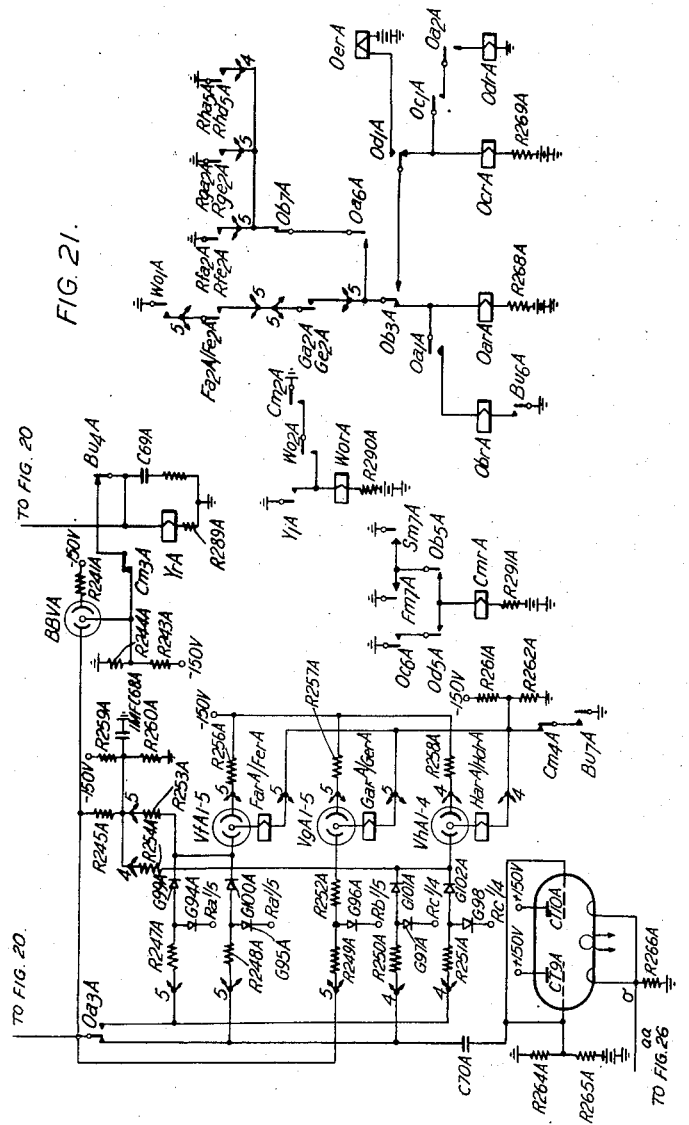

Nov. 10, 1959 M. DEN HERTOG ET AL 2,912,510
TELECOMMUNICATION EXCHANGE SYSTEMS
Filed June 26, 1953 73 Sheets-Sheet 21

Inventor
M. den Hertog - O. de Zeeuw

Nov. 10, 1959    M. DEN HERTOG ET AL    2,912,510
TELECOMMUNICATION EXCHANGE SYSTEMS
Filed June 26, 1953    73 Sheets-Sheet 27

*Inventor*
M. den Hertog - C. de Zeeuw
*Attorney*

Inventor
M. den Hertog - C. de Zeeuw

Nov. 10, 1959 M. DEN HERTOG ET AL 2,912,510
TELECOMMUNICATION EXCHANGE SYSTEMS
Filed June 26, 1953 73 Sheets-Sheet 35
FIG. 36.
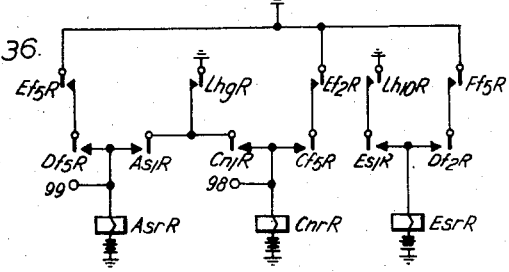
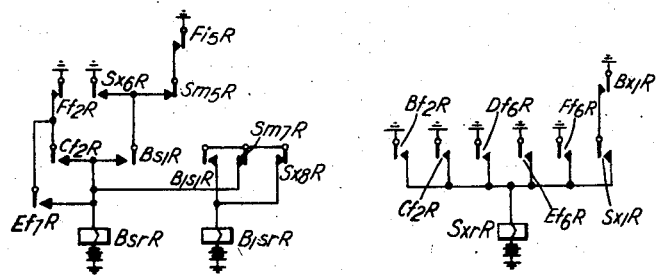
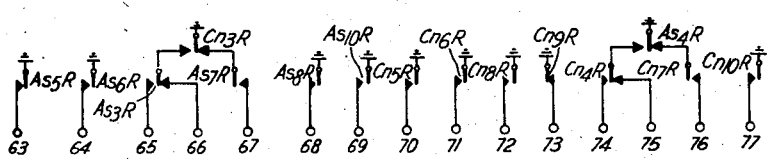
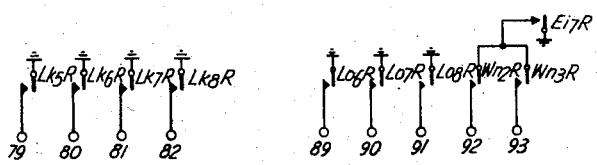
Inventor
M. den Hertog - C. de Zeeuw
By
Attorney

FIG. 38.

| FIGURE DIALLED | COUNTING | | | OPERATED RELAYS (+) | | | | | | | STORING | | | |
|---|---|---|---|---|---|---|---|---|---|---|---|---|---|---|
| | IarR | IbrR | IcrR | JarR | JarR | JbrR | JcrR | JdrR | JerR | JfrR | AarR orBarR orCarR orEarR | AbrR ·· EbrR | AcrR ·· EcrR | AdrR ·· EdrR |
| 1 | | + | | + | | | | | | | + | | | |
| 2 | | | +/− | + | + | | | | | | | + | | |
| 3 | | + | | + | + | + | | | | | + | + | | |
| 4 | | | +/− | + | + | + | + | | | | | | | |
| 5 | | + | | | | + | + | + | | | + | | + | |
| 6 | | | +/− | | | | + | + | + | | | | + | |
| 7 | | + | | | | | | + | + | + | + | | | + |
| 8 | | | +/− | + | + | + | | | + | + | | + | | + |
| 9 | | + | | + | + | + | | + | | + | + | + | | + |
| 0 | | | +/− | + | + | + | + | + | + | + | + | | + | + |

Inventor
M. den Hertog - C. de Zeeuw

By *[signature]*
Attorney

Nov. 10, 1959     M. DEN HERTOG ET AL     2,912,510
                TELECOMMUNICATION EXCHANGE SYSTEMS
Filed June 26, 1953                              73 Sheets-Sheet 41

Inventor
M. den Hertog - C. de Zeeuw

By
Robert Harding
Attorney

Nov. 10, 1959  M. DEN HERTOG ET AL  2,912,510
TELECOMMUNICATION EXCHANGE SYSTEMS
Filed June 26, 1953  73 Sheets-Sheet 47

Inventor
M. den Hertog - C. de Zeeuw
By
Attorney

Nov. 10, 1959 M. DEN HERTOG ET AL 2,912,510
TELECOMMUNICATION EXCHANGE SYSTEMS
Filed June 26, 1953 73 Sheets-Sheet 48

Inventor
M. dén Hertog - C. de Zeeuw

By
Attorney

Nov. 10, 1959  M. DEN HERTOG ET AL  2,912,510
TELECOMMUNICATION EXCHANGE SYSTEMS
Filed June 26, 1953  73 Sheets-Sheet 57

Inventors
M. den Hertog - C. de Zeeuw
By Robert Hardy
Attorney

FIG. 65.

| CALL DETECTOR N° | TERMINAL | | | | | | | |
|---|---|---|---|---|---|---|---|---|
| | A | B | C | D | E | F | G | H |
| | CONNECTED TO IMPULSE SOURCE | | | | | | | |
| | Nd | | Nc | | | | Ne | |
| 1 | 10 | 3 | 4 | 1 | 2 | | | |
| 2 | 10 | 4 | 1 | 2 | 3 | 2 | 3 | 1 |
| 3 | 10 | 1 | 2 | 3 | 4 | | | |
| 4 | 10 | 2 | 3 | 4 | 1 | | | |
| 5 | 10 | 3 | 4 | 1 | 2 | | | |
| 6 | 10 | 4 | 1 | 2 | 3 | 3 | 1 | 2 |
| 7 | 10 | 1 | 2 | 3 | 4 | | | |
| 8 | 10 | 2 | 3 | 4 | 1 | | | |
| 9 | 10 | 3 | 4 | 1 | 2 | | | |
| 10 | 10 | 4 | 1 | 2 | 3 | 1 | 2 | 3 |
| 11 | 10 | 1 | 2 | 3 | 4 | | | |
| 12 | 10 | 2 | 3 | 4 | 1 | | | |
| 13 | 11 | 3 | 4 | 1 | 2 | | | |
| 14 | 11 | 4 | 1 | 2 | 3 | 2 | 3 | 1 |
| 15 | 11 | 1 | 2 | 3 | 4 | | | |
| 16 | 11 | 2 | 3 | 4 | 1 | | | |
| 17 | 11 | 3 | 4 | 1 | 2 | | | |
| 18 | 11 | 4 | 1 | 2 | 3 | 3 | 1 | 2 |
| 19 | 11 | 1 | 2 | 3 | 4 | | | |
| 20 | 11 | 2 | 3 | 4 | 1 | | | |
| 21 | 11 | 3 | 4 | 1 | 2 | | | |
| 22 | 11 | 4 | 1 | 2 | 3 | 1 | 2 | 3 |
| 23 | 11 | 1 | 2 | 3 | 4 | | | |
| 24 | 11 | 2 | 3 | 4 | 1 | | | |
| 25 | 1 | 3 | 4 | 1 | 2 | | | |
| 26 | 1 | 4 | 1 | 2 | 3 | 2 | 3 | 1 |
| 27 | 1 | 1 | 2 | 3 | 4 | | | |
| 28 | 1 | 2 | 3 | 4 | 1 | | | |
| 29 | 1 | 3 | 4 | 1 | 2 | | | |
| 30 | 1 | 4 | 1 | 2 | 3 | 3 | 1 | 2 |
| 31 | 1 | 1 | 2 | 3 | 4 | | | |
| 32 | 1 | 2 | 3 | 4 | 1 | | | |
| 33 | 1 | 3 | 4 | 1 | 2 | | | |
| 34 | 1 | 4 | 1 | 2 | 3 | 1 | 2 | 3 |
| 35 | 1 | 1 | 2 | 3 | 4 | | | |
| 36 | 1 | 2 | 3 | 4 | 1 | | | |
| 37 | 2 | 3 | 4 | 1 | 2 | | | |
| 38 | 2 | 4 | 1 | 2 | 3 | 2 | 3 | 1 |
| 39 | 2 | 1 | 2 | 3 | 4 | | | |
| 40 | 2 | 2 | 3 | 4 | 1 | | | |
| 41 | 2 | 3 | 4 | 1 | 2 | | | |
| 42 | 2 | 4 | 1 | 2 | 3 | 3 | 1 | 2 |
| 43 | 2 | 1 | 2 | 3 | 4 | | | |
| 44 | 2 | 2 | 3 | 4 | 1 | | | |
| 45 | 2 | 3 | 4 | 1 | 2 | | | |
| 46 | 2 | 4 | 1 | 2 | 3 | 1 | 2 | 3 |
| 47 | 2 | 1 | 2 | 3 | 4 | | | |
| 48 | 2 | 2 | 3 | 4 | 1 | | | |

Inventor
M. den Hertog — C. de Zeeuw

Nov. 10, 1959  M. DEN HERTOG ET AL  2,912,510
TELECOMMUNICATION EXCHANGE SYSTEMS
Filed June 26, 1953  73 Sheets-Sheet 65

Inventor
M. den Hertog - C. de Zeeuw
By Robert Hardy
Attorney

FIG. 71.

| | CCT. | 1 | 2 | 3 | 4 | 5 | 6 | 7 | 8 | 9 | 10 |
|---|---|---|---|---|---|---|---|---|---|---|---|
| "A" GOVERNOR | Ra | 1 | 2 | 3 | 4 | 5 | 1 | 2 | 3 | 4 | 5 |
| | Rb | 1 | 1 | 1 | 1 | 1 | 2 | 2 | 2 | 2 | 2 |
| "B" GOVERNOR | Ra | 1 | 2 | 3 | 4 | 5 | 1 | 2 | 3 | 4 | 5 |
| | Rb | 1 | 1 | 1 | 1 | 1 | 2 | 2 | 2 | 2 | 2 |
| "C" GOVERNOR | Ra | 1 | 2 | 3 | 4 | 5 | 1 | 2 | 3 | 4 | 5 |
| | Rb | 4 | 4 | 4 | 4 | 4 | 5 | 5 | 5 | 5 | 5 |

FIG. 72.

| CLASS OF LINE NUMBER | DESCRIPTION OF LINE CLASS | PO IMPULSE SOURCES CONN'D TO TERM. B | TERM. A |
|---|---|---|---|
| 1 | 1ST LINE OF 1ST NON-CONSECUTIVE P.B.X. GRP. (UNRESTR.) | 1 | 7 |
| 2 | " " " 2ND " " " " " | 2 | 7 |
| 3 | " " " 3RD " " " " " | 3 | 7 |
| 4 | " " " 4TH " " " " " | 4 | 7 |
| 5 | " " " 5TH " " " " " | 5 | 7 |
| 6 | " " " 1ST " " " " (RESTR.) | 1 | 8 |
| 7 | " " " 2ND " " " " " | 2 | 8 |
| 8 | " " " 3RD " " " " " | 3 | 8 |
| 9 | " " " 4TH " " " " " | 4 | 8 |
| 10 | " " " 5TH " " " " " | 5 | 8 |
| 11 | OTHER LINES OF 1ST NON-CONS. P.B.X. GRP. (UNRESTR) | 7 | 1 |
| 12 | " " " 2ND " " " " | 7 | 2 |
| 13 | " " " 3RD " " " " | 7 | 3 |
| 14 | " " " 4TH " " " " | 7 | 4 |
| 15 | " " " 5TH " " " " | 7 | 5 |
| 16 | " " " 1ST " " " (RESTR.) | 8 | 1 |
| 17 | " " " 2ND " " " " | 8 | 2 |
| 18 | " " " 3RD " " " " | 8 | 3 |
| 19 | " " " 4TH " " " " | 8 | 4 |
| 20 | " " " 5TH " " " " | 8 | 5 |
| 21 | SINGLE LINE (UNRESTRICTED) | 7 | 11 |
| 22 | (RESTRICTED) | 8 | 11 |
| 23 | | | |
| 24 | ALL LINES BUT LAST OF UNRESTR. P.B.X. GRP W. CONS. NUMB. | 11 | 7 |
| 25 | " " " " " RESTR. " " " " | 11 | 8 |
| 26 | LAST LINE OF UNRESTR. P.B.X. GRP. W. CONSECUTIVE NUMB. | 7 | 11 |
| 27 | " " " RESTR. " " " | 8 | 11 |
| 28 | | | |
| 29 | MULTI-SLOT COIN BOX | 7 | 10 |
| 30 | SINGLE SLOT COIN BOX | 8 | 10 |
| 31 | CHANGED NUMBER | 10 | 11 |
| 32 | DEAD LINE | 10 | 6 |

Inventor
M. den Hertog - C. de Zeeuw

FIG. 73.

| THOUSANDS | HUNDREDS | Na OR Pa | Nb OR Pb | Nc OR Pc | THOUSANDS | HUNDREDS | Na OR Pa | Nb OR Pb | Nc OR Pc |
|---|---|---|---|---|---|---|---|---|---|
| TENS | UNITS | | | | TENS | UNITS | | | |
| 0 | 0 | 1 | | | 5 | 0 | 1 | | |
| 0 | 1 | 2 | | | 5 | 1 | 2 | | |
| 0 | 2 | 3 | }1 | | 5 | 2 | 3 | }1 | |
| 0 | 3 | 4 | | | 5 | 3 | 4 | | |
| 0 | 4 | 5 | | | 5 | 4 | 5 | | |
| 0 | 5 | 1 | | | 5 | 5 | 1 | | |
| 0 | 6 | 2 | | | 5 | 6 | 2 | | |
| 0 | 7 | 3 | }2 | | 5 | 7 | 3 | }2 | |
| 0 | 8 | 4 | | | 5 | 8 | 4 | | |
| 0 | 9 | 5 | | | 5 | 9 | 5 | | |
| 1 | 0 | 1 | | | 6 | 0 | 1 | | |
| 1 | 1 | 2 | | | 6 | 1 | 2 | | |
| 1 | 2 | 3 | }3 | }1 | 6 | 2 | 3 | }3 | }3 |
| 1 | 3 | 4 | | | 6 | 3 | 4 | | |
| 1 | 4 | 5 | | | 6 | 4 | 5 | | |
| 1 | 5 | 1 | | | 6 | 5 | 1 | | |
| 1 | 6 | 2 | | | 6 | 6 | 2 | | |
| 1 | 7 | 3 | }4 | | 6 | 7 | 3 | }4 | |
| 1 | 8 | 4 | | | 6 | 8 | 4 | | |
| 1 | 9 | 5 | | | 6 | 9 | 5 | | |
| 2 | 0 | 1 | | | 7 | 0 | 1 | | |
| 2 | 1 | 2 | | | 7 | 1 | 2 | | |
| 2 | 2 | 3 | }5 | | 7 | 2 | 3 | }5 | |
| 2 | 3 | 4 | | | 7 | 3 | 4 | | |
| 2 | 4 | 5 | | | 7 | 4 | 5 | | |
| 2 | 5 | 1 | | | 7 | 5 | 1 | | |
| 2 | 6 | 2 | | | 7 | 6 | 2 | | |
| 2 | 7 | 3 | }1 | | 7 | 7 | 3 | }1 | |
| 2 | 8 | 4 | | | 7 | 8 | 4 | | |
| 2 | 9 | 5 | | | 7 | 9 | 5 | | |
| 3 | 0 | 1 | | | 8 | 0 | 1 | | |
| 3 | 1 | 2 | | | 8 | 1 | 2 | | |
| 3 | 2 | 3 | }2 | | 8 | 2 | 3 | }2 | |
| 3 | 3 | 4 | | | 8 | 3 | 4 | | |
| 3 | 4 | 5 | | | 8 | 4 | 5 | | |
| 3 | 5 | 1 | | | 8 | 5 | 1 | | |
| 3 | 6 | 2 | | | 8 | 6 | 2 | | |
| 3 | 7 | 3 | }3 | }2 | 8 | 7 | 3 | }3 | }4 |
| 3 | 8 | 4 | | | 8 | 8 | 4 | | |
| 3 | 9 | 5 | | | 8 | 9 | 5 | | |
| 4 | 0 | 1 | | | 9 | 0 | 1 | | |
| 4 | 1 | 2 | | | 9 | 1 | 2 | | |
| 4 | 2 | 3 | }4 | | 9 | 2 | 3 | }4 | |
| 4 | 3 | 4 | | | 9 | 3 | 4 | | |
| 4 | 4 | 5 | | | 9 | 4 | 5 | | |
| 4 | 5 | 1 | | | 9 | 5 | 1 | | |
| 4 | 6 | 2 | | | 9 | 6 | 2 | | |
| 4 | 7 | 3 | }5 | | 9 | 7 | 3 | }5 | |
| 4 | 8 | 4 | | | 9 | 8 | 4 | | |
| 4 | 9 | 5 | | | 9 | 9 | 5 | | |

Inventor
M. den Hertog - C. de Zeeuw

FIG. 74.

| 1ST G.S. ESBO IDENTITY TERMINALS F AND G | | |
|---|---|---|
| 1ST G.S. ESBO | CONNECT TERMINAL | |
| | F | G |
| | TO IMPULSE SOURCE Pd | |
| 1 | 11 | 5 |
| 2 | 1 | 5 |
| 3 | 1 | 6 |
| 4 | 2 | 5 |
| 5 | 2 | 6 |
| 6 | 2 | 7 |
| TOLL | 8 | 11 |

| 1ST G.S. ESBO CLASS OF OUTLET INDICATIONS TERMINALS E AND D | | |
|---|---|---|
| OUTLET | CONNECT TERMINAL | |
| | D | E |
| | TO IMPULSE SOURCE Pd | |
| 3RD G.S. 1 | 4 | 9 |
| 3RD G.S. 2 | 5 | 10 |
| 3RD G.S. 3 | 6 | 10 |
| 3RD G.S. 4 | 6 | 11 |
| - | 7 | 10 |
| - | 7 | 11 |
| - | 7 | 1 |
| 2ND G.S. SPEC. SERV. 1 | 8 | 1 |
| 2ND G.S. SPEC. SERV. 2 | 8 | 2 |
| OUTG. LINE CCT. 50 Hz | 2 | 10 |
| BOTHWAY JUNCT. CCT. | 2 | 10 |

FIG. 75.

| CONNECTING RELAY Nr. | OUTLET |
|---|---|
| 1 | 1ST G.S. 1 |
| 2 | " " 2 |
| 3 | " " 3 |
| 4 | " " 4 |
| 5 | " " 5 |
| 6 | " " 6 |
| 7 | 2ND G.S. 1 |
| 8 | " " 2 |
| 9 | " " 3 |
| 10 | " " 4 |
| 11 | SPARE |
| 12 | " |
| 13 | " |
| 14 | " |
| 15 | 3RD G.S. 1 |
| 16 | " " 2 |
| 17 | " " 3 |
| 18 | " " 4 |
| 19 | SPARE |
| 20 | " |
| 21 | " |
| 22 | " |
| 23 | TOLL |
| 24 | 2ND G.S. S.S. 1 |
| 25 | " " " " 2 |
| 26 | SPARE |
| 27 | " |
| 28 | " |
| 29 | " |
| 30 | " |

Inventor
M. den Hertog - C. de Zeeuw

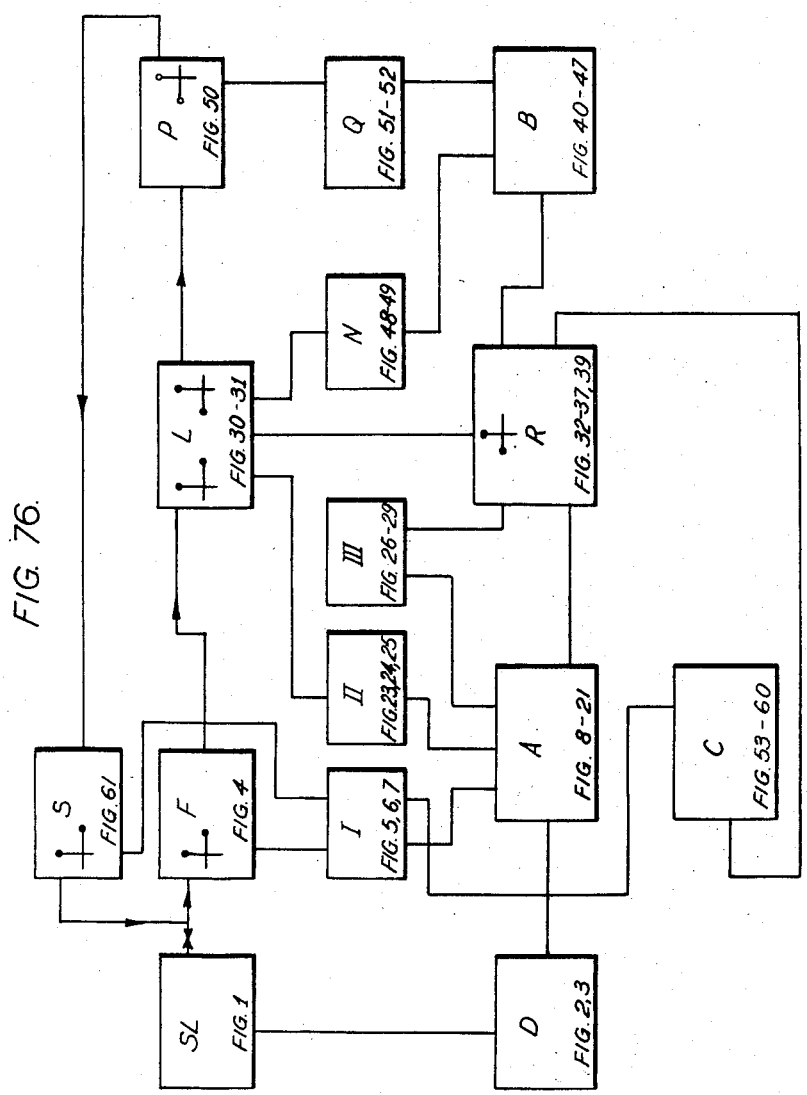

Nov. 10, 1959

M. DEN HERTOG ET AL 2,912,510

TELECOMMUNICATION EXCHANGE SYSTEMS

Filed June 26, 1953

73 Sheets-Sheet 73

FIG. 77.

| 2 |
|---|
| 3 |

FIG. 78.

| 5 |
|---|
| 6 |
| 7 |

FIG. 79.

| 23 |
|----|
| 24 |
| 25 |

FIG. 80.

| 26 |
|----|
| 27 |
| 28 |
| 29 |

FIG. 81.

| 30 | 31 |
|----|----|

FIG. 84.

| 8 | 9 | 17 | 16 |
|---|---|----|----|
|   | 10 | 18 |   |
|   | 12 | 20 |   |
|   | 14 | 21 |   |

FIG. 82.

| 48 |
|----|
| 49 |

FIG. 83.

| 51 |
|----|
| 52 |

FIG. 85.

| 32 | 39 |
|----|----|
| 33 | 37 |
| 36 | 35 |
|    | 34 |

FIG. 86.

| 40 | 44 |
|----|----|
| 41 | 45 |
| 42 | 46 |
| 43 | 47 |

FIG. 87.

| 53 | 57 |
|----|----|
| 54 | 58 |
| 55 | 59 |
| 56 | 60 |

*Inventor*
M. den Hertog - C. de Zeeuw

By *Robert Harding*
*Attorney*

2,912,510

TELECOMMUNICATION EXCHANGE SYSTEMS

Martinus den Hertog and Constantinus De Zeeuw, Antwerp, Belgium, assignors to International Standard Electric Corporation, New York, N.Y., a corporation of Delaware Application June 26, 1953, Serial No. 364,236

Claims priority, application Great Britain July 1, 1952

23 Claims. (Cl. 179—18)

The invention relates to automatic telecommunication systems in which use is made of call detector circuits, register circuits, line finder and selector stages each associated with a plurality of common control circuits.

Systems are known in which a register circuit upon being seized by a calling call detector has for main functions, to control its own connection to the calling subscriber's line via the cord circuit and the line finder stages, to receive and store the information concerning the called subscriber's number, to control accordingly the group selections and to control the final selection. The register is therefore engaged for the duration necessary to complete all the cited functions, whereas its partial circuits performing respectively each of the cited functions are only operative for the duration to complete the corresponding function.

It is the object of the invention to associate each of the cited functions with separate circuits: the register circuit for receiving, storing, retransmitting the information concerning the called subscriber's number, the separate circuits, which will henceforth be called "governor" circuits, for controlling respectively the connection of a register to the calling subscriber's line, the group selections, the final selection. In this manner each separate circuit is released after completing its own function and is therefore available for a new call which for a given equipment permits the increase of the traffic facilities, or for a given traffic rate permits the simplification of the equipment.

Another advantage results from the fact that a plurality of each of said separate circuits can be associated with each register circuit proper, and reversely, so that if one of said individual circuits or register circuits is defective, another is available for use, whereas in the known systems, cited above, if a register partial circuit is defective, the whole register with all its functions is disabled.

According to a main feature of the invention the common circuits of one or more selection or line finding stages are associated with one or more out of a plurality of "governor" circuits provided in common for said one or more selection or line finding stages, each of said "governor" circuits being associated with a plurality of register circuits or with a plurality of call detector and register circuits, whereby the seizure of a register and the storage therein of a code characterizing the called subscriber's number or part thereof or the seizure of a call detector, results in the seizure of a corresponding free "governor" circuit and in the storage therein of a code characterizing said calling subscriber's number or part thereof or of a code characterizing said called subscriber's number or part thereof, said storages in said "governor" circuits resulting in the seizure of corresponding common circuits and thereafter in the setting of free selectors or line finders corresponding to said common circuits on circuits or subscriber's line circuits corresponding with the called or calling subscriber's numbers or parts thereof.

According to another feature of the invention each of said "governor" circuits comprises the same means to record successively the identity and class indication of a plurality of free outlets.

According to another feature of the invention each of said "governor" circuits comprises the same means to test successively the free condition of a plurality of common circuits and a plurality of free outlets.

According to another feature of the invention, the common circuits associated with line finder stages and cord choosers are further associated with a plurality of "finder governor" circuits of which the function is, upon being seized by a calling detector, to control, via the respective common circuits, the successive connections of a free register to a free cord circuit serving the required group of subscriber's line and belonging to the same subgroup as said register, the successive connections of said cord circuit to a free line finder serving the required group of subscriber's line and belonging to the same subgroup as said register and said cord circuit, and the successive connections of the calling subscriber's line to the line finder having direct access to said calling subscriber's line.

According to another feature of the invention, the common circuits associated with the group selection stages are further associated with a plurality of "group selection governor" circuits provided in common for said one or more group selection stages, each of said "group selector governor" circuits being associated with a plurality of register circuits, whereby the seizure of a register and the storage therein of that part of the code characterizing the called subscriber's number which concerns the group selection stages results in the seizure of the corresponding free "group selection governor" circuit and in the storage therein of these parts of said code concerning the group selections at successive stages, said storage resulting in the successive connection of said "group selection governor" circuit to the common circuits associated with the group selectors at successive stages and in the successive setting of connections between group selectors at successive stages and between the penultimate group selector and a final selector.

According to another feature of the invention the common circuits associated with the final selector stage are further associated with a plurality of "final selection governor" circuits provided in common for said common circuits, whereby the resetting of a register to the calling condition at the end of the group selections, results in the seizure of a free "final selection governor" circuit from the register and in the storage in this seized circuit of these parts of the code characterizing the called subscriber's number which concern the group selection stages and the final selection stage, the storage therein of the parts of code concerning the group selection stage resulting in the seizure by said "final selector governor" circuit of the common circuit associated with the one final selector group which has been connected to the penultimate group selector as a result of group selections, whereas the storage therein of the parts of code concerning the final selection results in the control by said "final selector governor" circuit of the connections between said final selector and the called subscriber's line and of the connections between the line finder and the first group selector in the cord circuit connected to said register.

According to another feature of the invention, said "group selection governor" circuits and said "final selection governor" circuits comprise means to detect the class indication of an outlet, for instance, an outgoing junction, special services in the case of group selection, single line, line of a non-consecutive or consecutive P.B.X group of lines in the case of final selection, and to control accordingly the selection, the register circuits being only responsive to signals from said group selection governor or final selection governor circuits.

Figure 2:
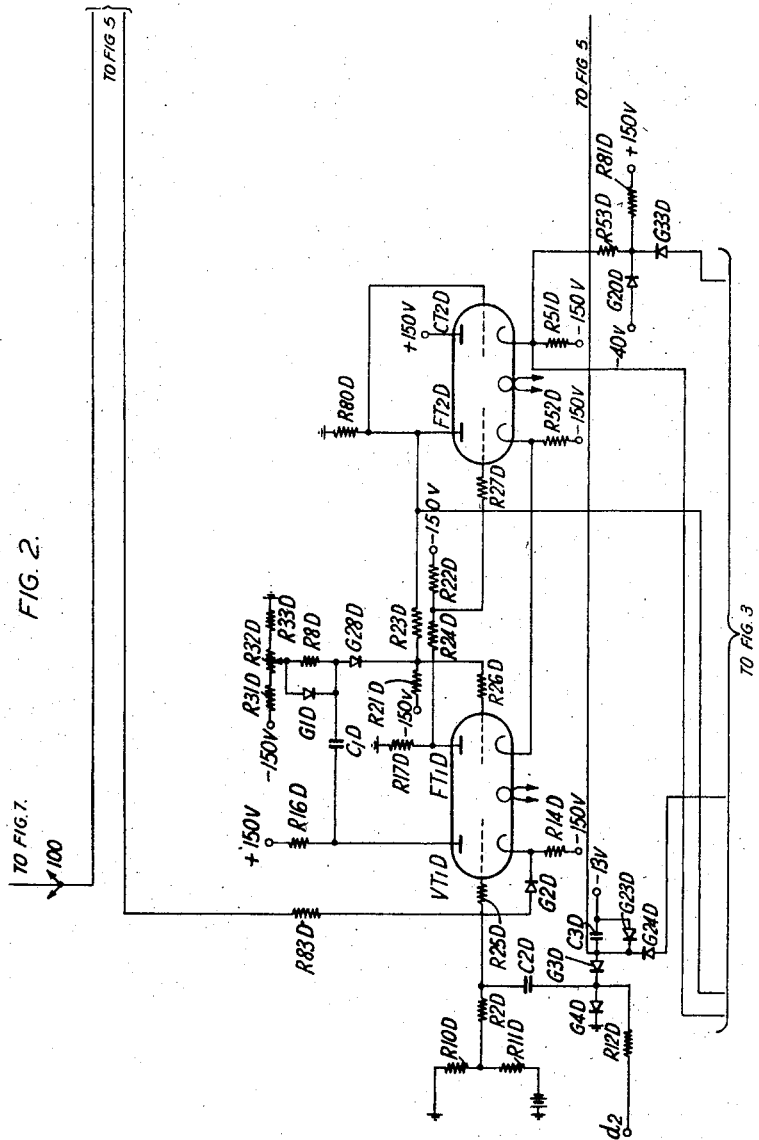
Figure 3:
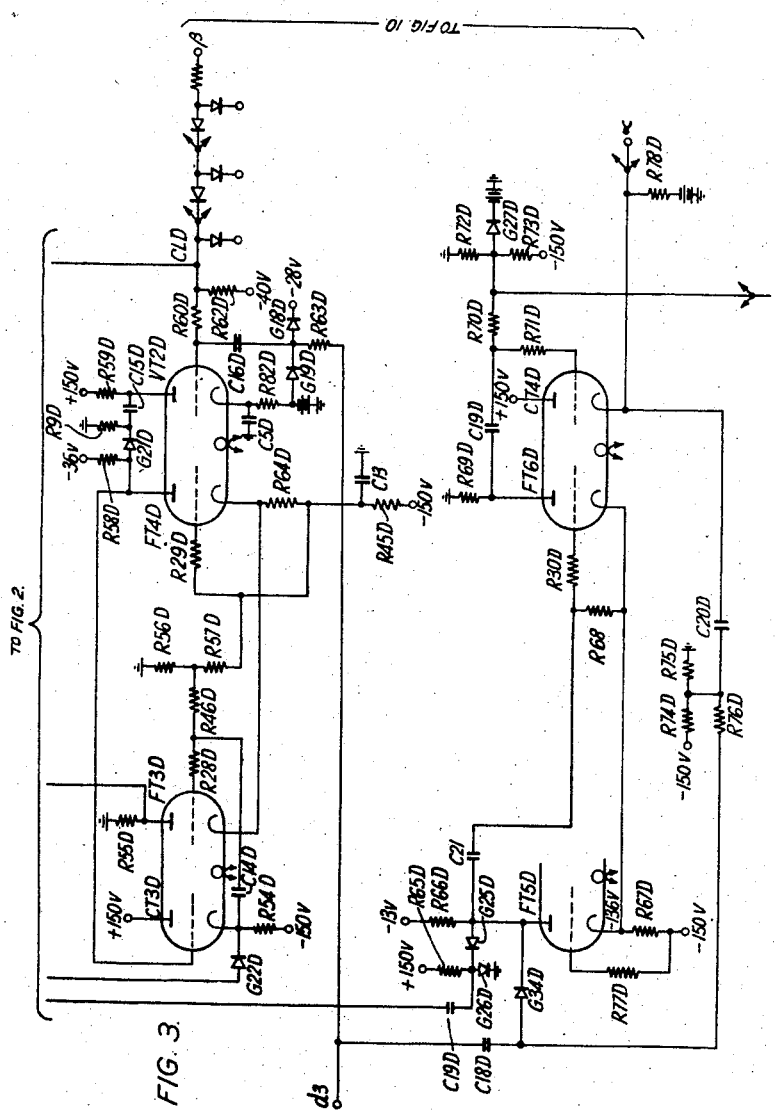
Figure 4:
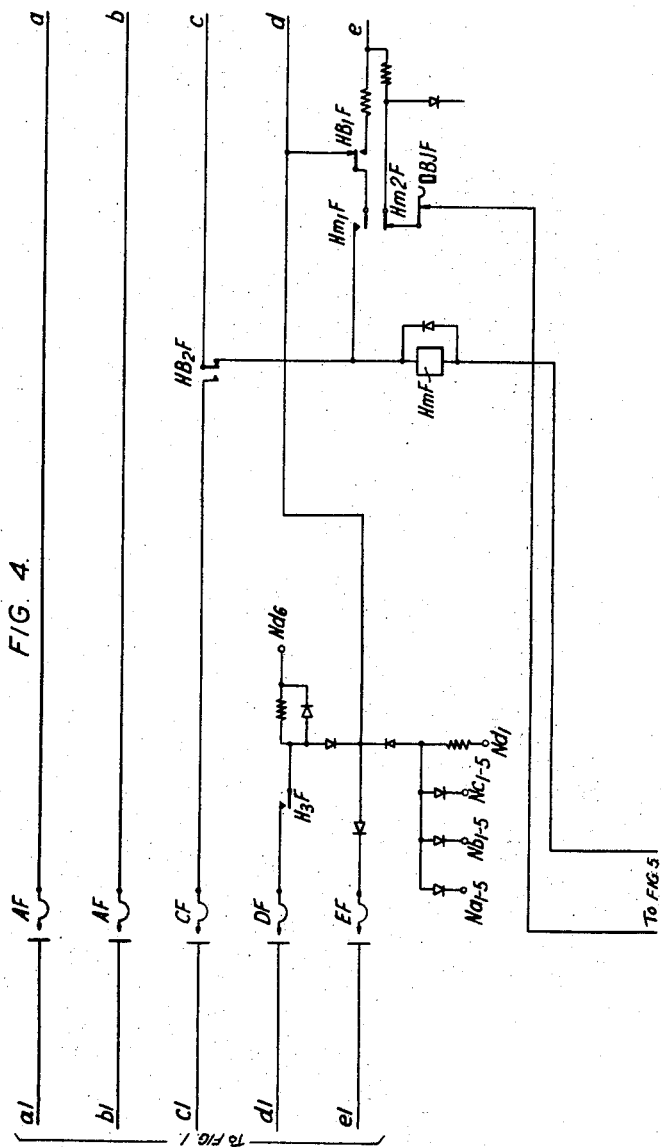
Figure 5:
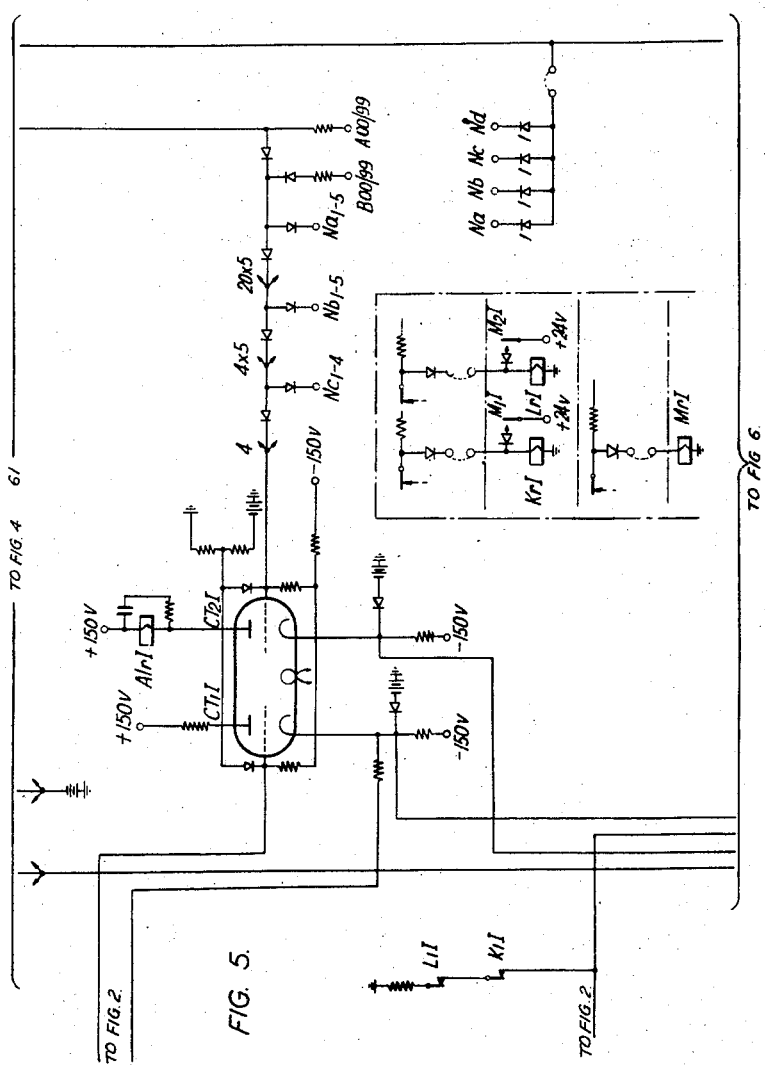
Figure 6:
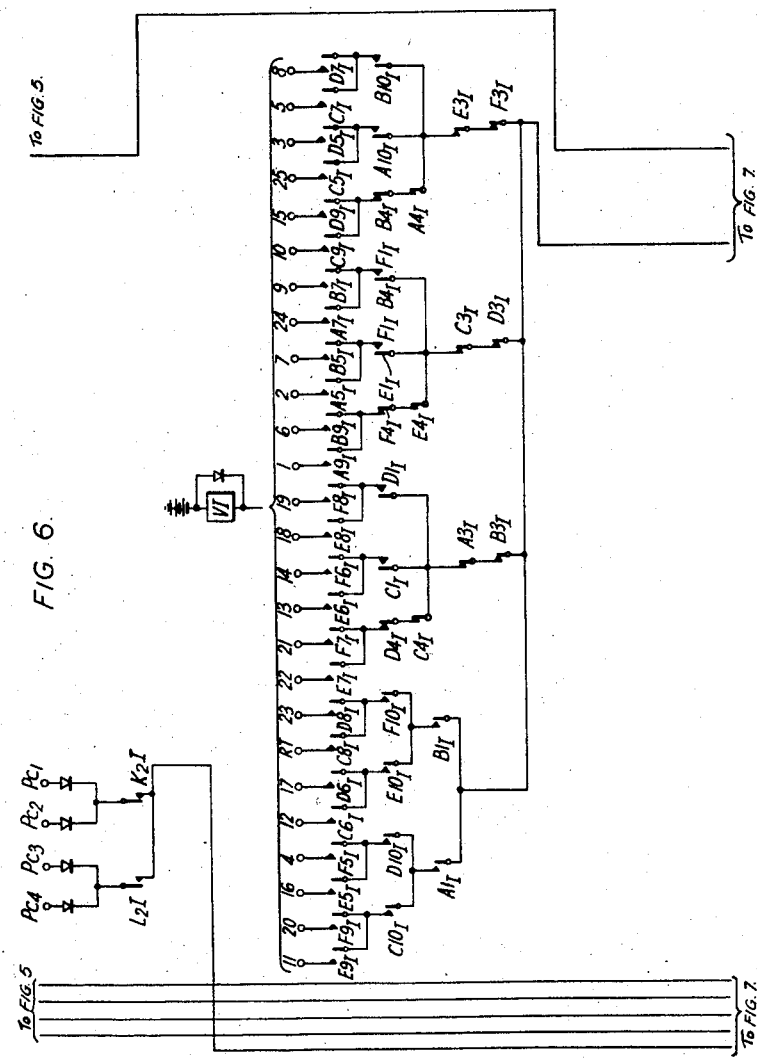
Figure 7:
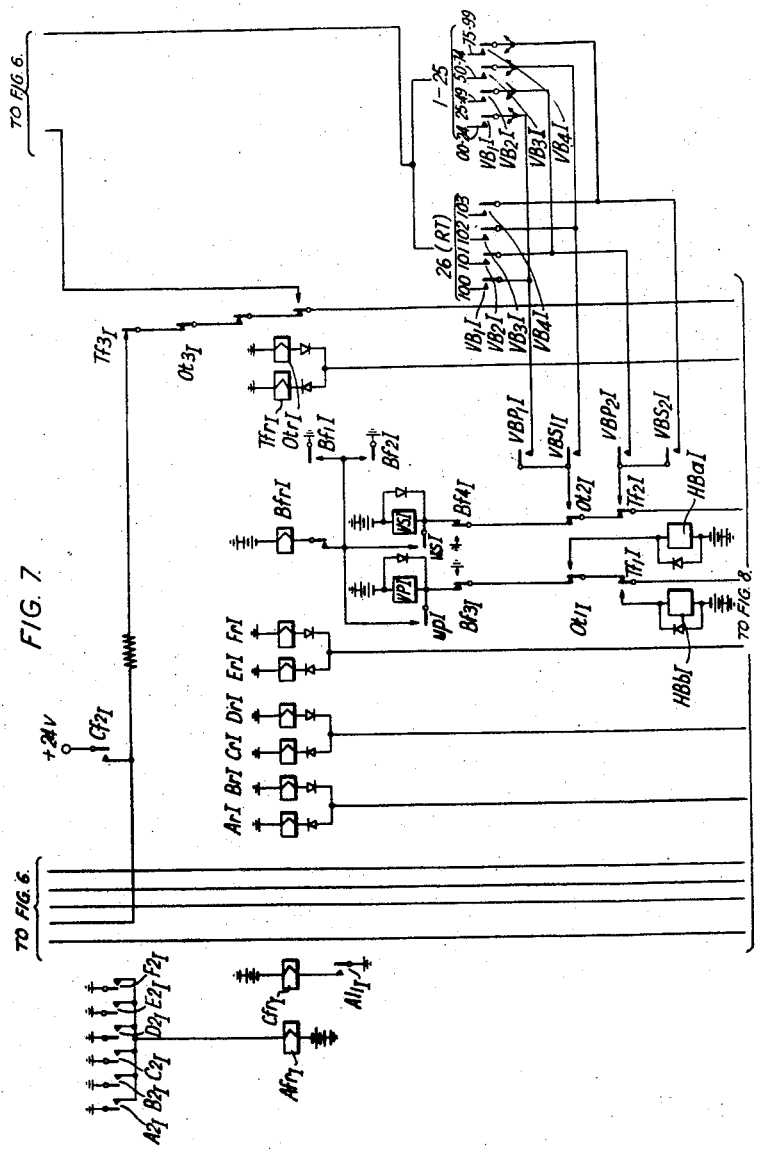
Figure 19:
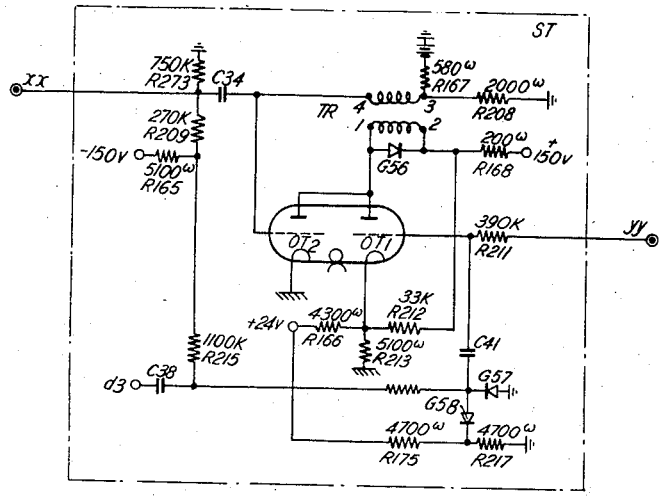
Figure 13:
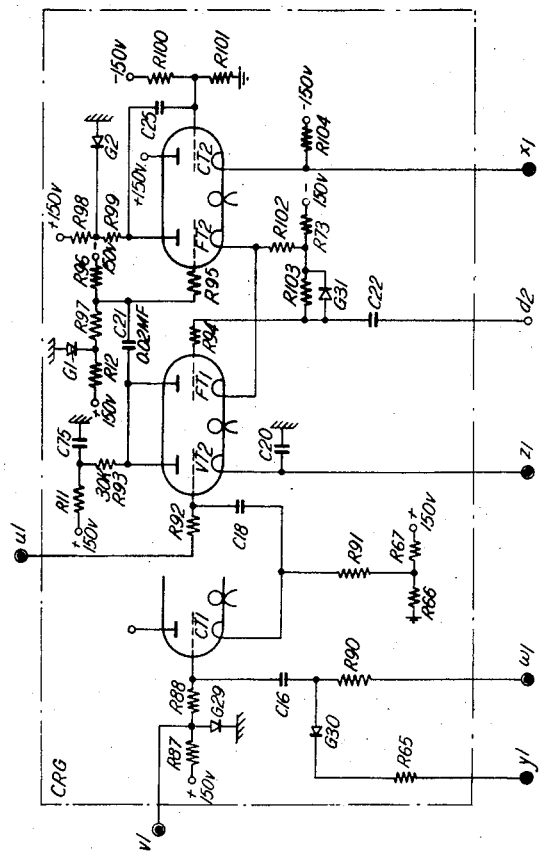
Figure 23:
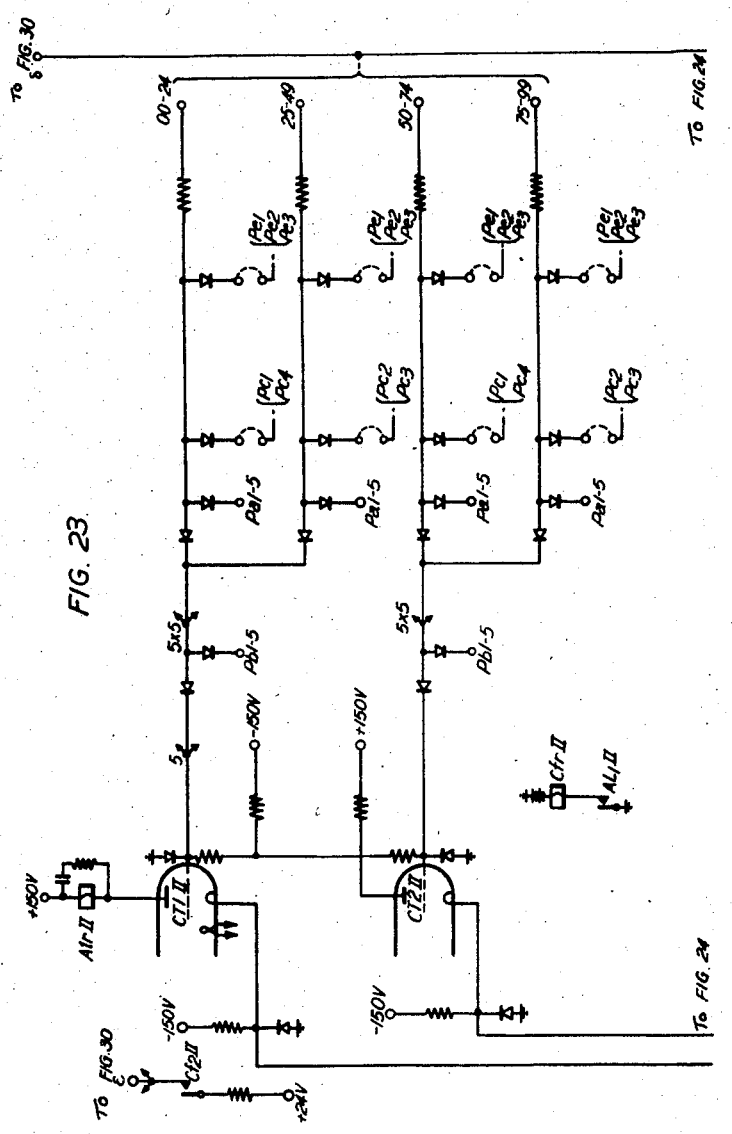
Figure 24:
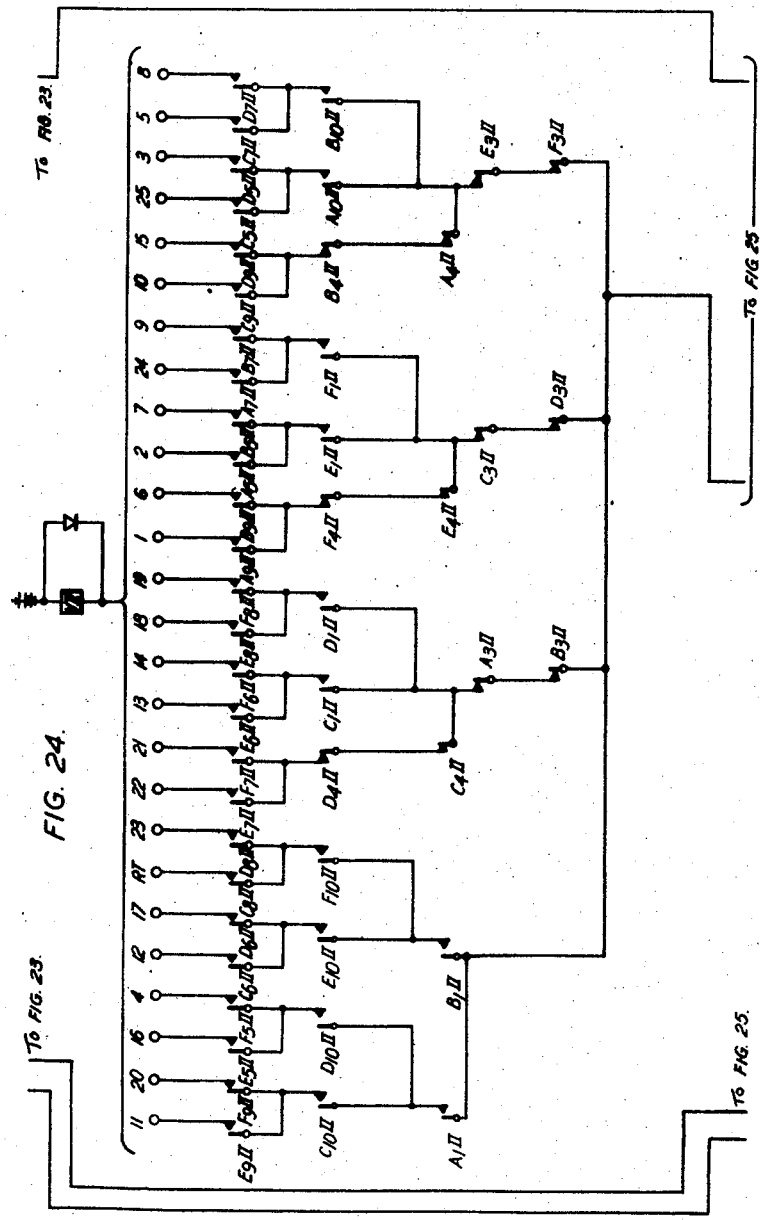
Figure 25:
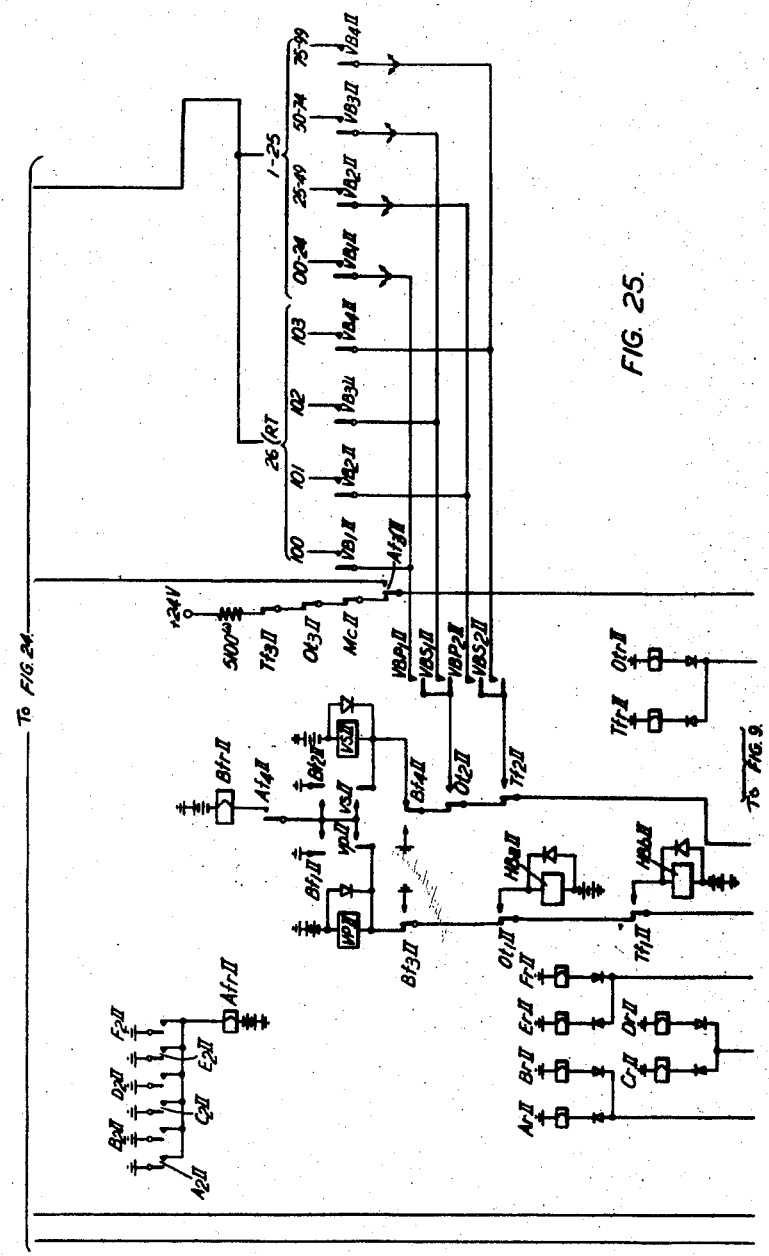
Figure 30:
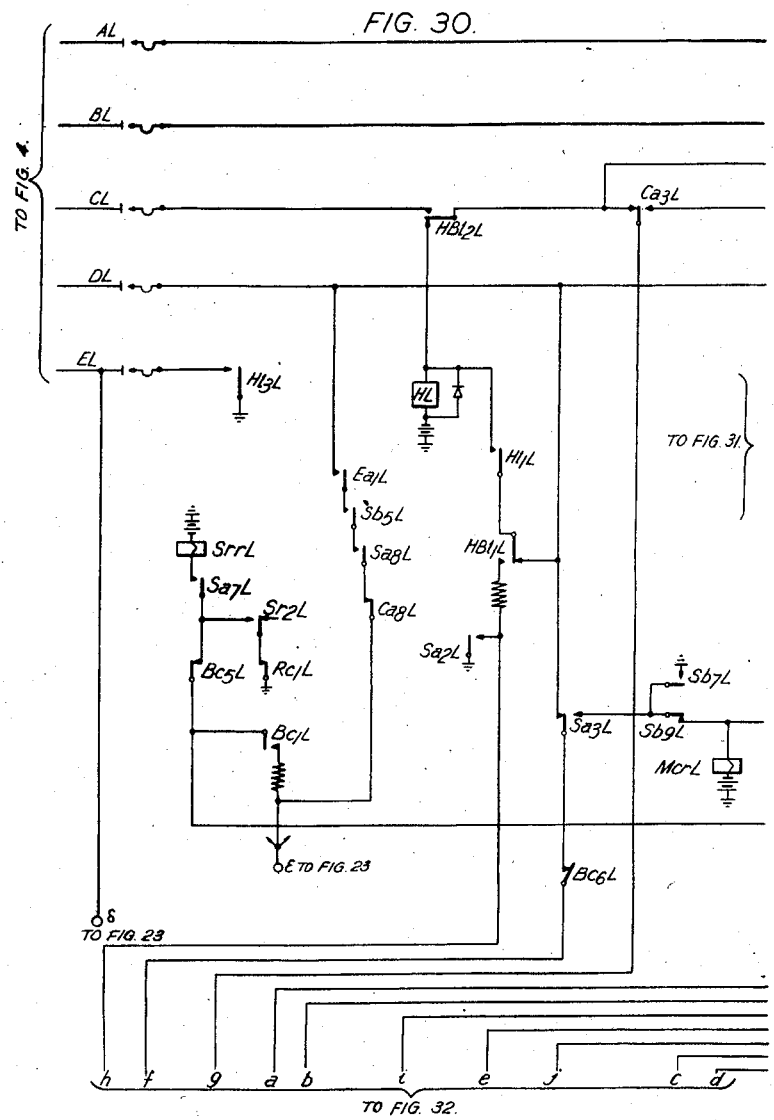
Figure 31:
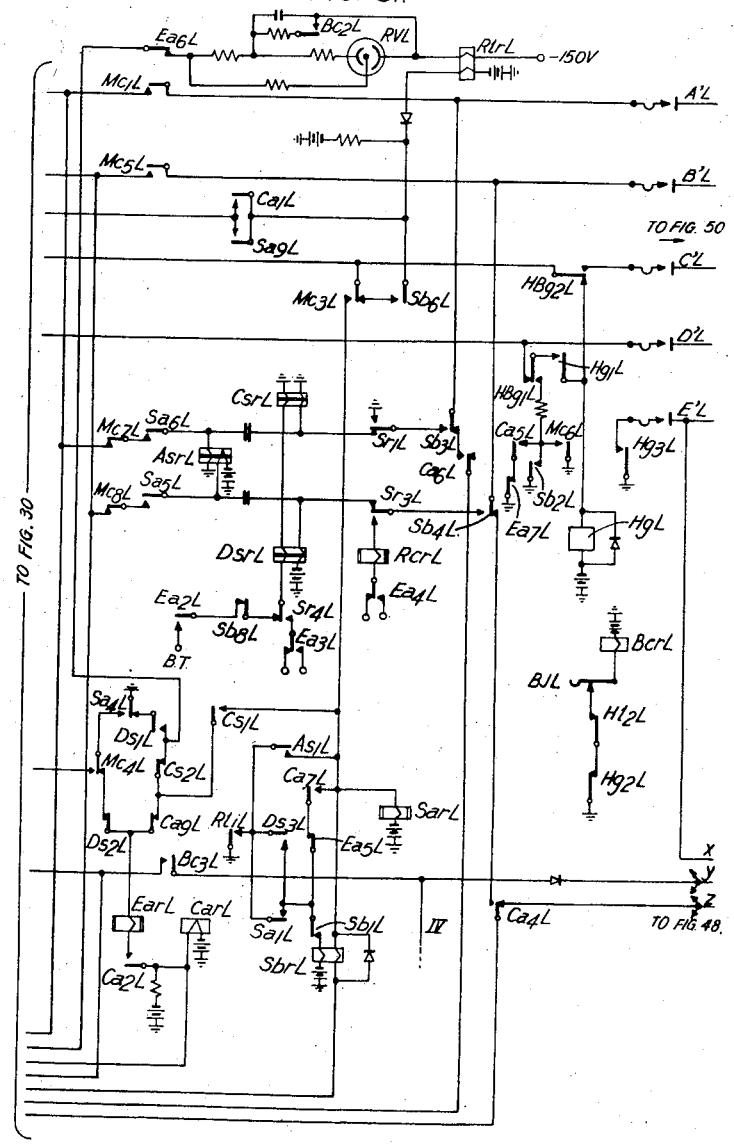
Figure 48:
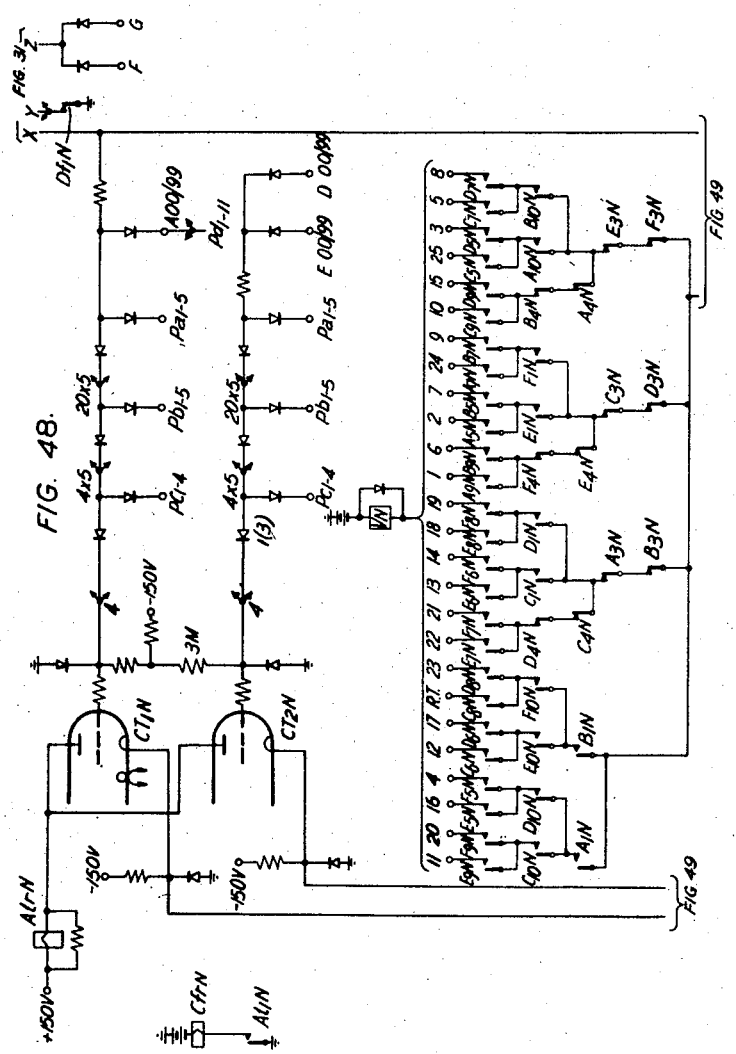
Figure 49:
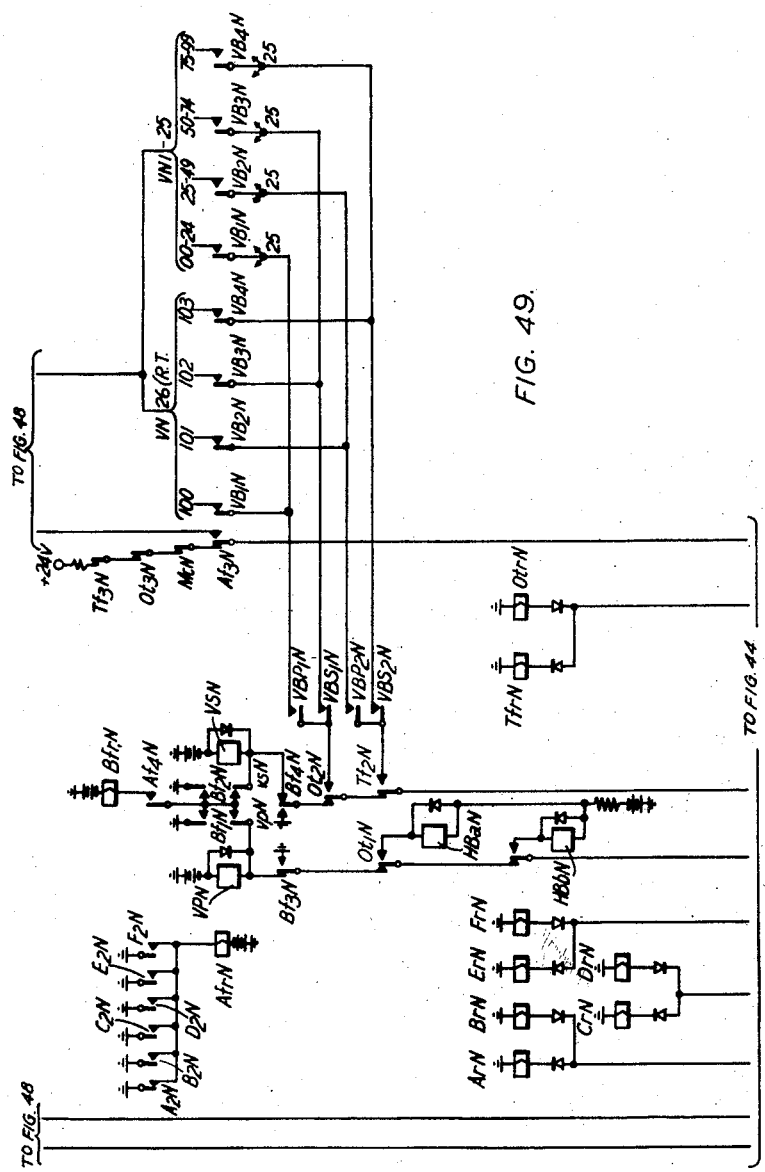
Figure 50:
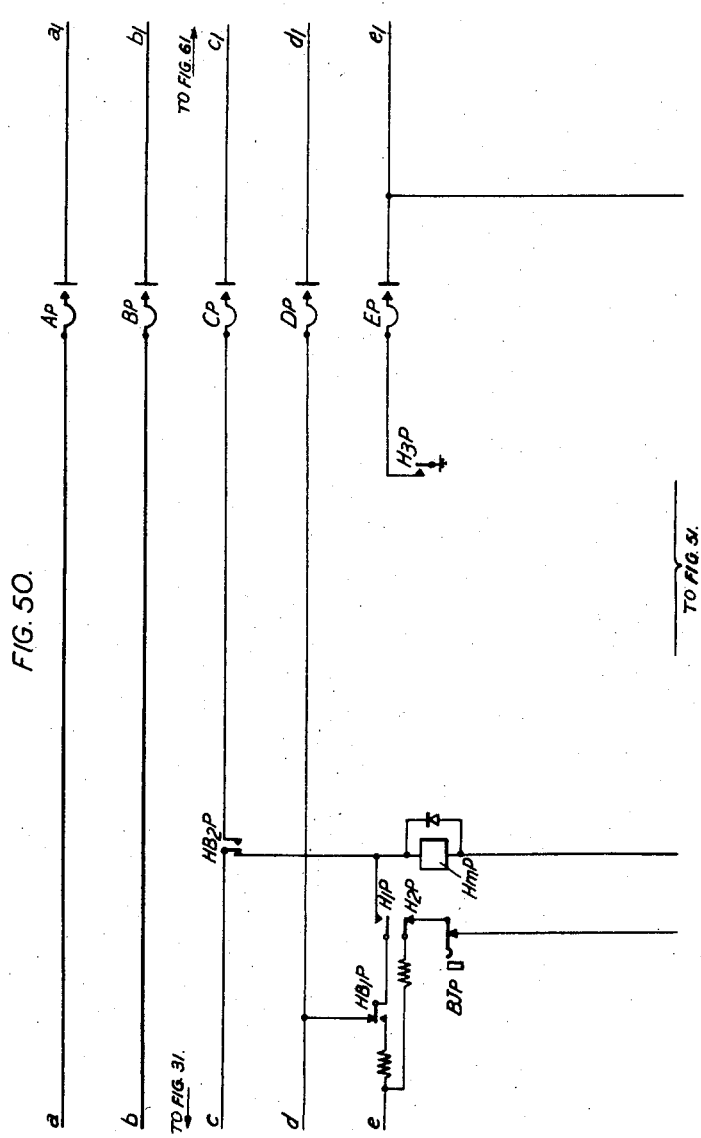
Figure 51:
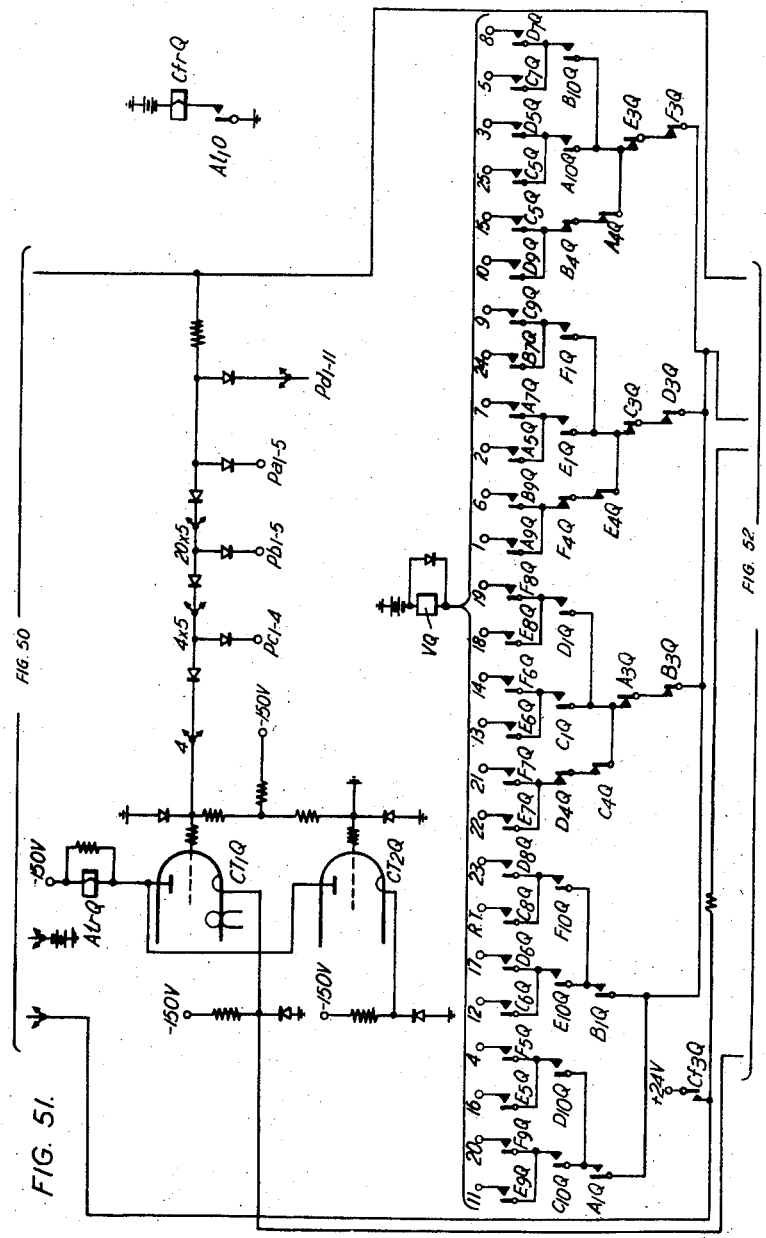
Figure 52:
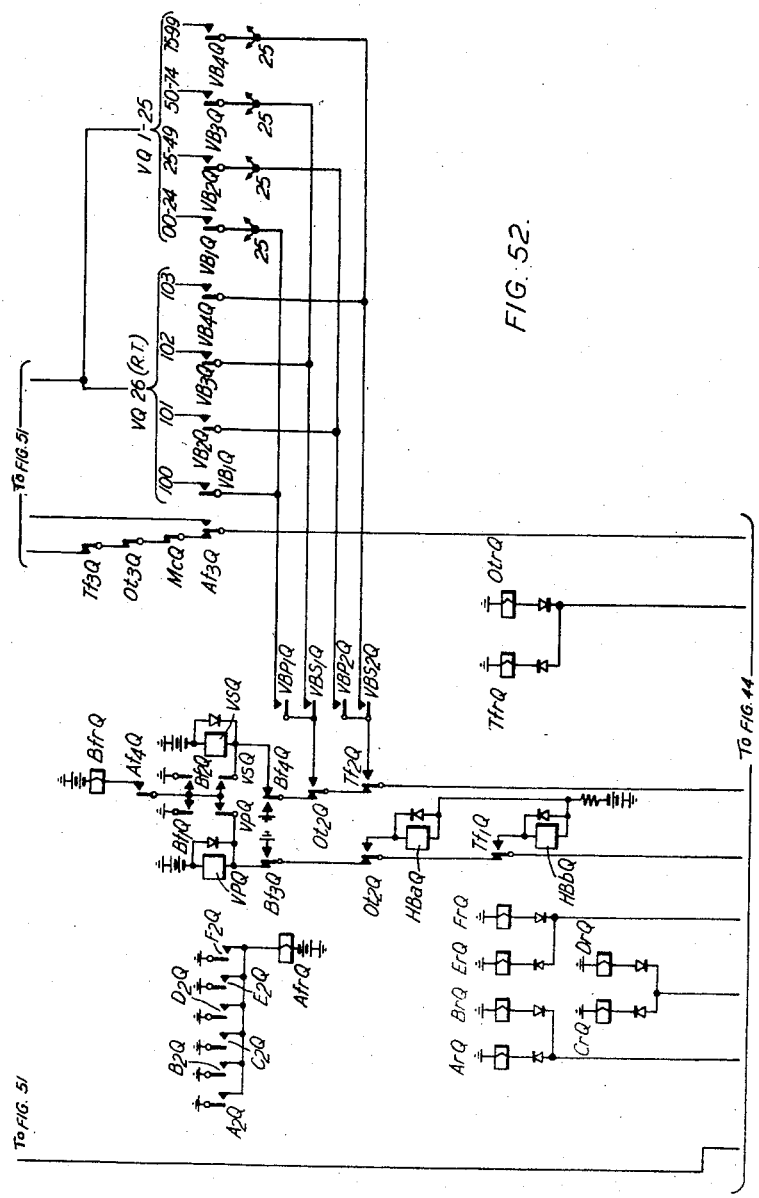
Figure 61:
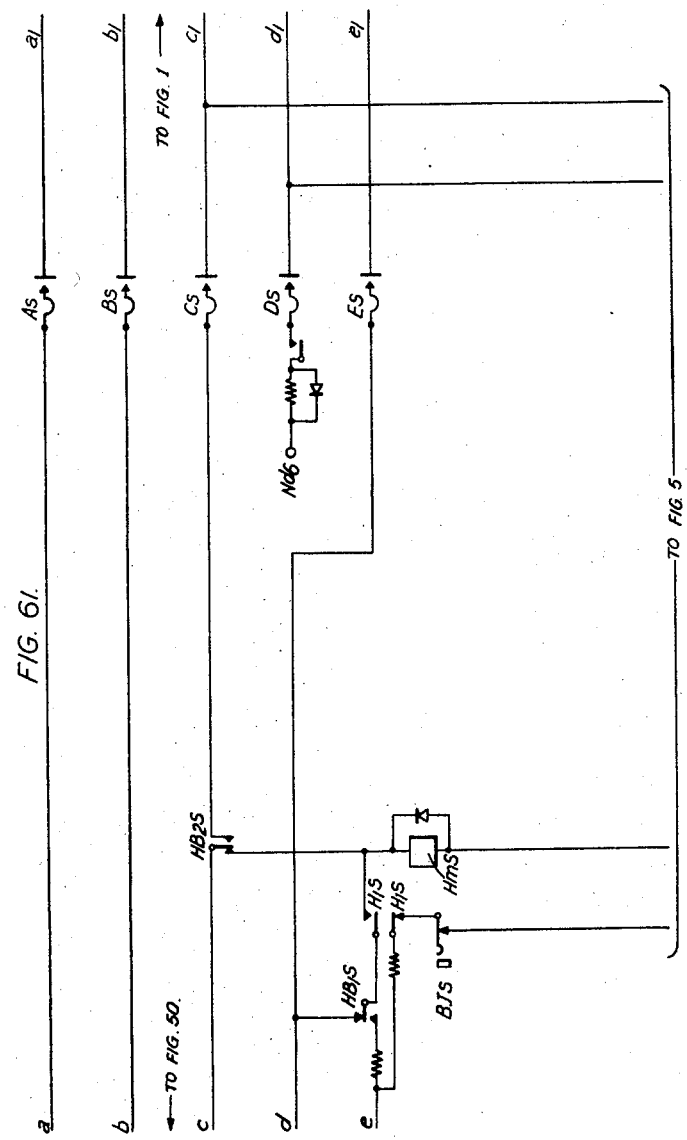
Figure 62:
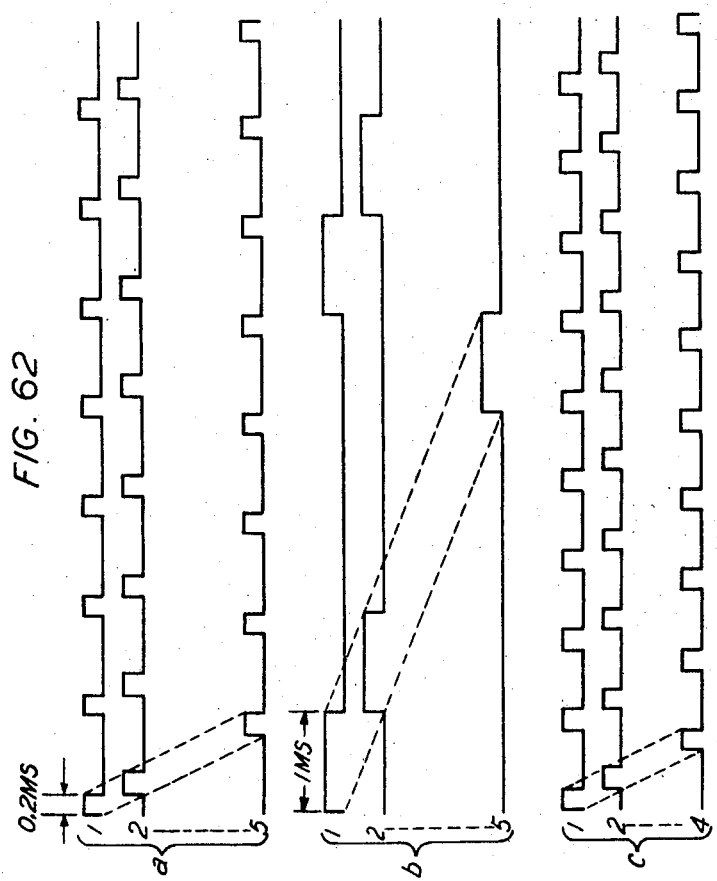
Figure 63:
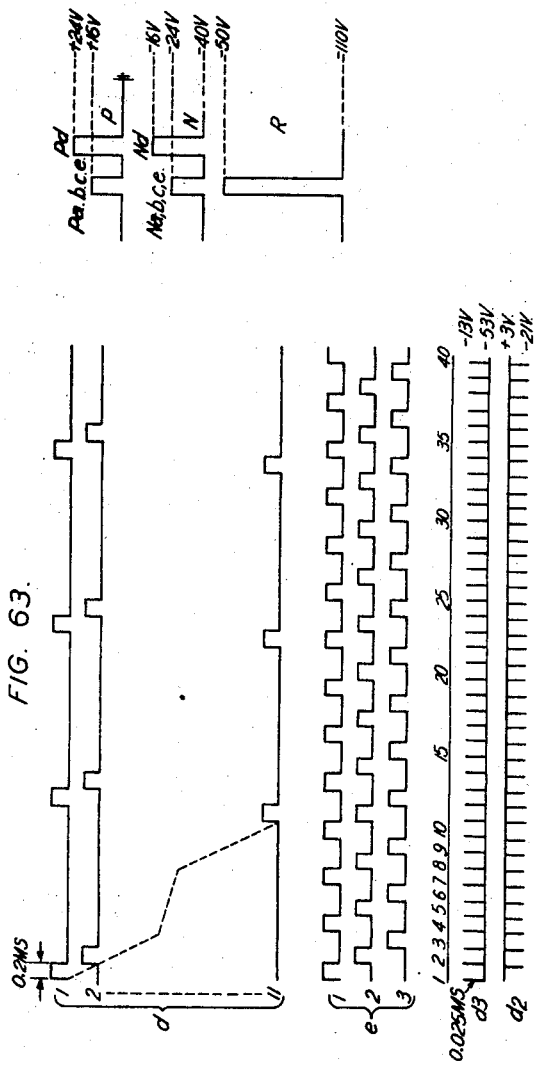
Figure 64:
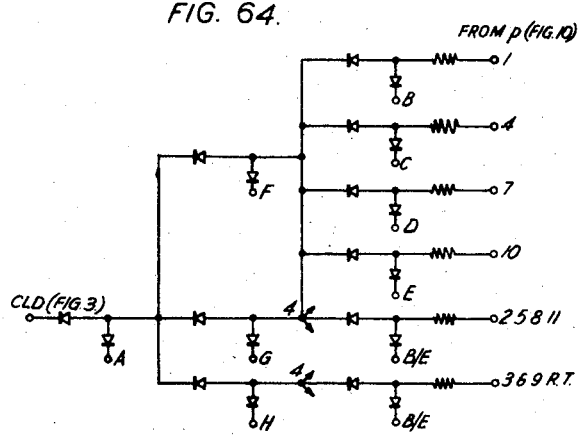
Figure 66:
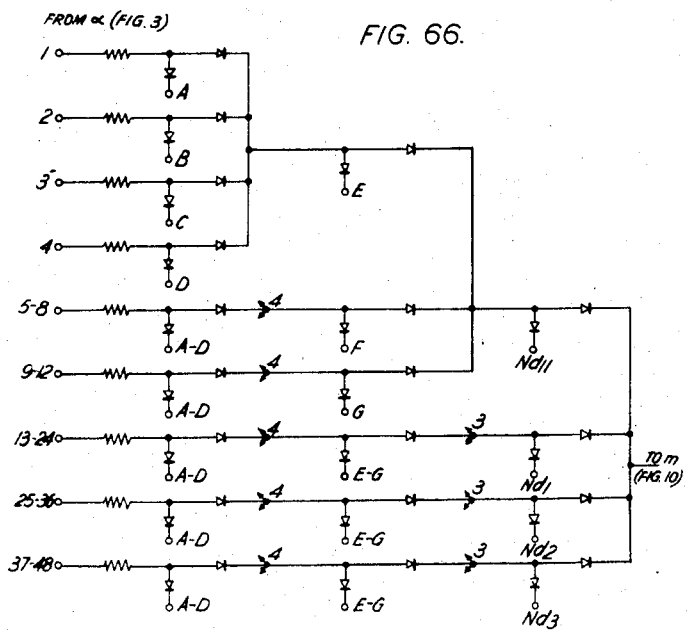
Figure 67:
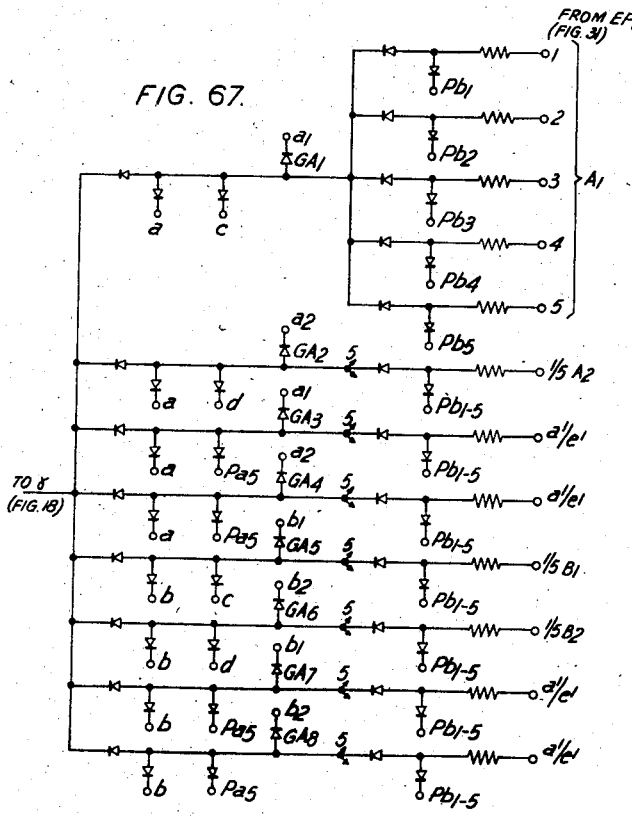
Figure 68:
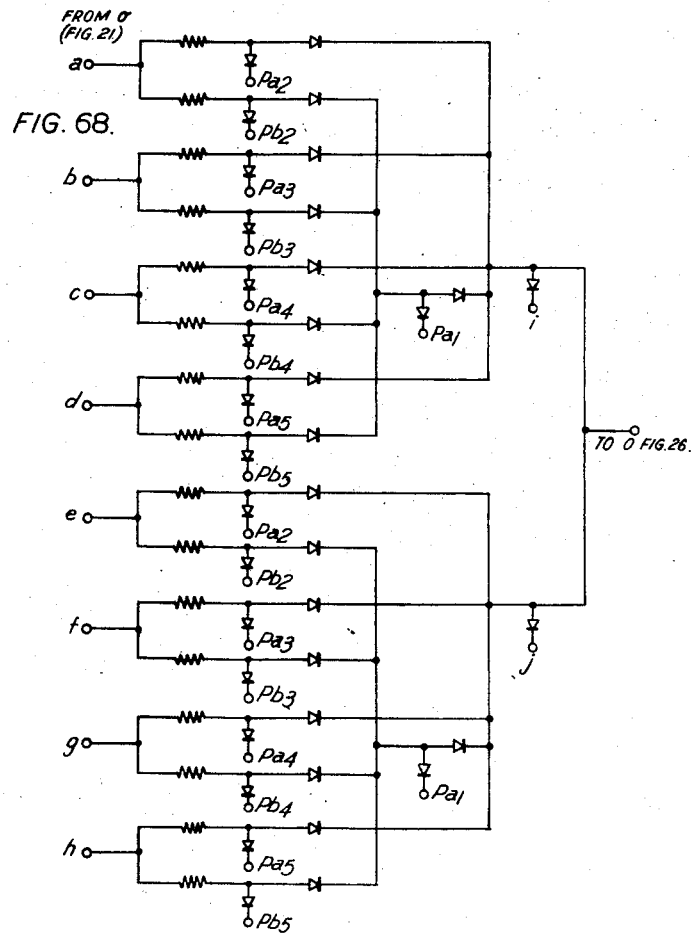
Figure 69:
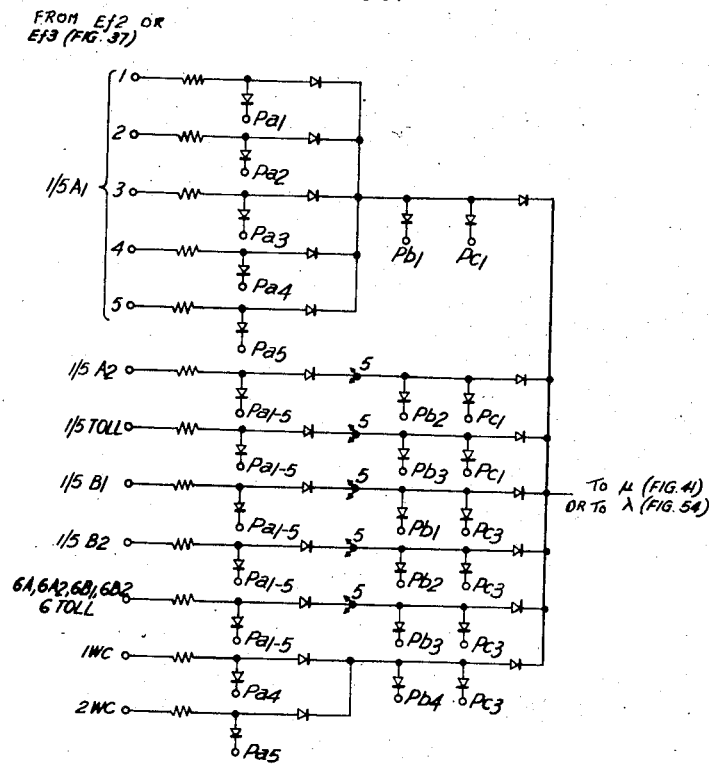

The above mentioned and other objects and features of the invention will become more apparent and the invention itself will be best understood by referring to the following description of an embodiment taken in conjunction with the accompanying drawings in which:

Fig. 1 shows a subscriber's line circuit.
Figs. 2 and 3 show a call detector circuit.
Fig. 4 shows a first line finder circuit.
Figs. 5 to 7 show a common circuit for first line finders and final selectors.
Figs. 8 to 22 show a "finder governor" circuit according to the invention.
Figs. 23 to 25 show a common circuit for second line finders.
Figs. 26 to 29 show a common circuit for cord choosers.
Figs. 30 and 31 show a cord circuit.
Fig. 30 showing the line finder circuit part of said cord circuit, and
Fig. 31 showing the first group selector circuit part of said cord circuit.
Figs. 32 to 37, and 39 show a register circuit.
Fig. 38 represents a table showing the counting and storing relays operated in a register circuit according to the digit dialled by the calling subscriber.
Figs. 40 to 47 in conjunction with Figs. 13 and 19 show a "group selection governor" circuit according to the invention.
Figs. 48 to 49 show a common circuit for first group selectors.
Fig. 50 shows a penultimate group selector circuit.
Figs. 51 and 52 show a common circuit for penultimate group selectors.
Figs. 53 to 60 show in conjunction with Figs. 13 and 19 a "final selection governor" circuit according to the invention;
Fig. 61 shows a final selector circuit.
Figs. 62 and 63 show the different types of pulse sources used to characterize the outlets' identity and class indication, or a group of outlets' identity.
Fig. 64 shows an example of explorer as used in a call detector (Fig. 3) to scan for free "finder governor" circuits.
Fig. 65 shows as an example a table of pulse source connections for Fig. 64.
Fig. 66 shows an example of explorer as used in a "finder governor" circuit (Fig. 10) for scanning the outlets of call detectors and as an example the table of pulse source connections to said explorer, according to the invention.
Fig. 67 shows an example of explorer as used in a "finder governor" circuit (Fig. 18) to scan for free register circuits and as an example the table of pulse source connections to the latter explorer according to the invention.
Fig. 68 shows an example of explorer as used in a common circuit for cord chooser (Fig. 26) to scan for "finder governor" circuits and as an example the table of pulse source connections to the latter explorer.
Fig. 69 shows an example of explorer for "group selection governor" circuits or "final selection governor" circuits (Fig. 41 or 54) to scan for calling register circuits.
Fig. 70 shows a table giving an example of connections of pulse sources R$dx$, R$ex$, used for the "group selection" or "final selection governor" circuits (Figs. 42 and 55) according to the invention.
Fig. 71 shows a table giving an example of connections of pulse sources R$ax$, R$bx$ used for the "governor" circuits (Figs. 18, 45, 58) according to the invention.
Fig. 72 shows in a table an example of P$d$ sources distribution according to the class of line for connection to the subscriber's line terminals A and B (Fig. 5).
Fig. 73 shows in a table an example of pulse sources distribution to characterize a line identity in a hundred point network.
Fig. 74 shows in tables an example of pulse source distribution for characterizing the first group selectors' identity and class indication in the first group selection stage, at terminals F, G and D, E (Fig. 48).
Fig. 75 shows in a table an example of distribution of the connecting relays in a "group selection governor" between common circuits at first, second, third group selection stages.
Fig. 76 shows a block diagram of the complete system for a local call.
Figs. 77 to 87 show for the circuits illustrated by several drawings how these drawings must be put together.

For reason of convenience and simplification of the description the following terminology and abbreviations have been used:

"A" governor for "finder governor."
"B" governor for "group selection governor."
"C" governor for "final selection governor."
"ESBO" (Electronic Selection and Bar Operation) for "common circuit."
V$a$A1–5 or V$a$A . . . for V$a$A1 to V$a$A5.
H$aar$A/H$adr$A or H$aar$A . . . for H$aar$A to H$adr$A.

In the block diagram shown in Fig. 76:

SL represents a subscriber's line circuit.
D represents a call detector circuit.
F represents a first line finder circuit.
S represents a final selector circuit.
L represents a cord circuit.
A represents a "finder governor" circuit.
B represents a "group selector governor" circuit.
C represents a "final selection governor" circuit.
R represents a register circuit.
P represents a penultimate group selector circuit.
N represents a common circuit for first group selector.
Q represents a common circuit for penultimate group selector.
I represents a common circuit for first line finder.
II represents a common circuit for second line finder.
III represents a common circuit for cord chooser.

As it may be seen on the block diagram, Fig. 76, a letter or a Roman figure has been assigned to each circuit. As several of these circuits comprise similar elements (tubes, relays or relay contacts . . .) having similar functions, similar notations have been used for the elements of said circuits to which was added the letter or Roman figure of the block to which the circuits belong.

For example, V$a$A1 means tube V$a$1 of block A ("A" governor), whereas tube V$a$C2 means tube V$a$2 of block C ("C" governor). Relay O$tr$I means relay O$tr$ of block I (common control circuit for first line finder and final selector) whereas relay O$tr$III means relay O$tr$ of block III (common control circuit for cord chooser), and relay O$tr$N, relay O$tr$ for block N (common control circuit for first group selector). Relay contact S$a$7C means contact S$a$7 of relay S$ar$C of block C ("C" governor).

The establishment of a connection between a calling subscriber and a called subscriber will now be described.

The relayless subscriber's line circuit, shown in Fig. 1, is disclosed in U.S. application Serial No. 167,752, filed June 13, 1950.

The "c" wire of each line together with its associated resistance form part of one branch of a 100-point line explorer having its gates controlled by the 14 sources of the N$a$, N$b$, N$c$ groups shown in Fig. 1.

The common output terminal of the explorer is connected via a tube, functioning as a cathode follower stage, to a call detector circuit which detects the calling condition of a subscriber's line.

The cathode follower tube is shown with its associated circuit in Fig. 5 which represents a part of the ESBO for a group of line finders and final selectors.

The call detector is shown in Figs. 2 and 3.

Each 100-line group is provided with a second 100-point class-of-line explorer having its gates controlled by the 14 sources of the Na, Nb, Nc groups. To each of the 100 branches of this explorer are connected the combination of two out of 11 Nd sources corresponding to the class or the condition of each subscriber's line in the 100-line group, as shown in the table of Fig. 72. Said second explorer is also shown in the part of the first line finder/final selector ESBO circuit in Fig. 5. The different classes of lines and the corresponding pulse sources allocated are shown in the table of Fig. 72.

When a calling subscriber originates a call, the "c" wire which is normally at the battery potential of −48 v. is brought to a potential of about −16 v. by the current flowing in the subscriber's loop. This potential is communicated to the individual branch of the line in the subscriber's line circuit explorer, and a pulse is obtained at the output of said explorer in the time unit which corresponds to the coincidence of the sources Na, Nb, Nc which characterizes the calling line and which occurs once in each cycle of 100 times units (4×5×5).

The common output terminal of said explorer is connected to the grid of the cathode follower tube CT1I in the first line finder/final selector ESBO (Fig. 5). The grid is normally at −40 v., and is raised to −25 v. when the line scanning pulse occurs at the output of the subscriber's line circuit explorer. Tube CT1I becomes conductive and the pulse is reproduced without amplification at its cathode and transmitted to the grid of tube VT1D in the call detector (Fig. 2), said tube being provided to detect the calling pulse.

The grid of tube VT1D is biassed to about −32 v. by the resistance network R10D, R11D, and the cathode to −150 v. through resistor R14D, so that said tube which acts as a cathode follower is conductive. Grid current brings the grid bias to about −30 v., whereas the cathode potential of said tube is at about −24 v.

When normally the cathode of tube CT1I (Fig. 5) is at about −36 v. (in the absence of line pulse), rectifier G2D (Fig. 2) is blocked.

Timing pulses from the source d2, having a negative polarity and a duration of 25 microseconds and being located at the end of each 200 microsecond time units characterizing a pulse from one of the Na, Nb, Nc and Nd sources, are delivered through resistor R12D and are limited to an amplitude of 13 v. by limiting rectifiers G3D, G4D.

These −13 v. pulses are superimposed to the grid bais of −30 v. of tube VT1D, whereby the grid potential drops regularly to −43 v., whereas the cathode potential drops to −37 v.

Rectifier G2D remains blocked as it requires about 3 v. in the right sense between electrodes to become conductive.

If a positive going calling pulse is emitted from the cathode of tube CT1I (Fig. 5) in the absence of a timing pulse d2, rectifier G2D cannot be unblocked.

Only in the coincidence time of the positive going calling pulse and the negative timing pulse d2 at the grid of tube VT1I the potential at the cathode of said tube is lowered so that rectifier G2D is unblocked. The cathode of tube CT1I (Fig. 5) is maintained at a potential of about −33 v. by the current flowing through rectifier G2D, therefore the grid of tube VT1D is negative with respect to the cathode and said tube is driven towards cut off, and a positive pulse of 25 microseconds duration appears at the anode of said tube.

This pulse is transmitted through condenser C1D and rectifier G28D towards the grid of tube FT1D.

The anode of rectifier G28D is biassed to a potential between −125 v. and −137 v. by means of a voltage divider comprising resistors R31D, R32D, R33D, the variable tapping at resistor R32D permitting to adjust said bias between said limits.

This bias is applied to the anode of rectifier G28D via resistor R8D shunted by the D.C. restoring rectifier G1D.

The cathode of rectifier G28D is normally kept at a voltage of −127 v., and the anode bias is adjusted so as to maintain the rectifier in a blocked condition until a positive pulse having an amplitude greater than 3 v. arrives from the anode of tube VT1D, to prevent the anode output pulses of about 3 v. corresponding to the timing pulses d2 (in the absence of calling pulses) from triggering tube FT1D.

The registering of the calling condition is performed by tubes FT1D and FT2D which constitute, together with the anode-to-grid linking circuits, a bistable multivibrator circuit.

In the rest condition tube FT2D is conductive and its anode is at −104 v., tube FT1D is non conductive and its anode is at −35 v.

The tubes FT1D and FT2D have a common cathode which is at about −108 v.

The grid of tube FT2D is at about −105 v.

In this condition rectifier G28D is blocked as explained before.

As soon as a trigger pulse of sufficient amplitude is obtained at the anode of tube VT1D, rectifier G28D is unblocked and the grid of tube FT1D is driven positive thus causing said tube to conduct. The anode potential drop of tube FT1D is transmitted via the potential divider R24D, R22D to the grid of tube FT2D which is driven to cut off. The anode potential of tube FT2D is raised to about −36 v., this rise being transmitted back to the grid of tube FT1D via the voltage divider comprising resistors R21D, R23D. Thus the positive drive at the grid of tube FT1D is continued independently of the trigger pulse, so that tube FT1D remains conducting and tube FT2D remains cut off as long as no restoring pulse is received. Said restoring pulse will be received at the removal of the calling condition after reception of a pulse from a free "A" governor as will be explained later.

The tube CT2D, arranged as a cathode follower, reproduces at its cathode the voltage rise transmitted from the anode of tube FT2D, the potential of said cathode raising from about −90 v. to about −30 v., thus giving an indication of calling condition until a restoring pulse removes said condition.

As shown in simplified form in Fig. 3 of the calling detector circuit an explorer consisting of resistors and rectifier gates controlled by pulse sources not shown and separating rectifiers is provided to scan for a free "A" governor circuit. This explorer contains as many branches as there are "A" governors.

Figure 10:
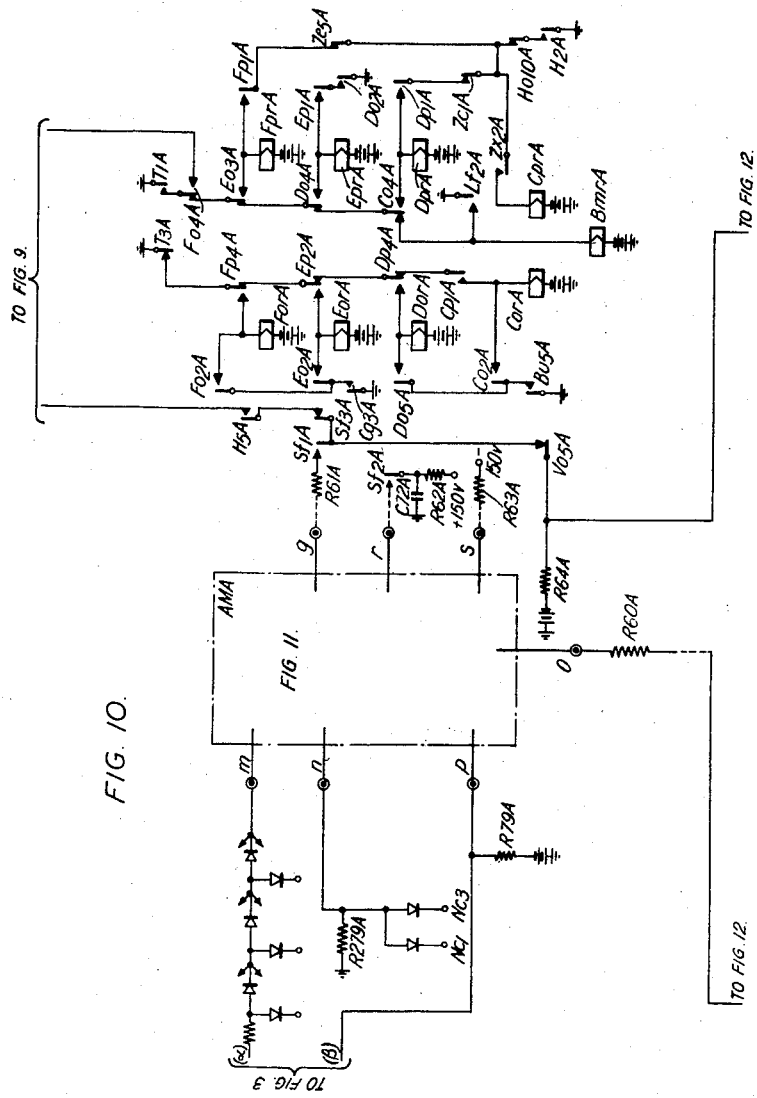
Figure 11:
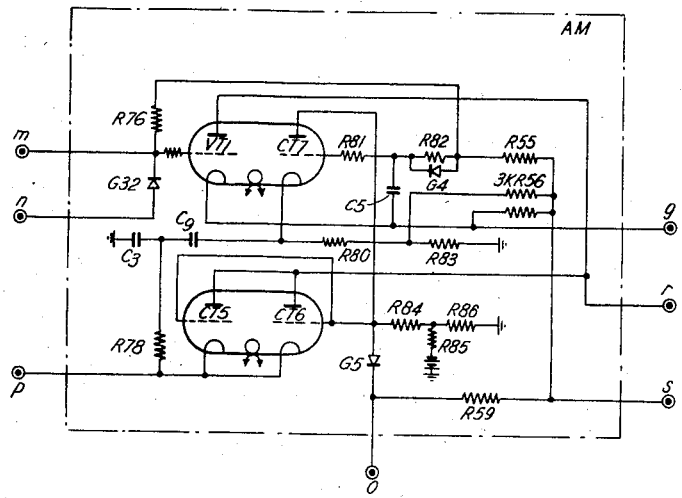

As long as an "A" governor is in the free condition, a potential somewhat higher than −16 v. is obtained at terminal B connected to terminal p of the ambassador circuit AMA of the "A" governor, Fig. 10, whereas if said "A" governor is busy, the potential is about −40 v. as will be explained later with reference to Fig. 11 showing the details of circuit AMA.

The individual gates of the explorer are controlled by pulse sources Nc1-4, Ne1-3, Nd$_{1,2,10,11}$. A more detailed example of said explorer is shown in Fig. 64, whereas the allocated pulse sources for each "A" governor are shown for each pair of call detectors in the table of Fig. 65.

When an "A" governor is free a pulse of about +13 v. is obtained at the common output lead CLD of the explorer in a time unit characterizing the free "A" governor. However, if the call detector is not in the calling condition, the cathode of tube CT2D (Fig. 2) is at a potential of about −90 v., the junction point of resistors R53D, R81D, is about −42 v. and rectifiers G20D and G33D are conductive, thus absorbing the scanning pulses.

If the call detector is in the calling condition, the cathode of tube CT2D is raised at about −30 v. and the junction point of resistors R53D, R81D is raised to about −12 v., the rectifiers G20D and G33D are blocked and the scanning pulses are transmitted unhindered to the grid of tube VT2D (Fig. 3).

Positive timing pulses of 25 microseconds duration are produced by source d3 at the beginning of each time unit of 200 microseconds and applied to the grid of tube VT2D via condenser C16D, and their amplitude is limited to about +12 v. by limting rectifiers G19D, G18D.

The timing pulse brings the grid potential at about −28 v. and the scanning pulse superimposed raises this potential to about −15 v.

The tube VT2D is provided at its cathode with a circuit for automatic bias consisting of condenser C5D and a large leakage resistor R82D. Due to the timing pulses occurring regularly at the grid of tube VT2D, condenser C5D is charged to a potential which is sufficiently high almost to cut off tube VT2D, the discharge of condenser C5D through resistor R82D is compensated at each succeeding pulse by the charge by a small spur of plate current caused by the momentary and slight decrease of the cathode potential with respect to the grid through said discharge.

As the time constant of circuit R82D—C5D is very much higher than the time space between two succeeding tops, these plate current spurs have only a very small amplitude. The resulting drop of anode potential is therefore insignificant and insufficient to unblock rectifier G21D.

However, as soon as a pulse is produced by the explorer indicating a free "A" governor, the timing pulse d3 superimposed on the trailing edge of this pulse will raise the grid voltage of tube VT2D to about −15 v. and said tube will become fully conducting. Accordingly, a large negative pulse is produced at the anode of said tube. This pulse is transmitted through coupling condenser C15D and rectifier G21D now unblocked to the grid of tube CT3D.

Tube CT3D arranged as a cathode follower is normally conducting, its cathode being at a potential of about −31 v. Upon reception at its grid of the negative pulse, this tube is driven towards cut off and its cathode potential decreases, the drop of the cathode potential being transmitted through condenser C14D to the grid of tube FT3D.

Tubes FT3D and FT4D and their associated circuit constitute a cathode coupled monostable multivibrator in which the anode of FT4D is coupled with the grid of FT3D via the intermediate cathode follower tube CT3D. Normally tube FT3D is conducting, whereas tube FT4D is cut off.

The negative pulse transmitted from the cathode of tube CT3D to the grid of tube FT3D drives the latter towards cut off, thus causing the cathode bias of tube FT4D to decrease.

Tube FT4D starts conducting and its further anode potential drop is transmitted again to the grid of tube CT3D, thus causing by cumulative action tubes CT3D, FT4D to be cut off and tube FT4D to be fully conductive. During that time the cathode potential of tube CT3D has dropped from about −31 v. to about −105 v., the anode potential of tube FT3D has risen from about −22 v. to earth while charging condenser C3D (Fig. 2), the anode potential of tube FT4D has dropped from −36 v. to about −117 v.

This condition remains while condenser C14D is slowly charged through resistor R46D until, after a delay of some 300 milliseconds when the grid of tube FT3D has reached a potential of sufficiently high value to unblock said tube, the inverse transition is initiated for tubes FT3D and FT4D thus restoring the initial condition.

When at the beginning of the 300 milliseconds period, the cathode of tube CT3D is driven to a potential of −105 v., rectifier G22D becomes conductive, its anode being at a potential of −36 v. from the anode of tube FT2D (Fig. 2) in view of the calling condition.

A current is thus tapped off from the anode resistor R80D of said tube via rectifier G22D, thus forcing down the anode potential of tube FT2D to its initial value of about −104 v.

Tube FT1D (Fig. 2) is therefore blocked again. The cathode potential of tube CT2D (Fig. 2) drops again to about −90 v. restoring the −42 v. potential at the junction point of resistors R53D, R81D.

The calling condition is removed and the "A" governor scanning pulses are again absorbed by rectifier G33D.

As already explained, the operation of the blocking circuit also causes condenser C3D (Fig. 2) to be charged and the anode of rectifier G3D is raised to ground potential. This means that the limiting circuit consisting of rectifiers G3D, G4D is now biassed to ground potential at both ends and accordingly the timing pulses d2 are prevented from reaching the grid of tube VT1, thus preventing the calling condition to be again given for further calling pulses from the ESBO first line finder/final selector (Fig. 5) until condenser C3D has discharged through gate rectifier G3D and resistor R12D a few milliseconds after the restoration of the blocking circuit (FT3D—FT4D).

Condenser C14D is then permitted to discharge to be sure that the blocking circuit will be in working condition for a next call.

At the establishment of the calling condition the cathode potential of tube CT2D (Fig. 2) raises as explained from about −90 v. to about −30 v. and is restored back to −90 v. at the removal of the calling condition. The positive pulse is transmitted via condenser C19D to the junction point of rectifiers G26D, G25D and resistor R65D. Condenser C17D and rectifier H26D constitute a differentiating circuit.

Rectifier G26D is conductive, its anode being at +150 v. and its cathode at ground.

The positive differentiated pulse corresponding to the leading edge of the pulse (sudden rise of +60 v.) is absorbed by the conducting rectifier G26D.

At the negative spike at the end of the pulse (sudden drop of 60 v.), the potential of the junction point of rectifiers G25D and G26D suddenly drops to about −60 v., thus blocking rectifier G26D and unblocking rectifier G25D. The resulting potential drop in the anode resistor R66D of tube FT5D is transmitted via condenser C21D to the grid of tube FT6D (Fig. 3).

Tubes FT5D and FT6D constitute a cathode coupled monostable multivibrator. Tube FT6D is normally conducting whereas tube FT5D is normally cut-off. This circuit is provided with an output cathode follower tube CT4D and a restoring pulse gating circuit consisting of rectifier G34D, resistor F76D and condenser C18D.

As soon as the negative trigger pulse is transmitted to the grid of the tube FT6D, the plate current of this tube is decreased which also decreases the cathode bias of tube FT5D thus causing the latter tube to draw plate current. A further potential drop is therefore caused in anode resistor R66D which is again transmitted to the grid of tube FT6D, thus further reducing its plate current so that by cumulative action tube FT6D is soon cut off whereas tube FT5D is fully conducting.

This condition prevails until condenser C21D has sufficiently discharged through resistor R68D to permit tube FT6D to conduct once more when the initial condition of the tubes is restored after the inverse transition, i.e. about one time unit (200 microseconds) later.

The restoring stroke is made to begin at the moment when a timing pulse d3 arrives to the anode of tube FT5D via condenser C18D and rectifier G34D, and thence through condenser C21D arrives at the grid of tube FT6D.

It must be noted that normally the rectifier G34D is blocked, its cathode being at −13 v. whereas its anode is at about −75 v. from potentiometer R74D, R75D. Further, the timing pulses d3 of about 36 v. amplitude cannot unblock the rectifier.

When tube FT5D is conductive, the cathode potential of rectifier G34D is lowered, its anode potential is raised by the cathode output of tube CT4D which is transmitted via condenser C20D and causes the charging of condenser C18D via resistor R76, so that the blocking bias of rectifier G34D is reduced to zero thus permitting the timing pulse d3 to pass through it.

It must be recalled that the potential drop at the cathode of tube CT2D is produced at the moment when the pulse from source d3 is being transmitted through condenser C16D and triggers the blocking multivibrator FT3D—FT4D. It is exactly at this moment that the pulse generating multivibrator FT5D—FT6D is also triggered. On the other hand, the restoring of the latter multivibrator occurs at the following d3 timing pulse.

The positive pulse of about 39 v. amplitude produced at the anode of tube FT6D starts at the beginning of a time unit and ends at the beginning of the next time unit, it has therefore a duration of exactly one time unit.

This pulse is transmitted via condenser C19D and resistor R71D to the grid of tube CT4D which consequently produces a similar pulse at its cathode output, which is transmitted on the one hand to the stop-pulse gating circuit, as already explained, and on the other hand to the "A" governor which has been found free in order to seize same.

Before describing the seizure of the "A" governor, it must be noted that after the emission of the seizure pulse to the free "A" governor, the tube (CT2D) and the seizure pulse generator (FT5D—FT6D) remain in their normal condition, whereas only the blocking circuit (FT3D—FT4D) remains in the off-normal condition during about 300 milliseconds.

At the end of these 300 milliseconds period, this circuit restores and after condenser C3D has lost its charge, the call detector is again ready to operate in the way described. However, before the blocking circuit will have time to restore, the "A" governor engaged will have established a physical connection towards the first line finder/final selector ESBO circuit associated with the call detector and as it will be seen an earth is given from Fig. 8 ("A" governor) via back contact HO5A, contact 7, the corresponding wire in Figs. 5, 6, 7 (ESBO first line finder/final selector) to the junction point of rectifier G3D and condenser C3D (Fig. 2).

This earth potential will prevent condenser C3D from discharging even after the return to normal of the blocking circuit. However, as soon as contact 7 will have been opened again in the "A" governor, Fig. 8, i.e. when the calling subscriber is switched through, said earth is withdrawn and the call detector is again ready to detect a new call.

In the free "A" governor found by the call detector, the seizure is achieved by means of the AMA circuit of Fig. 10 referred to as "ambassador circuit."

In order that all call detectors may have access to all "A" governors, these circuits are arranged for simultaneous hunting on a time division basis.

The ambassador contains the electronic equipment required for:

(1) Signalling the free or busy condition of the "A" governor to all call detectors;

(2) Receiving in a selective way the seizure pulse emitted by any one call detector in response to the free condition signal, amplifying said pulse and passing it to the detecting equipment in the "A" governor proper;

(3) Removing the free condition of the "A" governor as soon as a seizure pulse has been received.

The ambassador of Fig. 10, shown in detail in Fig. 11, is associated with an explorer shown in a simplified form to the left thereof and having as many branches as there are call detectors. Each branch is connected to the seizure pulse output (terminal a) of one of the call detectors. Reference pulse sources used to control each branch of this explorer are of the N-type, and they are chosen in relation to the ones used to control the scanning for free "A" governor circuits in the respective call detectors, in such a way that the seizure pulse emitted by any one call detector, upon finding a free governor is selectively accepted by this particular "A" governor, whereas it is rejected by all others.

A more detailed form of such an explorer is shown together with a table of source connections in Fig. 66, as an example.

In Fig. 11, valve VT1 serves to receive and amplify the seizure pulses. Valves CT5, CT6 control the potential offered to the call detectors corresponding to the free or busy condition of the "A" governor. Valve CT7 serves to detect the reception of a seizure pulse and to block tubes CT5 and CT6 in immediate response thereto.

Triodes CT5 and CT6 which are two sections of one double triode, have their corresponding electrodes strapped together so they act as one triode, they are further arranged as a cathode follower (resistance R79A, Fig. 10). The parallel arrangement of triodes CT5 and CT6 has been provided for reasons of power consumption.

Normally, as long as the "A" governor is free, the common grid potential of CT5 and CT6 is maintained at −15 v. by voltage divider R85, R86 between the negative pole of the −48 v. battery and earth. Both tubes CT5 and CT6 are therefore conducting and their plate currents flowing into resistor R79A (Fig. 10) keep their common cathode at a potential which is 2.5 v. less negative and this potential, which is applied via terminal p to a branch of the free governor explorer in each call detector, indicates that the governor is available.

The common point m of the seizure pulse explorer (Fig. 10) is connected to the gride of tube VT1 in circuit AMA (Fig. 11) which is arranged as a cathode follower with its anode connected to +150 v. through terminal v, contact Sf2A of normally operated relay SfrA (Fig. 8) and resistor R62A and the cathode via the 12,000 ohms load resistor R57 to −150 v. at terminal s. As long as no seizure pulse arrives the grid is clamped at a potential of −40 v. derived from the control sources Nc1, Nc3 and resistor R279A via terminal n through clamping rectifier G32 (Fig. 11). In this condition about 10 milliamps. plate current flows in tube VT1 and the cathode is about −36 v.

A seizure pulse of about 13 v. amplitude appearing at the common point m of the explorer blocks rectifier G32 and raises the cathode potential by about 12 v.

Pulse sources Nc1 and Nc3 are used to keep the grid of tube VT1 at a potential of −40 v. which corresponds to the common base level of these pulses.

CT7 is a threshold valve having its anode connected to the grides of tubes CT5 and CT6 and the grid is normally at −148 v. whereas the cathode is kept at a potential of about −134 v. produced by the voltage divider R56, R83 between the −150 v. source and ground. This means that tube CT7 is normally cut off, but as soon as a positive pulse appears at the cathode of tube VT1, this pulse is transmitted through the coupling condenser C5 to the grid of tube CT7 and it raises its potential sufficiently to make it conductive. The resulting voltage drop in the anode resistors R86, R84 is impressed on the grids of CT5 and CT6 and therefore also appears at the cathodes of this double tube. Thence it is transmitted through resistor R78 and coupling condenser C9 to the cathode of tube CT7. This causes the plate current in this tube to increase even more and the anode potential to drop even faster. The final result is that CT5 and CT6 are completely cut off leaving the cathode potential at about −41 v.

The free potential is thus removed at terminal p (Fig. 10) and this condition is maintained while condenser C9 is charged through resistors R80 and R78 in series.

While this charging is going on, the grid and cathode of tube CT7 rise from about −162 v. towards −150 v. and as soon as this potential is reached, the plate current in CT7 diminishes, causing the anode potential to rise. This rise tends to render again conductive tubes CT5 and CT6. The circuit then quickly restores to normal again.

The time constant which controls the time space between the triggering and the restoring of this multivibrator circuit is relatively short, so that the circuit, if left alone, would restore after a few time units. However, provision has been made of a gate rectifier G5 by which the multivibrator may be kept in its off normal condition by applying a sufficiently negative potential to the cathode of said gate rectifier. Normally, the cathode of G5 is kept at ground potential by which G5 is blocked, but if this potential is lowered below −50 v., which happens for instance when the impulse has fired tube BAVA (Fig. 14) which lowers the potential at rest contacts Pa7A, Bm3A, the grids of tube CT5—CT6 cannot be raised above −48 v. and the tubes are prevented from becoming fully conductive again. It is to be noted that tube BAVA fires before the recovery of the multivibrator, as soon as the seizure impulse is regenerated.

In this way, the busy condition can be maintained by a sufficiently negative potential applied to G5, but this can also be achieved by cutting the +150 v. supply lead at terminal r by means of break contact Sf2A (Fig. 10).

For instance, it will be seen that when Bm3A is opened and the tube BAVA releases the negative potential at the cathode of G5 disappears, the blocking condition is maintained by release of the normally operated relay SfrA (contact Sf2A) prior to the operation of relay BmrA.

Relay AmrA in the circuit of Fig. 18 is always operated for failure control of the register scanning circuit. Valve CT8A is normally conductive and it is its anode current which operates relay AmrA, unless there is a failure in which case tube CT8A is cut off and relay AmrA falls back to put the circuit out of service.

Figure 8:
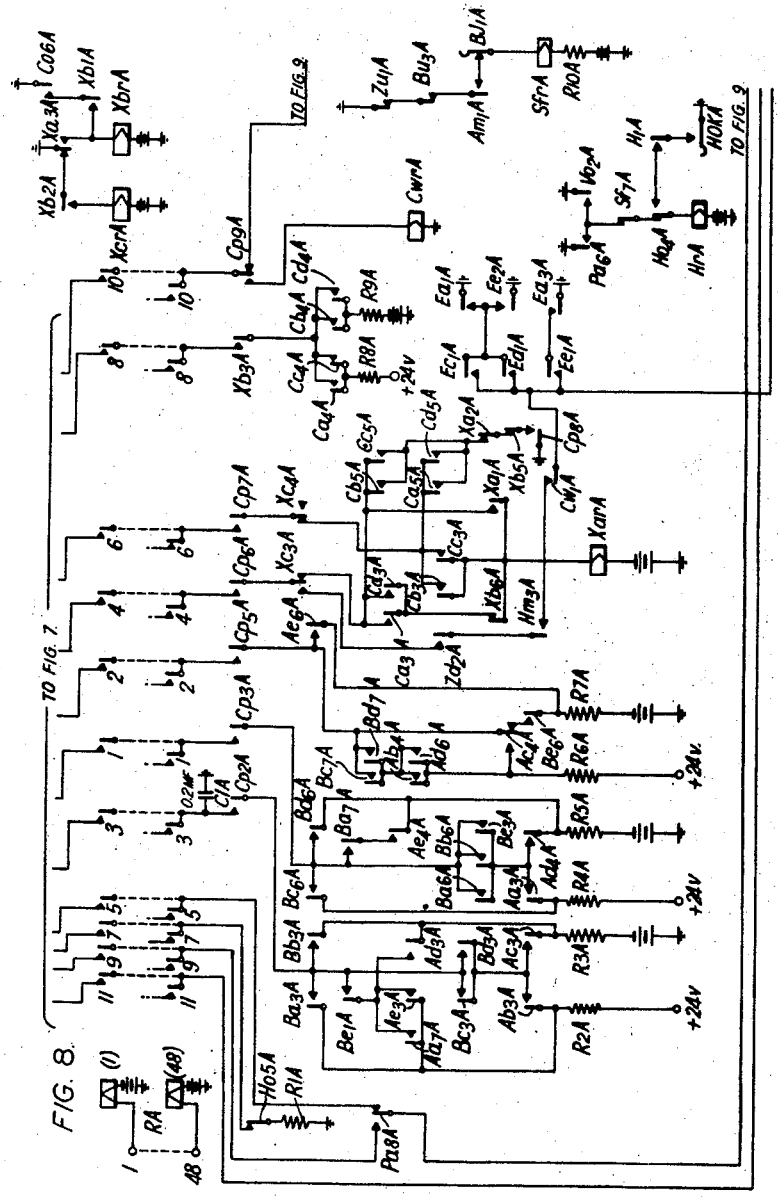

AmrA (Fig. 18) being normally operated, relays ZurA and BurA (Fig. 15) being released (ZurA not shown is used for supply control), relay SfrA is normally operated (Fig. 8). As relay VorA (Fig. 14) is not operated, the seizure impulse at the ouput terminal q of the call detector ambassador (Fig. 10) is fed to the comparator regenerator CRG1A (Fig. 12) via make contact Sf1A of relay SfrA, rest contact Vo5A of relay VorA, and terminal U1A. Fig. 13 shows the details of such a comparator which is used in various circuits of the exchange.

For this reason it is labelled CRG in Fig. 13 instead of CRG1A in Fig 12 and the corresponding terminals have the suffix "1A" dropped as well.

Such a comparator regenerator has an input for signal impulses and an input for reference pulses, its purpose is to compare incoming signal pulses with the reference pulses and to generate a fresh pulse upon coincidence of signal pulses and the reference pulses.

The regenerated pulse is located in the time unit following the one in which the coincidence occurs and is transmitted to a recorder where its time position is detected and stored.

Such comparator regenerators usually comprise special blocking tubes which when lit disable the corresponding regenerator as soon as the first pulse is issued from said regenerator to avoid that more than one pulse is successively transmitted to the recorder from said regenerator.

In the present case CT1 (Fig. 13) detects the coincidence between the reference pulse and a 25 microsecs. timing pulse delivered by source d3 occurring at the beginning of each time unit. In case of coincidence this tube produces a short trigger pulse at the beginning of the time unit following the one in which the reference pulse is located. VT2 detects the coincidence between an incoming signal pulse and the output pulse of tube CT1.

Triodes FT1 and FT2 form a pulse generator of which the output is amplified by tube CT2.

Tube CT1 is a threshold valve which has its cathode biassed to about 10 v. by means of the voltage divider R66, R67 between ground and +150 v.

The grid of this tube is normally biassed by the source of reference pulses to a potential of −29 v. which means that the tube is cut off and that clamping rectifier G29 is blocked (the cathode of rectifier G29 being connected to earth).

Reference pulses applied via terminal v raise the potential at the anode of said rectifier sufficiently to unblock it. The grid of CT1 thus rises to ground potential which is insufficient to make tube CT1 conducting.

Positive pulses of 25/μsec. width and of about 40 v. amplitude are supplied by sources d3 at the beginning of each time unit and applied to the primary winding of transformer CALA (1:1) through condenser C71A (Fig. 20).

The pulses appearing at the output of this transformer are superimposed on a bias of −24 v. provided for by the voltage divider R271A, R272A between ground and −48 v. As the transformed level output has already been decreased by 5 v. owing to the fact that the d3 pulses only last 25 microseconds i.e. ⅛ of a time unit of 200 microseconds $$\left(\text{Shift}\frac{-40 \text{ v.}}{8}=-5 \text{ v.}\right)$$

their base level is at −29 v. whereas their tops are at +11 v. These pulses are applied via terminal w1A through resistor R90 and condenser C16 to the grid of tube CT1 (Fig. 13).

A shunt rectifier G30 is provided to limit the amplitude of these pulses to 29 v. Its cathode is normally at ground potential via terminal y1A, back contact Bm3A, back contact Pa7A (Fig. 14), and this means that the rectifier is blocked except for the pulses arriving through resistor R90. These pulses unblock the rectifier and prevent the potential to rise above ground.

The d3 pulses arriving at the grid of CT1 through condenser C16 raise the grid potential from −29 v. to ground if no reference pulses are present. It is to be noted that in the absence of reference pulses, the grid of tube CT1 is at −29 v. owing to the gating arrangement of the coincidence network on the left of Fig. 12 which controls the potential at terminal v1A.

If the reference pulse arrives, it charges condenser C16 so that the grid of CT1 is about ground potential and the d3 pulse arriving through condenser C16 at the beginning of next time unit will raise said grid to a sufficiently high potential so as to render tube CT1 conductive.

Figure 14:
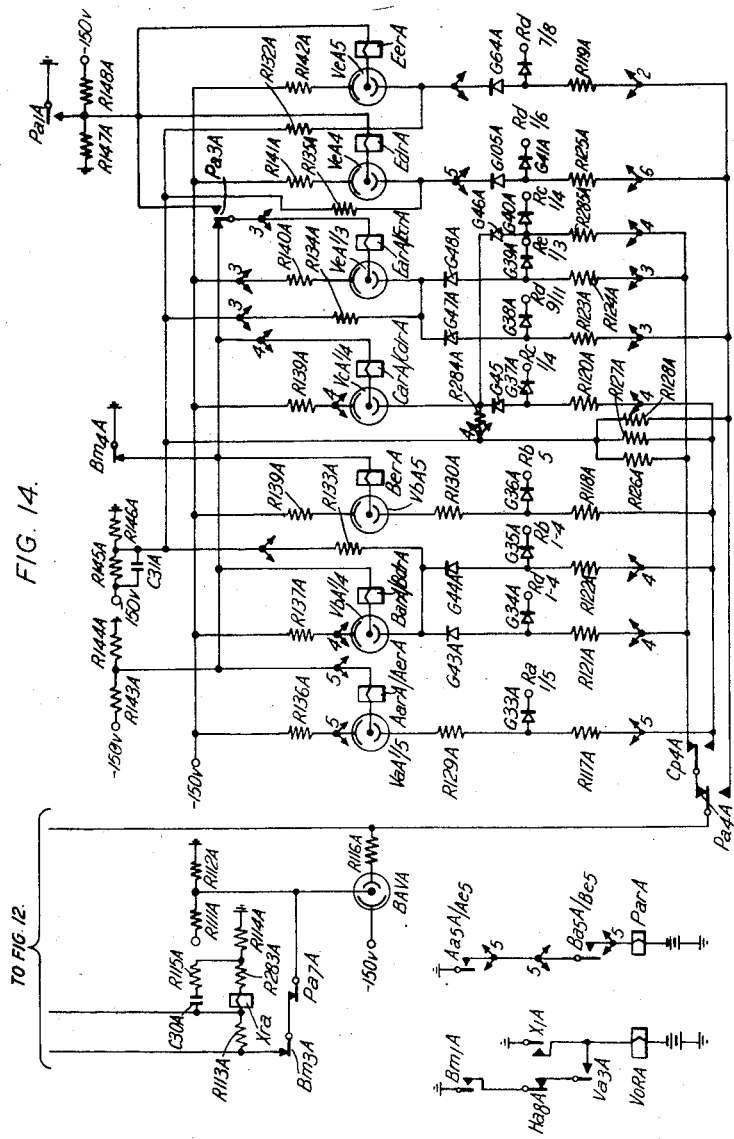

CT1 can also become conductive upon arrival of a d3 pulse in the absence of reference pulses, if C16 has been previously charged from the earth applied by the rest contact Pa9A of relay ParA (Fig. 14).

When pulse d3 is effective a short trigger pulse of 24 v. amplitude is produced at the cathode of tube CT1 and this pulse is applied through condenser C18 to the grid of tube VT2. The cathode of tube VT2 is polarized to about −5 v. by means of the potentiometer: R69A, R274A (Fig. 12).

As long as the comparator generator is not in use, the grid of tube VT2 is biassed to −48 v., through terminal u1A and leakage resistor R64A (Fig. 10).

As soon, however, as the circuit supplying signal pulses, is connected to the input, the pulse base level rises to about −36 v. and the grid potential charges to −25 v. during each signal pulse (in charging C18).

This in itself cannot unblock tube VT2 unless a short trigger pulse is received from the cathode of tube CT1 via charged condenser C18 in the time unit following the one in which the signal pulse is located. In this case the grid of tube VT2 is unblocked for a short interval. The resulting drop of anode potential is transmitted through condenser C21 to the grid of tube FT2.

Alone the trigger pulse from cathode of tube CT1 cannot unblock tube VT2.

The tubes FT1 and FT2 constitute together a cathode coupled monostable multivibrator and tube FT2 is normally conductive, whereas tube FT1 is normally cut off.

The anode load of tube FT2 consists of resistors R99 and R98 in series. As soon as a negative pulse of sufficient amplitude reaches the grid of FT2, the plate current of FT2 decreases as well as the cathode bias of tube FT1; said tube FT1 becomes thus conductive. The anode potential drop of tube FT1 transmitted via condenser C21 to the grid of tube FT2 causes the latter to become still less conductive and by cumulative effect. FT2 is soon completely cut off whereas FT1 is fully conducting.

This condition remains while condenser C21 is charged through resistor R97 causing the grid potential of FT2 to rise exponentially until it reaches a value for which FT2 starts again to conduct, which by a reverse cumulative process restores the initial condition with FT2 fully conducting, FT1 cut off.

The exact moment at which tube FT2 is again unblocked is secured by a stop pulse from source $d2$ which is injected at the grid of tube FT1 through condenser C22.

The occurrence of such a pulse decreases the plate current of FT1 and thus initiates the reversal.

As a pulse $d3$ arrives via terminal $w1A$ at the beginning of a time unit, and a pulse $d2$, 25 microseconds before the end of the same time unit, the regenerated positive impulse at the anode of FT2 has a duration of exactly 175 microseconds and is located at the beginning of the time unit following the one in which the signal pulse and the reference pulse occur simultaneously.

This pulse of about 90 v. amplitude is transmitted via condenser C25 to the grid of tube CF2 which is biased to about —122 v. by means of the voltage divider R100 and R101.

The tube CT2 is arranged as a cathode follower and the pulse at the grid is reproduced at the cathode output between the potential levels of —107 v. and —27 v. The output pulse is transmitted to the recorder and tube BAVA shown in Fig. 14.

Coming back to the seizure impulse from Fig. 11, it is applied to grid of tube VT2, Fig. 13, via terminal $u1A$ and as relay ParA is not operated and the contact Pa9A closed, tube CT1 can produce without reference sources a short trigger pulse, its grid being initially at earth potential. Therefore a fresh pulse is regenerated in the time unit following the one of the seizure impulse.

From the cathode of tube CT2 the regenerated pulse is applied via terminal $x1A$ to the recorder (Fig. 14) via back contact Pa4A. This recorder works in a manner already described in U. S. application Serial No. 175,704, filed July 25, 1950.

According to the call detector which has seized the "A" governor the seizure impulse coincides with three particular pulses: one pulse of group Rb1–4, one pulse of group Rc1–4, one pulse of group Re1–3. As these pulses are respectively applied to the corresponding tube of the group VbA1–4, of the group VcA1–4, of the group VeA1–3, one tube is fired in each group, the combination of tubes fired being characteristic of the seizure impulse and therefore of the call detector which has seized the "A" governor.

The three groups of tubes mentioned form a total of 11 tubes allowing $4 \times 4 \times 3 = 48$ combinations, corresponding to 48 call detectors for 4800 subscriber lines.

To the group of 4 tubes VbA1–4 correspond the anode relays BarA—BdrA.

To the group of 4 tubes VcA1–4 correspond the anode relays CarA—CdrA.

To the group of 3 tubes VeA1–3 correspond the anode relays EarA—EcrA.

By their front contacts Ba1A—Bd1A, relays BarA—BdrA operate relays RdarA—RddrA.

By their front contacts Ca1A—Cd1A, relays CarA—CdrA operate relays RcarA—RcdrA.

By their front contacts Ea2A—Ec2A, relays EarA—EcrA operate relays RearA—RecrA.

So that one relay in each of the groups RdarA—RddrA, RcarA—RcdrA, RearA—RecrA is operated to characterize the call detector which has seized the "A" governor.

At the same time the seizure impulse fires tube BAVA, relay XrA operates in a circuit from ground via resistors R114A, R283A, winding of relay XrA, resistor R113A, back contact Bm3A, back contact Pa7A, anode to cathode space of tube BAVA to —150 v. The potential at the junction point between relay XrA and resistor R113A which is normally at ground, then drops to about —45 v. In the comparator regenerator (Fig. 13), rectifier G30 is therefore made conductive and absorbs all the $d3$ timing pulses which can no longer reach the grid of tube CT1 therein, so that said regenerator is disabled as soon and as long as tube BAVA remains lit.

Relay XrA being operated, relay VorA (Fig. 14) operates from battery via its own winding and the make contact X1A of relay XrA.

The connection between the ambassador AMA (Fig. 10) and the comparator regenerator CRG1A (Fig. 12) is thus opened at contact Vo5A.

Relay BurA operates via make contact Vo1A (Fig. 15), and relay SfrA (Fig. 8) releases by opening of its operating circuit at contact Bu3A.

The busy condition of the "A" governor is maintained by the ambassador, the supply of +150 v. being suppressed therein by the front contact Sf2A (Fig. 10) at terminal $r$ while the connection between ambassador and comparator regenerator is further opened at front contact Sf1A (Fig. 10).

Relay HrA (Fig. 8) operates via back contact Ho4A, back contact Sf7A, front contact Vo2A.

Relay ZxrA (Fig. 15) can not yet operate from the earth via make contact H3A, as it is short circuited by the direct earth via the front contacts of the anode relays of the lit recording tubes and its own corresponding back contacts.

Figure 15:
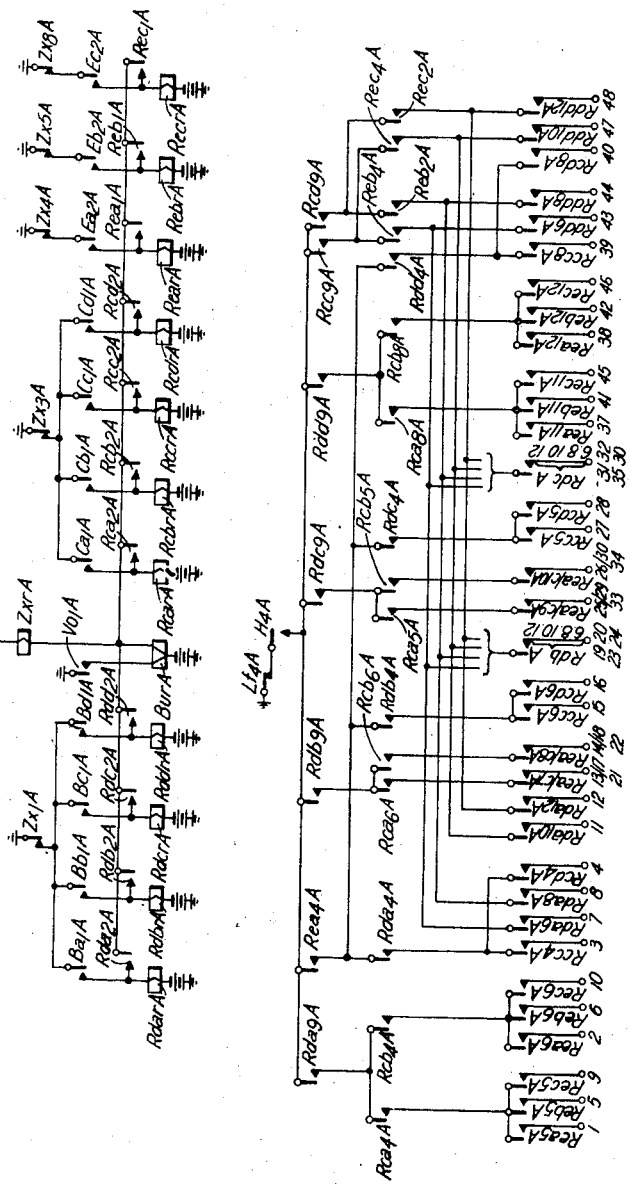

Resulting from the operation of one of the relays RdarA—RddrA, of one of the relays RcarA—RcdrA, of one of the relays Rear—ReceA, one of the 48 connecting relays RA1—RA48 (Fig. 8) is operated via one of the terminals of the pyramid of contacts Fig. 15 from an earth via back contact Lf4A of released relay LfrA, front contact H4A of operated relay Hr, the combination of contacts of the anode relays of the recorder fired tubes.

The relay which has been operated amongst relays RA1—RA48 correspond therefore to the call detector which has seized the "A" governor and therefore to the ESBO 1st line finder associated with the corresponding 1st line finder group.

The "A" governor is partially connected to said ESBO for 1st line finder (Fig. 8) via contacts 5, 7, 9, 11, whereas at contacts 1, 2, 3, 4, 6, 8, 10 the connection of the "A" governor to the corresponding wires of said ESBO are only prepared.

A sequence test has to be performed to verify if said ESBO is free. In the circuit of this ESBO, Fig. 7, the free condition is given by a potential of +24 v. applied via the following circuit: contact Cf3I of operated relay CfrI via back relay contacts Tf3I, Of3I, MCI, Af3I, in the ESBO, terminal 10 (Fig. 8), back contact Cp9A (Fig. 8), back contact Co3A (Fig. 17), back contact Ho9A to the sequence test circuit STA (Fig. 18) in the "A" governor.

The sequence test circuit serves to test the free or busy condition of a circuit wanted by the "A" governor, i.e. to ensure whether the wanted ESBO is not already engaged by another "A" governor.

Upon finding the ESBO free, the sequence test circuit prevents another "A" governor to engage later said ESBO, as it will be explained further on.

In order to avoid that 2 or more different A governors may test the condition of the same ESBO at exactly the same moment provision is made for a time division between all governor circuits in the exchange. This means that each governor has a characteristic time position allocated to it in which it can make a sequence test.

The sequence test circuit shown in block STA of Fig. 18 is detailed in Fig. 19.

Since, as it will be seen later, the very same sequence test circuits are used in the "B" and "C" governors (block STB, Fig. 45, block STC, Fig. 58) only one circuit is shown in Fig. 19 and called ST.

Figure 45:
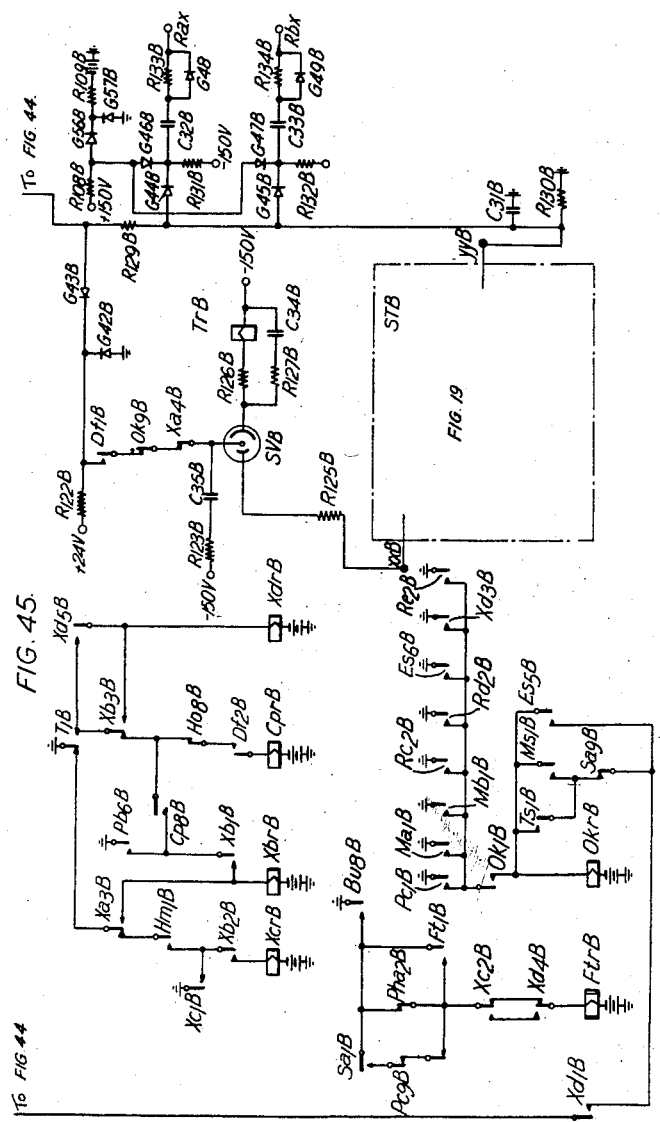
Figure 58:
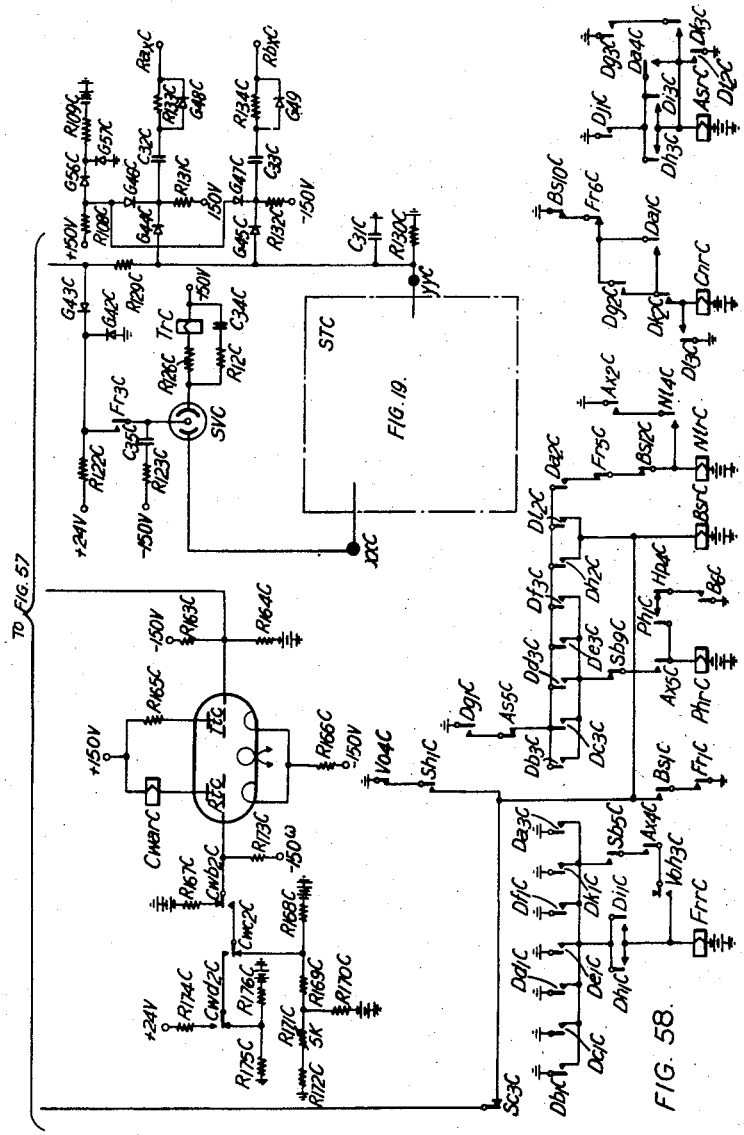

It will thus be clearly understood that the terminals marked xx, yy in Fig. 19 are to be taken as terminals xxA, yyA in Fig. 18 (for an "A" governor), as terminals xxB, yyB in Fig. 45 (for a "B" governor), as terminals xxC, yyC in Fig. 58 (for a "C" governor).

The test potential connected from the ESBO first line finder via contact Ho9A is applied to the anode of rectifier G51A and also to resistor R169A (Fig. 18). The latter is a part of a gating circuit which comprises gates G52A and G53A. These gates are controlled by one pulse Rax of the Ra sources, and one pulse Rbx of the Rb sources respectively.

As long as no pulse arrives the gates G52A and G53A are conductive as their anodes are kept at ground potential by means of the gating network comprising resistors R206A, R173A, R170A, rectifiers G110A, G111A, G92A, G93A.

In this network a current of 3mA flows from +150 v. through resistor R206A, this current divides into: 2mA through rectifier G110A towards the negative battery of −48 v. via resistor R210A, and 0.5 ma. in each of the two branches in parallel to −150 v. comprising rectifier G93A and resistor R173A in series for the first branch, rectifier G92A and resistor R170A in series for the second branch.

As all the rectifiers are conductive the potential at the cathodes of gates G52A and G53A are determined by the ground connected to rectifier G111A. In this condition therefore, the grid of tube OT1 (Fig. 19) cannot rise above ground potential.

A pulse Rax connected to resistor R171A will be transmitted through condenser C44A and will block rectifiers G52A and G92A.

Likewise a pulse Rbx connected to resistor R172A will be transmitted through rectifiers G53A and G93A.

Only when both Rax and Rbx coincide the gates G52A and G53A are blocked simultaneously and the +24 v. potential applied through resistor R169A will be able to raise the potential of the grid of OT1 (Fig. 19) through resistor R211 to about +16 v. (via terminal yyA, Fig. 18) in charging condenser C41.

This coincidence of pulses Rax, Rbx characterizes the time position allocated to the "A" governor for the sequence test.

The cathode of tube OT1 is biassed to about +22 v. by means of the network consisting of resistors R166, R213, R212, respectively connected to +24 v., earth and +150 v.

Therefore the coincidence of the +24 v. potential of the ESBO, the Rax pulse and the Rbx pulse is not sufficient to make tube OT1 conducting.

The distribution of Rax, Rbx sources for each "A" governor is shown as an example in the table of Fig. 71.

Timing pulses from source d3 are periodically supplied at the beginning of each time unit through condenser C38, they are limited by means of the network consisting of the series resistor R216 and limiting rectifiers G57 and G58.

The anode of rectifier G57 is connected to earth whereas the cathode of rectifier G58 is biassed to +12 v. provided by the voltage divider R175, R217 between +24 v. and earth.

The timing pulses are thus limited to an amplitude of about 12 v. and these limited pulses are applied via condenser C41 to the grid of tube OT1.

If said condenser has been already charged in the preceding time unit when a concidence occurs between a 24 v. potential in the ESBO, the pulse Rax and the pulse Rbx, the timing pulse d3 will raise the grid potential of tube OT1 to about +28 v. and render this tube conductive.

As soon as this happens, a voltage drop occurs at the anodes of tubes OT1 and OT2 and the voltage across terminals 1 and 2 of the primary winding of transformer TR induces in the secondary winding 3—4 a voltage of such a direction that the grid potential of tube OT2 is increased.

This grid is normally biassed to about −36 v. by means of the voltage divider R167A, R208A, between −48 v. and earth. As the cathode of said tube is at ground potential the tube is therefore normally cut off.

If the voltage induced at the secondary winding of transformer TR is of sufficient amplitude, tube OT2 is unblocked which causes a further anode drop and a greater potential rise at the grid of tube OT2 and this results in the generation of a pulse as described for the blocking oscillator in U.S. applications Serial No. 175,704, filed July 25, 1950, and Serial No. 205,917, filed January 13, 1951.

In this way, a positive pulse of at least 60 v. is produced at the grid of tube OT2, this pulse is transmitted via condenser C34, terminal xxA and resistor R162A towards the trigger electrode of cold cathode tube SVA (Fig. 18).

The cathode of this tube is connected to −150 v. via resistor R163A and winding of relay TrA and the trigger electrode is normally biassed at −110 v. provided for by a voltage divider R273A, R209A, between earth and −150 v.

In the absence of pulse from tube OT2 (Fig. 19), the trigger electrode of tube SVA has therefore a +40 v. bias with respect to the cathode and a pulse from the blocking oscillator will thus be able to fire tube SVA.

When tube SVA (Fig. 18) is fired a current of 15 ma. flows through the cathode relay TrA, of which 2.4 ma. is supplied from the +24 v. source via resistor R159A, back relay contacts Fp10A, Ep5A, Dp10A, Cp10A, front relay contact Bu2A, of which 7.8 ma. is supplied from ground via rectifier G50A and the same relay contacts, the remaining part 4.8 ma. being supplied by the ESBO test resistor via rectifier G51A.

Consequently, the potential of the test resistor in the ESBO (Fig. 7) is lowered to ground potential due to the 24 v. (2.4 ma.×10K) drop in resistor R159A, thus preventing the sequence test circuits from operating in the other "A" governors trying to engage the same ESBO at the same moment.

Relay TrA is operated in the cathode circuit of tube SVA.

An earth is thus given to operate relay BmrA (Fig. 10) via front relay contact T1A and back relay contacts: Fo4A, Eo3A, Do4A, Co4A.

The operation of relay BmrA extinguishes all the tubes in the lit condition in the recorder by opening of contact Bm4A, and the corresponding anode relays release. By opening of relay contact Bm3A, relay XrA releases and tube BAVA extinguishes (Fig. 14).

By the opening of the contact of the three anode relays, one in the group Ba1A . . . , the second in the group CalA . . . ; the third in the group Ea2A . . . , the direct earths short circuiting relay ZxrA (Fig. 15) are withdrawn and relay ZxrA operates via make contact H3A thus maintaining an operation circuit for the three relays of respective groups RdarA . . . , RcarA . . . , RearA . . . via their own make contact and the relay ZxrA in series to earth.

The release of relay XrA does not release relay VorA, as a blocking circuit is closed for said relay via its own make contact Vo3A, back contact Ho8A, and front contact Bm1A.

Therefore relay BurA remains operated.

Relay CprA (Fig. 10) operates from battery via front relay contact Zx2A, back relay contact Ho10A, front relay contact H2A to earth, and by its own front contacts Cp2A, Cp3A . . . Cp9A (Fig. 8) completes the connection of the "A" governor to the required ESBO first line finder as prepared by the connecting relay RAn in the group RA1-RA48.

By opening of contact Cp10A tube SVA (Fig. 18) is extinguished and relay TrA releases, the anode of said tube being brought to a negative potential. The release of relay TrA causes the release of relay BmrA (Fig. 10) by opening of contact T1A. The opening of contact Bm1A causes the release of relay VorA (Fig. 14), but relay BurA remains operated in series with relay ZxrA (Fig. 15).

Relay CorA (Fig. 10) operates from battery via front contact CplA, back contacts Dp4A, Ep2A, Fp4A, T3A to earth.

Simultaneously with the sequence test for the free condition of the required ESBO first line finder and the connection to said ESBO, the register scanning and the cord circuit scanning occur.

The 48 first line finders groups for the 4800 lines are divided in two subgroups A and B serving in multiple said 4800 lines.

The "A" governor must start to hunt for a free register.

The cord circuits are divided in groups, each group serving 1200 lines, each of the cord circuit groups is subdivided in two subgroups A. and B. For an exchange of 10,000 lines 8 groups can be used serving 1200 lines, one group serving 400 lines.

In the example chosen of an exchange of 4800 lines, there are four groups of 1200 lines subdivided in subgroups A and B.

The cord choosers and the registers groups are also subdivided in subgroups A and B, themselves divided in further subgroups A1, A2, B1, B2.

Only a free register of subgroup A or B can be seized by the "A" governor if there are a free ESBO for cord chooser, free cord circuits, free first line finders of the same subgroup A or B, and if the free cord circuits of same subgroup belong to the cord group of 1200 lines serving the calling subscriber's line.

Figure 32:
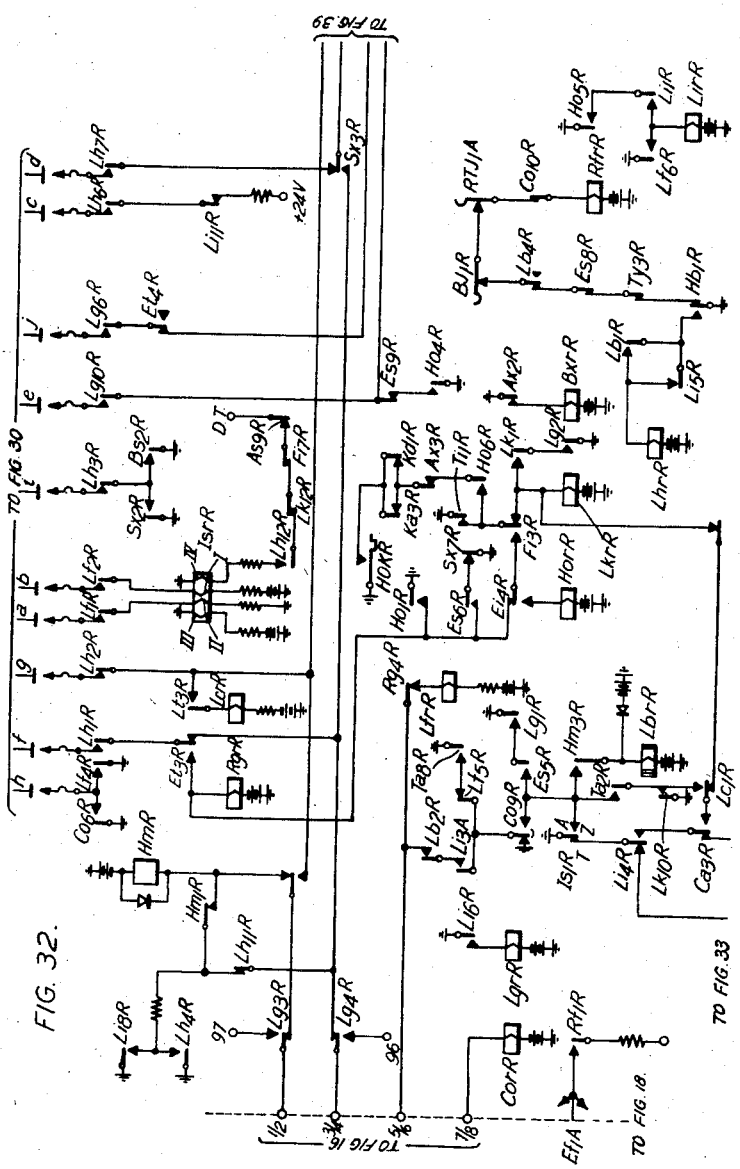

If a register is free, a potential of +24 v. is applied to the corresponding lead EF1A (Fig. 18) via front relay contact of operated relay RfrR in the register circuit (Fig. 32). If a register is busy, a ground potential is connected to the corresponding lead EF1A.

In the "A" governor the scanning of all the register leads EF1A is done via the explorer shown in simplified form in Fig. 18.

A detailed example of such an explorer is shown in Fig. 67. The explorer therein is provided to scan 24 registers by any of 8 "A" governors.

Each register subgroup A1, A2, B1, B2 comprises six registers.

The scanner comprises 40 branches in 8 groups of five multiples controlled by source Pb1-5.

To four of said groups of five multiples are connected respectively five registers of subgroup A1, five registers of subgroup A2, five registers of subgroup B1, five registers of subgroup B2.

In the four other groups of five multiples with terminals $a'/e'$ are connected respectively the sixth registers of groups A1, A2, B1, B2, at the terminal indicated by the table according to the hunting "A" governor.

The eight common leads for the eight groups of five multiples are controlled by pulse sources Pa1-5, Pc1-4 according to the indication of source connection to terminals $a/d$ shown in the table in correlation with the hunting "A" governor.

Terminals marked a1, a2, b1, b2 are respectively connected to the ESBO's for cord chooser A1, A2, B1, B2 so that a register circuit can only be associated with an ESBO for cord chooser of the same subgroup and to a cord circuit serving the required group of 1200 lines, the register scanning pulses being absorbed via the corresponding rectifiers GA1/8 if said ESBO and said cord circuit are engaged as will be explained in conjunction with Fig. 26.

It is to be noted that rectifiers GA1/8 are represented in a simplified manner by rectifier GA in Fig. 18 ("A" governor circuit), whereas the 40 register branch terminals 1-5, . . . $a'-e'$ are represented in Fig. 18 by terminal EF1A.

Figure 26:
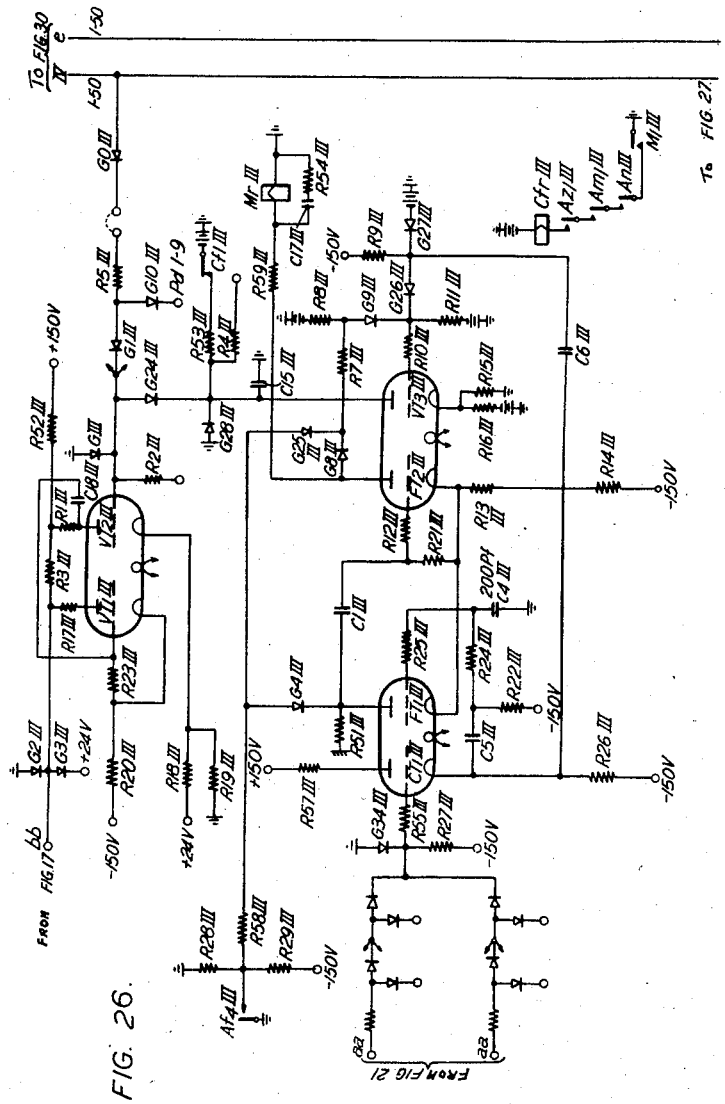
Figure 27:
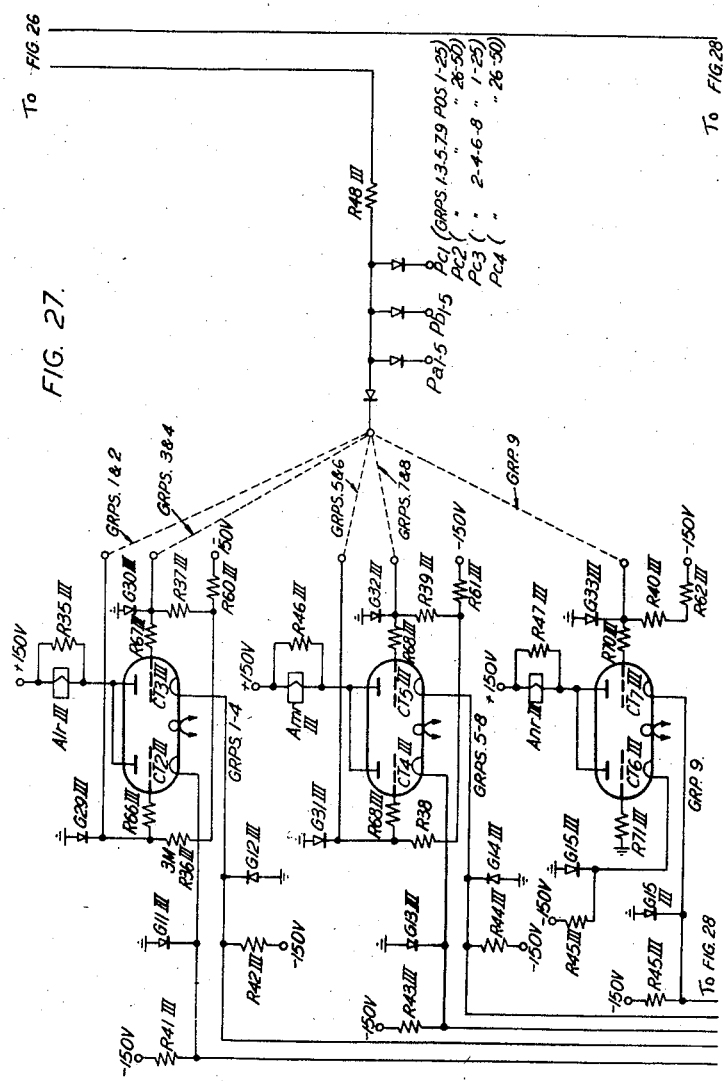
Figure 28:
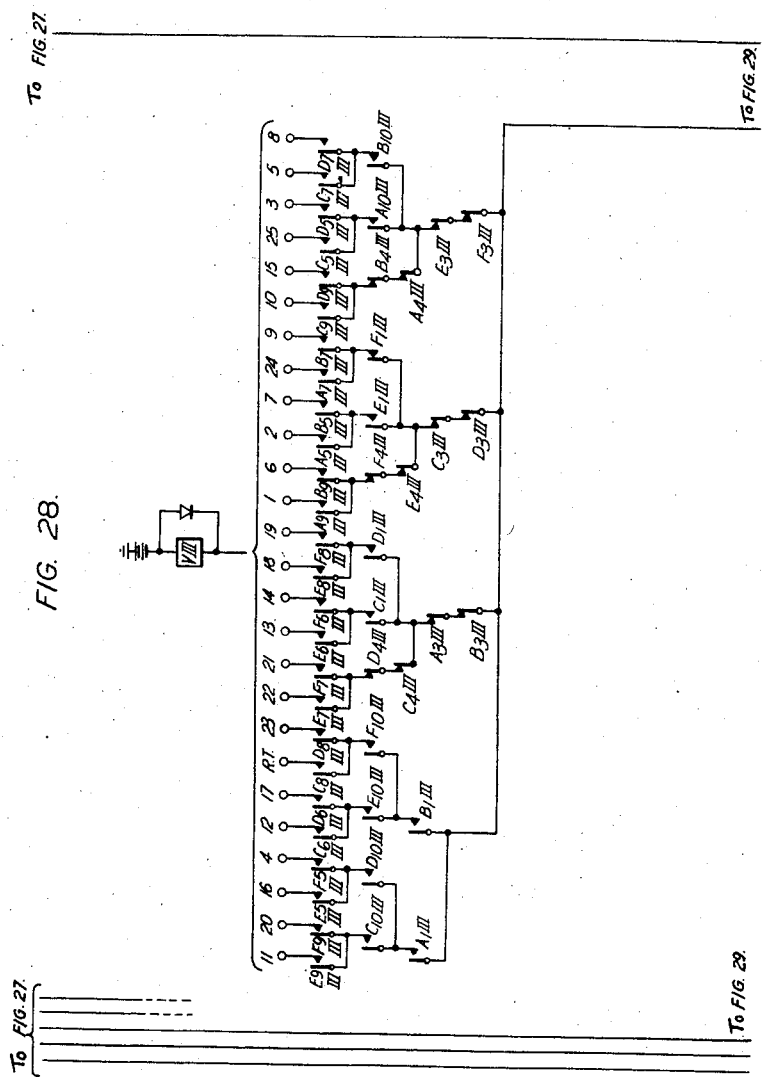
Figure 29:
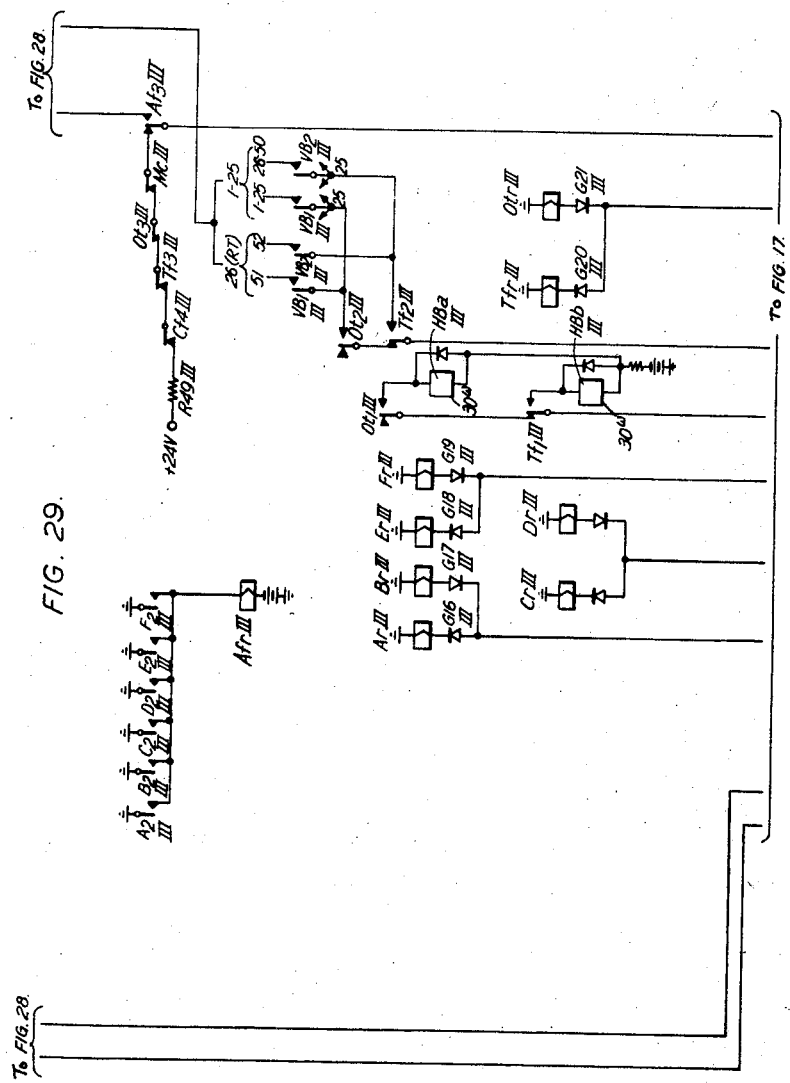

In Fig. 26 of the ESBO for cord chooser, the tube VT1III is normally conducting, its grid being connected to the cathode, the tube VT2III is normally cut off, its cathode potential being of about +16 v. whereas its grid is at earth potential (rectifier GIII conducting).

The anode of tube VT1III is clamped at earth potential by conducting rectifier G2III, so that the register scanning pulses in the "A" governor are absorbed via rectifier GA (Fig. 18) which is conductive.

At the grid of tube VT2III is provided an explorer for scanning for the free cord circuits, the explorer branches are controlled by Pd sources applied to the cathode of shunt rectifiers G10III. Each Pd source corresponds to a cord circuit group for 1200 lines. When a cord circuit is free, a potential of +24 v. is applied to wire IV in said cord circuit (Fig. 31).

Rectifiers G10III absorb the +24 v. potential on the corresponding lead of the explorer except when the corresponding source Pd gives a pulse bringing the cathode of said rectifier to +24 v., in which case the grid of tube VT2III is also brought to a potential of +24 v. and becomes conductive (assuming that the ESBO for cord chooser is not engaged).

The resulting anode potential drop is transmitted via condenser C18III to the grid of tube VT1III which is driven to cut off, thus raising the potential of the junction point of resistors R17III, R3III over +24 v.

By the limiting action of rectifier G3III this junction point is clamped at +24 v., so that rectifier GA, Fig. 18, ("A" governor) is blocked and the register scanning pulses are no longer absorbed and are transmitted via the common point of the explorer to the "A" governor proper, at time unit positions characterizing also besides the register identity the group of the free cord circuits available in the subgroup A or B corresponding to the register.

For an exchange of 10,000 lines, there are nine cord circuit groups (for example eight groups serving 1200 lines each, one group serving 400 lines), in that case nine Pd sources: Pd1-9 are used to control the explorer as shown in Fig. 18.

However, in the example chosen of an exchange of 4,800 lines, there are four cord circuit groups serving each 1200 lines, so that only sources Pd1-4 are used.

From the common point of the explorer the register scanning pulses may be further absorbed if there is no first line finder free in the same subgroup A or B than the register.

The subgroups A or B in which there are free line finders are indicated, in the ESBO for first line finder connected to the "A" governor, by the pair of pulse sources Pc1, Pc2 (subgroup A), or the pair of pulse sources Pc3, Pc4 (supgroup B) applied respectively via front contacts K2I, L2I, Fig. 6, of relays KrI, LrI.

Either one, or two, or none of these relays are operated depending on the existence of free first line finders either in subgroup A or B, or in both subgroups, or in none of the subgroups. In Fig. 18, the register scanning pulses are absorbed in the absence of Pc pulses in the ESBO for first line finder (Fig. 6) via rectifier G59A, Fig. 18, then Fig. 17, Fig. 9, Fig. 8, contact 11 ("A" governor), then in the ESBO, corresponding wire in Figs. 7 and 6 to relay contacts L2I, K2I in parallel. But when pulses Pc1, Pc2 or Pc3, Pc4 of both are applied via the corresponding front contacts, the register scanning pulses are no longer absorbed and they are transmitted from the common point of the explorer, Fig. 18, to the grid of tube CT8A which is arranged as cathode follower and used to amplify the explorer pulses and to pass them to the detecting equipment in the "A" governor proper. The anode of tube CT8A is connected to +150 v. The grid is normally kept at earth potential by the clamping rectifier G60A which is normally conductive, a current of about 50 microamps. flowing from ground through rectifier G60A, resistor R219A towards −150 v.

If the explorer produces a pulse of about 13 v. rectifier G60A is blocked and a pulse is produced at the cathode output of tube CT8A.

A gate G59A is provided to absorb certain pulses out of those offered by the explorer if this is required.

As long as the potential connected to the cathode of rectifier G59A equals +16 v. or higher, the gate G59A will be blocked and pulses will be able to reach the grid of tube CT8A unhindered. But as soon as the cathode potential of rectifier G59A is lowered to ground or below, no pulse will be able to raise the grid of tube CT8A above ground potential. This particularly occurs in the absence of the coincidence of the two Pc sources characterizing the group A or B in the ESBO first line finder.

When a pulse corresponding to a free register is obtained at the cathode of tube CT8A, it is transmitted via back contact Oa8A, back contact Wo3A to the comparator regenerator CRG2A (Fig. 20) in a similar manner as the call detector seizure was transmitted to the comparator regenerator CRG1A (Fig. 12) via front contact Sf1A and back contact Vo5A.

In a similar manner the impulse is regenerated in the time unit following the one of the coincidence of the register scanning impulse and the reference pulse from the coincidence network at the right of Fig. 20.

As relay OarA is no operated, only reference sources Rd1–4 are used via back contact Oa7A. As only one of relays RdarA to RddrA has been operated as a result of the firing of one of tubes VbA1–4 when recording the call detector's identity, only the corresponding contact amongst Rda1A—Rdd1A is closed and only the corresponding Rd source is used as reference.

It is to be noted that the same sources Rd1–4 were used to control the cold cathode tubes VbA1–4 in the recorder (Fig. 14), each of these tubes characterizing 1200 lines (4800/4).

Therefore, as the firing of one of tubes VbA1–4 resulted in the closure of the corresponding relay contact in group Rda1A—Rdd1A, the Rd source applied by this contact characterizes the 1200 line group including the calling subscriber's line.

Therefore, the regenerated pulse characterizes a free register having access to free cord circuits in the cord circuit group serving the 1200 lines group including the subscriber's line.

This regenerated pulse is transmitted to a second recorder (Fig. 21) in which the identity of the register is recorded.

This pulse fires tube BBVA and relay YrA operates via make contact Bu4A, back contact Cm3A in the anode circuit of said tube.

By its front contact Y1A, relay YrA closes a circuit for relay WorA which also operates.

The regenerated pulse is also transmitted to the grids of double triode CT9A, CT10A arranged as cathode follower, this double tube becomes conductive and the pulse is retransmitted from the cathode to the ESBO for cord chooser (Fig. 26) to render the circuit busy to prevent the connection of two free registers having access to the same cord group, if only one cord circuit is available.

For that purpose, each of said ESBO for cord chooser, Fig. 26, is provided with an explorer permitting to scan all the "A" governors associated (for instance 8), the cathode of tube CT9A in each "A" governor being connected to the corresponding branch of the explorer shown in a simplified form at the left of Fig. 26.

Fig. 68 shows a detailed example of such an explorer permitting to scan eight "A" governors by any of four ESBO's for cord chooser A1, A2, B1, B2.

The output O of the explorer in the corresponding ESBO for cord chooser is connected to the grid of tube CT1III.

This tube is arranged as a cathode follower, in the absence of pulse its grid is at earth potential but negative with respect to the cathode which is at a potential of about +3 v. (current 7.65 ma.).

Tubes FT1III—FT2III constitute a cathode coupled monostable multivibrator, tube FT1III is normally cut off, whereas tube FT2III is normally conducting, relay MrIII being operated in the anode circuit.

The anode of tube FT1III is at earth potential and rectifier G4III is blocked its anode being at about −54 v. from the potentiometer R28III, R29III between earth and −150 v.

The common cathode of tubes FT1III, FT2III is at about −125 v., a current of about −10 ma. flowing through tube FT2III.

The anode of tubes FT2III is at a potential of about −50 v. Normally, rectifier G27III is conductive between the −48 v. battery and −150 v. via resistor R9III, rectifiers G26III, G9III are blocked.

The grid of tube VT3III is about −48 v., whereas its cathode is about −42 v. from the potentiometer R15III, R16III between earth and −48 v.

Tube VT3III is therefore non-conductive and its anode is at +24 v. (contact Cfi1III being operated). Rectifier G28III is blocked and also rectifier G24III.

When the scanning pulse arrives at the grid of tube CT1III, a pulse of about 14 v. amplitude appears at the cathode of said tube and is transmitted directly via condenser C6III to the junction point of rectifiers G26III, G27III, rectifier G27III is blocked, rectifier G26III becomes conductive, rectifier G9III is blocked.

The grid potential of tube VT3III is raised above −42 v. (cathode potential), said tube becomes conductive. About 6 ma. flows into the tube, of which the anode potential is claimped to about 0 v. by rectifier G28III which is conductive, about 1.2 ma. flowing through resistor R4III, whilst 4.8 ma. flows through rectifier G28III.

Simultaneously, the pulse at the cathode of tube CT1III is passed via condenser C5III and the low pass filter R24III, C4III (preventing high frequency perturbation from triggering the multivibrator FT1III—FT2III) to the grid of tube FT1III thereby causing said tube to conduct, the anode potential drop which is transmitted to the grid of tube FT2III driving the latter tube towards cut off, thus raising the anode potential to 0 v.

This however happens after the triggering of pulse VT3III by the direct pulse, owing to the time delay in the low-pass filter.

Tube FT2III being cut off relay MrIII releases, thus releasing relay CfrIII (Fig. 27), which gives the +24 v. test potential to the "A" governor via contact Ci4III (Fig. 29) and which connects a battery of —48 v. to resistor R53III via back contact CfIII.

Rectifier G8III is unblocked thus maintaining the grid of tube VT3III to about —34 v. owing to the potentiometer R7III, R8III and rectifier G9III now unblocked, whilst rectifiers G26III, G27III are blocked again at the end of the pulsed applied to their junction point.

A low impedance path via rectifier G24III is now provided to absorb the pulses corresponding to the free cord circuit.

At the closure of contact CfIII about 1.2 ma. flows into R4III, 2.4 ma. flows into R53III, 6 ma. flows in the tube, therefore about 7.2 ma. flows via rectifier G28III supposing rectifier G24III is blocked, if G24III is conductive the current through it reduces of as much the current in rectifier G28III.

Therefore G24III can absorb up to 7.2 ma. which is a sufficient margin.

Thus the ESBO for cord chooser is blocked, absorbing all free cord circuit pulses.

This condition can prevail for about 1 second due to the time constant of the delay circuit C1III—R21III of the multivibrator FR1III, FT2III.

However, as soon as the "A" governor is connected to the ESBO for cord chooser, relay AfrIII operates, thus bringing the anodes of rectifier G4III, G25III to earth potential via front contact Af4III and the multivibrator is restored in less than 1 millisecond, resistor R51III being shunted by the low impedance circuit of rectifier G4III in series with resistor R58III, causing relay MrIII to reoperate.

Rectifier G8III is again blocked but is shunted by rectifier G25III so that tube VT3III remains conductive and the ESBO for cord chooser blocked until said ESBO for cord chooser is disconnected from the "A" governor (release of relays ArIII/FrIII and AfrIII), when the earth at contact Af4III is withdrawn and the circuit of Fig. 25 restored to normal.

Coming back to the "A" governor, the regenerated pulse from circuit CRG2A fires, via back contact Oa3A, one out of three of tubes VfA1–5 controlled by three sources Ra1–5 according to the "A" governor seized, one of tubes VhA1–4 controlled by sources Rc1–4, and fires directly one of tubes VgA1–5 controlled by sources Rb1–5, the anode circuits being closed by back contact Cm4A and front contact Bu7A.

Figure 22:
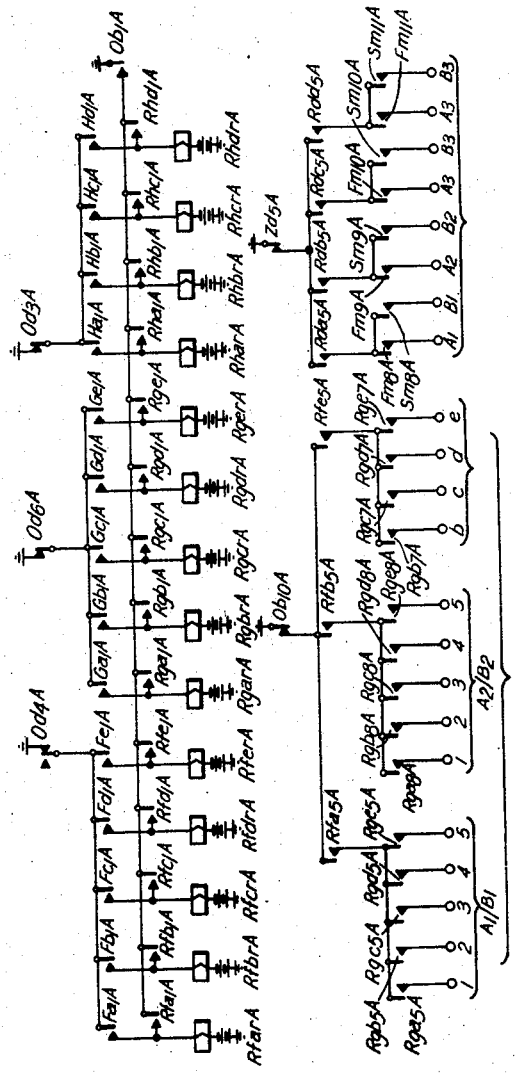

The corresponding anode relays operate, thereby causing the operation of one relay of group RfarA—RferA, one relay of group RgarA—RgerA, one relay of group RharA—RhdrA via the pyramid of contacts at the top of Fig. 22, earths being given by the back relay contacts Od4A, Od6A, Od3A.

From the pyramid of contacts at the bottom left of Fig. 22, earth is given via back contact Ob10A to one of the register connecting relays RgA (Fig. 16) via one of contacts of group Rfa5A/Rfe5A, one contact of group Rga5A/Rge5A, or Rga8A/Rge8A, or Rgb7A/Rge7A, and the corresponding terminal.

Said relays are blocked via their own make contact 12 and make contact Bu3A to earth.

Each of said connecting relays RgA is provided for two registers (one in group A, one in group B).

A connection is thus prepared by operated relay RgA for a required free register without subgroup distinction (A or B).

Figure 16:
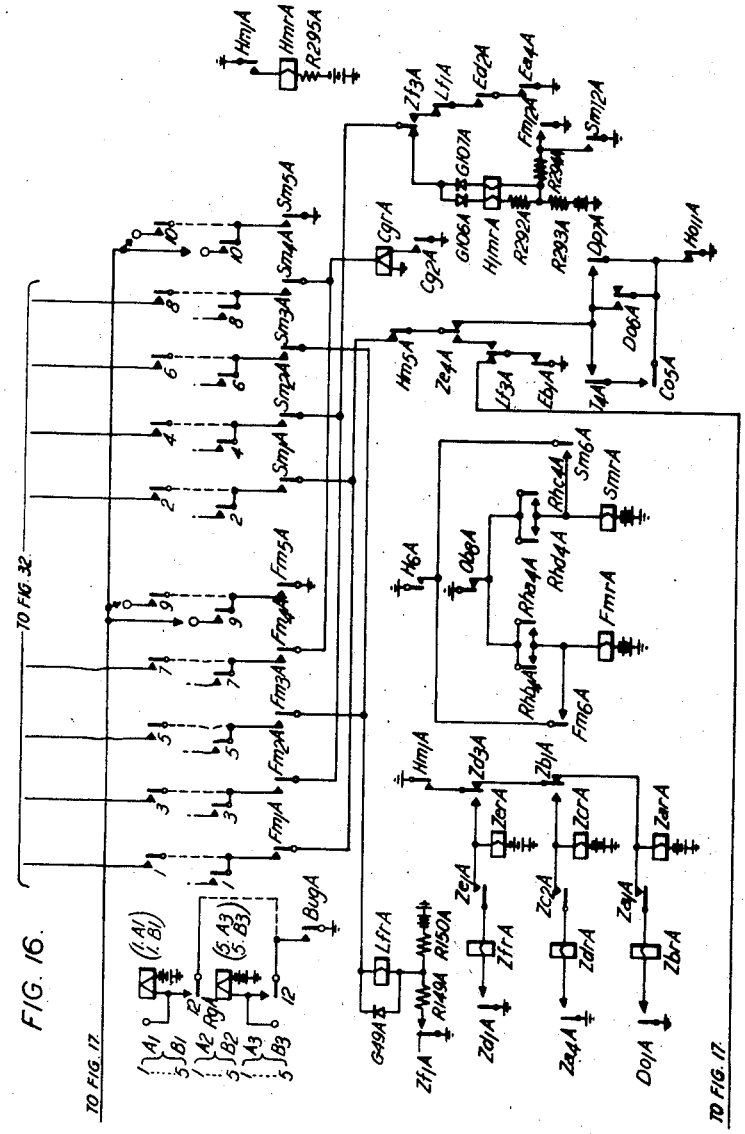

However, one of relays RharA—RhdrA being operated, one of relays FmrA, SmrA operates via the one of contacts Rha4A—Rhd4A, back contact Ob8A, front contact H6A to earth (Fig. 16). The operated relay FmrA or SmrA is blocked by its own front contact Fm6A or Sm6A, and completes the connection of the "A" governor to the required free register in the required subgroup A or B via front contacts Fm1A to Fm5A (subgroup A) or Sm1A to Sm5A (subgroup B).

The correct discrimination of the required subgroup by relay FrmA or SmrA becomes evident if it is remembered that relays RharA, RhbrA are respectively operated when tubes VhA1, VhA2 are fired, these two tubes being respectively controlled by pulse sources Rc1, Rc2 which characterized subgroup A and that relays RhcrA, RhdrA are respectively operated when tubes VhA3, VhA4 are fired, these two tubes being respectively controlled by the pulse sources Rc3, Rc4 which characterize subgroup B.

Figure 17:
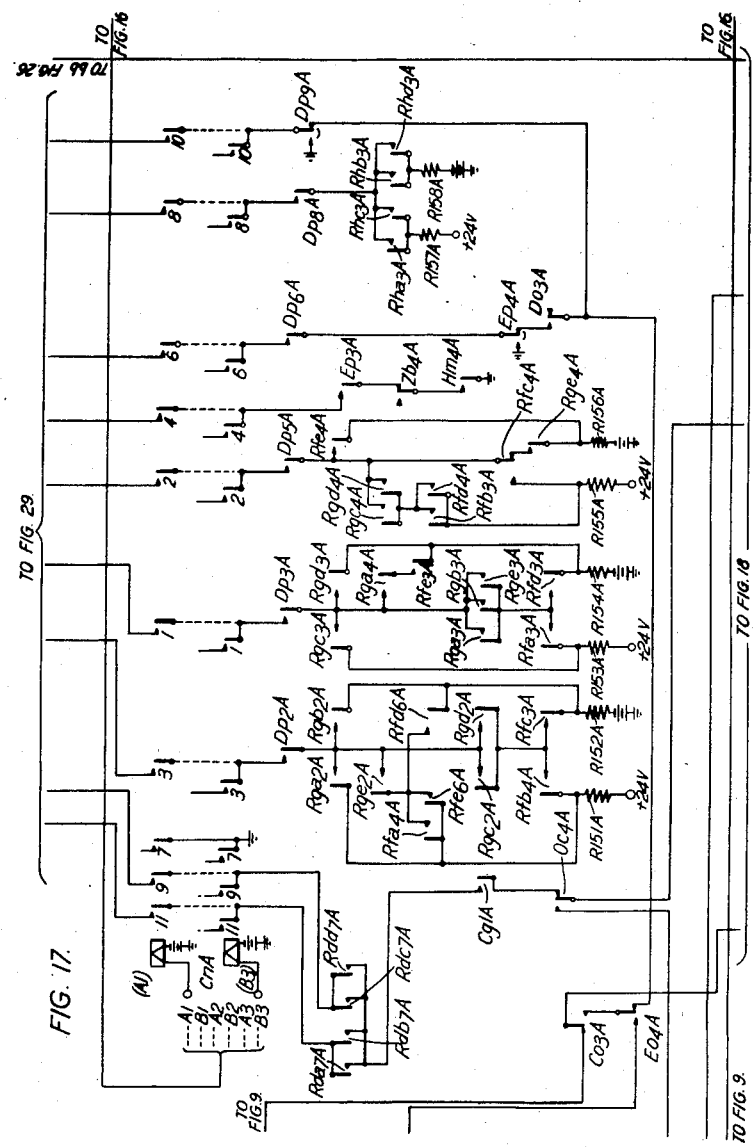

The operation of relay FmrA or SmrA operates also the ESBO for cord chooser connecting relay CnA, Fig. 17, which correspond to the same subgroup "A" or "B" and to the same group of 1200 lines, in a circuit from earth via make contact Fm5A or Sm5A, make contact 9 or 10 of the corresponding operated register connecting relay RgA, corresponding jumpering wire WA (Fig. 16) to one of terminals A1, B1, . . . A3, B3 of relays CnA (Fig. 17).

Further the ESBO second line finder connecting relay CRA (Fig. 12) which corresponds to the same subgroup "A" or "B" and to the same group of 1200 lines is also operated via the pyramid of relay contacts at the bottom right corner of Fig. 22, earth being given via back contact Zd5A, one of contacts Rda5—Rdd5A (for the group of 1200 lines), accordingly one of contacts Fm8A to Fm11A or Sm8A to Sm11A (for subgroup A or B) and accordingly one of terminals A1, B1, . . . A4, B4.

Relay CgrA operates (Fig. 16) via make contact Fm4A or Sm4A, terminal 7 or 8, in series with relay CorR in the register circuit connected to the "A" governor (Fig. 31).

The operation of the anode relays associated with the recording tubes (Fig. 21) i.e. one of relays in group FarA/FerA, one of relays in group GarA/GerA, closes a circuit for the operation of relay OarA from earth via front relay contact Wo1A, one front contact in group Fa2A/Fe2A, one front contact in group Ga2A/Ge2A, back contact Ob3A, winding relay OarA to the battery.

Relay OarA is blocked via its own make contact Oa6A, back contact Ob7A and one in each group of contacts Rfa2A/Rfc2A, Rga6A/Rge6A, Rha5A/Rhd5A.

The path from the register scanner (Fig. 18) to the comparator regenerator CRG2A (Fig. 20) is opened at contact Oa8A, the circuit CRG2A being connected via the same make contact to the lead towards the ESBO for cord chooser via Fig. 17.

The reference pulse sources Rd1–4 in the coincidence network (Fig. 20) are disconnected at front contact Oa7A and replaced by the reference pulse sources Rc2 and Rc4 by same front contact in addition with reference pulse sources Rc1 and Rc3 via back contact Oc5A and front contact Oa5A.

In Fig. 21, front contact Oa3A connects the output of circuit CRG2A (Fig. 20) via a second control lead to recording tubes VfA1–5 and VhA1–4.

Relay CmrA operates from battery via vack contact Ob5A and front contact Fm7A or Sm7A (according to the subgroup relay operated) to earth.

The anode circuits of the recorder tubes and of tube BBVA (Fig. 21) are opened at contacts Cm3A, Cm4A and all the tubes which had been fired extinguish, thereby releasing the corresponding anode relays.

Relay YrA releases but relay WorA remains operated by its own make contact Wo2A and make contact Cm2A.

The release of the anode relays in the recorder suppresses the earth given to relay OarA (Fig. 21) via contact Wo1A, and causes the release of the corresponding helping relays in groups RfarA . . ., RgarA . . ., RharA. Therefore, the second operating circuit of relay OarA . . . (provided to ensure that the mentioned helping relays have effectively released) is also opened.

However, relay OarA remains operated in series with relay ObrA via make contact Bu6A. Relay ObrA can operate, being no longer short-circuited by the initial direct earths to relay OarA.

The operation of relay ObrA releases relays CmrA, the latter circuit being open at make contact Ob5A.

Relay back contacts Cm3A and Cm4A close again the anode circuits of the recording tubes, Fig. 21, and open contact Cm2A releases relay WorA.

The scanning for a free cord circuit in the required subgroup "A" or "B" and in the required group of 1200 lines now takes place.

The ESBO for cord chooser of the Figs. 26–27–28–29 has a capacity of 10,000 lines divided in 8 groups of 1200 lines and one group of 400 lines. As described in conjunction with said ESBO circuit, three double triodes are provided at the output of the scanner therein: one for groups 1 to 4 (4800 lines), one for groups 5 to 8 (4800 lines), one of group 9 (400 lines).

Only one group of 4800 lines can be connected at a time to an "A" governor, the other groups being served by other "A" governors.

We assumed that the exchange comprises only 4800 lines and that only the cord groups 1 to 4 are used; therefore the scanning impulse from the cord circuit arrives via the corresponding double triode (Fig. 27) to leads 11 and 9 (Fig. 17 in the "A" governor) and are transmitted by one of contacts RdaA—Rdd7A (for discriminating the group of 1200 lines), front contact Cg1A, back contact Oc4A, front contact Oa8A (Fig. 18) to the regenerator (Fig. 20).

The discrimination of a 1200 line group will appear obvious in remembering that relays RdarA—RddrA operate in conjunction with the corresponding recording tubes VbA1–4 (Fig. 14) which are controlled by sources Rd1–4 characterizing four groups of 1200 lines. In Fig. 17, to lead 11 corresponding to groups 1 and 2, are connected the relay contacts Rda7A, Rdb7A corresponding to groups 1 and 2, whereas to lead 9 corresponding to groups 3 and 4, are connected the relay contacts Rdc7A, Rdd7A corresponding to groups 3 and 4.

As only one of these relay contacts is closed it is clear that only the pulse of the corersponding group can be transmitted to the regenerator from the ESBO for cord chooser.

In the coincidence network at the right of Fig. 20, the pulse sources Rc1–4 absorb all scanning impulses which do not belong to the required subgroup "A" or "B" at the grid of tube CT3A in the comparator regenerator CRG2A.

The coincidence of pulses Rc1—Rc2 characterizes subgroup "A," whilst the coincidence of pulses Rc3—Rc4 characterizes subgroup "B."

The regenerated impulse fires tube BBVA and operates again relay YrA and relay WorA in the same manner as already described for the register scanning.

Via make contact Oa3A the regenerated pulse fires one of tubes VfA1–5 controlled by sources Ra1–5, one of tubes VhA1–4 controlled by sources Rc1–4, and directly the regenerated pulse fires one of tubes VgA1–5 controlled by sources Rb1–5, according to the identity of the free cord circuit.

In the same manner one of relays RfarA/RferA, one of relays RgarA/RgerA, one of relays RharA/RhdrA are operated according to the identity of the free cord circuit, and blocked via their own contact and front contact Ob1A (Fig. 22).

Relay OcrA, Fig. 21, operates via front contact Ob3A, one anode relay front contact of group Ga2A/Ge2A, one anode relay front contact of group Fa2A/Fe2A, front contact Wo1A to earth.

Relay CmrA reoperates via back contact Od5A and front contact Oc6A and extinguishes all recording tubes which had been fired, the initial operating earth of relay OcrA disappears, but this latter relay remains operated in series with relay OdrA via its own make contact Oc1A.

New relays OarA, ObrA, OcrA, OdrA are all operated and relay CmrA releases again, its circuit being opened at contact Od5A, closing again the anode circuits of the recording tubes and releasing relay WorA at open contact Cm2A.

A sequence test is made to verify if the ESBO for cord chooser of which the identity has been recorded is free.

If so a test potential of +24 v. is connected via back contacts CF2III, Tf3III, Ot3III, McIII, Af3III in said ESBO (Fig. 29) to terminal 10 in the "A" governor (Fig. 17) from which it is transmitted via back contact Dp9A, back contact Eo4A, front contact Co3A, back contact Ho9A to the sequence test circuit STA, Fig. 18, which operates in the same manner as explained for the sequence test of the ESBO first line finder, except that tube SVA is fired and relay TrA operates via front contact Co1A instead of back contact Cp10A. Relay DprA (Fig. 10) operates from battery via front contact Co4A, back contact Do4A, back contact Eo3A, front contact T1A to earth.

Via make contact Dp8A a potential of +24 v. or −48 v. is applied (Fig. 17) via one of contacts Rha3A, Rhc3A or Rhb3A, Rhd3A thus operating relay TfrIII or OtrIII in the ESBO for cord chooser (Fig. 29) according to the group 1–25 or group 26–50 of the free cord circuit.

It is to be noted that in the explorer of the ESBO for cord chooser, sources Pc1 and Pc3 correspond to cord circuits 1–25, whereas sources Pc2 and Pc4 correspond to cord circuits 26–50. This explains the distribution of contacts Rha3A, Rhc3A, Rhb3A, Rhd3A which correspond respectively to sources Rc1, Rc3, Rc2, Rc4 controlling the tubes which have operated, via the anode relays, relays RharA . . . (sources Rc1–4 having the same time positions as sources Pc1–4).

In the ESBO for cord chooser (Fig. 29) one, two or three of relays AriII/FrIII is or are operated, one relay only or none being operated in each pair ArIII and BrIII, CrIII and DrIII, ErIII and FrIII depending on the combination of contacts of relays RfaA, . . ., RgaA . . . (Fig. 17, "A" governor), which via respective front contacts 3, 1, 2 and respective front contacts Dp2A, Dp3A, Dp5A connects a +24 v. potential or −48 v. battery to at least one of the three pairs of said relays. In each pair the left-hand relay operates for +24 v., the right-hand relay operates for −48 v.

Thus it can be obtained : $3^3-1=26$ combinations corresponding each to one of 26 vertical magnets. The 27th combination (no relay operated) is used for normal rest condition.

In the ESBO for cord chooser a vertical magnet is operated (Fig. 28) accordingly to the combination of the operated relays ArIII to FrIII, via the make contacts of said relays, make contact Af3III (in the ESBO for cord chooser), terminal 10 and make contact Dp9A to earth (in the "A" governor, Fig. 17), thereby causing the motion of the vertical bar of the multi-switch in the cord circuit giving access to two lines respectively in groups 1–25, 26–50 or to the two test lines 51, 52.

It is to be noted that all the multi-switches used in connection with the present application are of the type disclosed in U.S. application Serial No. 280,252, filed April 13, 1952, where the code bar magnets have been omitted.

In the multi-switch controlled by said ESBO for cord chooser the (preselection) select bars and magnets are omitted since only 50 outlets are served by said multi-switch. The relay OtrIII or TfrIII operates (Fig. 29) to select one out of the two lines which may be either one line of group 1–25, or one line of group 26–50, or else one of the test lines 51, 52.

The operation circuit of said relay is closed via contact 8, Fig. 17, "A" governor, front contact Dp8A, one of contacts Rha3A, Rhc3A or one of contacts Rhb3A, Rhd3A, +24 v. potential or −48 v. battery.

Make contact Dp10A, Fig. 18, releases the sequence test circuit, tube SVA is extinguished, relay TrA releases and relay DorA (Fig. 10) operates from battery via make contact Dp4A, back contacts Ep2A, Fp4A, T3A to earth, and is blocked via its own make contact Do5A and front contact Bu5A.

When relay TrA operates as a result of the sequence test for the free condition of the ESBO for cord chooser, horizontal magnet HmR in the register (Fig. 32) operates via lead ½ in said register, front contact 1 or 2 in the "A" governor (Fig. 16), back contacts Hm5A, Ze4A, front contacts Ta4A, Co5A, back contact Ho11A to earth.

When relay TrA releases after the sequence test, magnet HmR is held in operation via front contact Dp7A of operated relay DprA and after also via front contact Do6A in parallel, which duplicates contact Dp7A to hold magnet HmR operated when the latter contact will be opened at a further stage.

Relay LbrR operates in the register circuit (Fig. 32).

Relay H1mrA in the "A" governor (Fig. 16) operates in the following circuit: earth, back contact Ho11A, front contact Do6A, back contacts Ze4A, Hm5A, front contact 1 or 2 (in the "A" governor), then in the register wire ½, back contacts Lg3R, Hb2R, front contact Hm1R, back contacts Lh11R, Lg4R, wire ¾, then back in the "A" governor front contact 3 or 4, back contact Zf3A, relay H1mrA, −48 v. battery (Fig. 16).

The operation of relay H1mrA causes relay HmrA to operate via front contact H1m1A.

Relay ZarA (Fig. 16) operates from earth via front contact Hm1A, back contacts Zb3A, Zb1A.

Although contacts Do7A, Za1A are closed, relay ZbrA is prevented from operating, being short-circuited by the direct earth at contact Hm1A.

Make contact Do1A closes again the anode circuit of tube SVA, the sequence test circuit is set back to the ready condition.

After the release of the tube of each group: VfA1 ..., VgA1 ..., VhA1 ..., following the scanning for cord chooser, the scanning for first line finder can start via the ESBO for second line finder (Figs. 23–24–25).

The ESBO for second line finder corresponds to the required group of 1200 lines, it comprises two triodes CT1II, CT2II (Fig. 23) each of which has its grid connected to an explorer scanning 50 outlets (00–49 or 50–79) from a cord circuit towards six first line finder groups serving 100 lines each (for example groups 1, 2, 5, 6, 9, 10 or groups 3, 4, 7, 8, 11, 12). In total 100 outlets are scanned which are shared for 12 first line finder groups.

To discriminate the group of first line finder (100 lines) served by the outlet scanned, the branches of the explorer (Fig. 23) are controlled by pulse sources Pc1–4, Pe1–3 in the following manner given as example.

For the outlets 00 to 24 the outlets serving the first line finder groups 1, 5, 9 are associated with source Pc1, the outlets serving groups 2, 6, 10 are associated with source Pc4, the outlets serving groups 1 and 2 are associated with source Pe1, the outlets serving groups 5 and 6 are associated with source Pe2, the outlets serving groups 9 and 10 are associated with source Pe3.

For the outlets 25 to 49 the outlets serving the first line finder groups 2, 6, 10 are associated with source Pc2, the outlets serving groups 1, 5, 9 are associated with source Pc3, the outlets serving groups 1 and 2 are associated with source Pe1, the outlets servings groups 5 and 6 are associated with source Pe2, the outlets serving groups 4 and 10 are associated with source Pe3.

For the outlets 50 to 74 the outlets serving the groups 3, 7, 11 are associated with source Pc1, the outlets serving the groups 4, 8, 12 are associated with source Pc4, the outlets serving the groups 3 and 4 are associated with source Pe1, the outlets serving the groups 7 and 8 are associated with source Pe2, the outlets serving the groups 11 and 12 are associated with source Pe3.

For the outlets 75 to 99 the outlets serving the groups 4, 8, 12 are associated with source Pc2, the outlets serving the groups 3, 7, 11 are associated with source Pc3, the outlets serving the groups 3 and 4 are associated with source Pe1, the outlets serving the groups 7 and 8 are associated with source Pe2, the outlets serving the groups 11 and 12 are associated with source Pe3.

It can be seen that each first line finder group is characterized by one source Pe associated with two sources Pc according to the respective group of outlets 00–24, 25–49 for 600 lines or to the respective group of outlets 50–74, 75–99 for the other 600 lines. (For instance, group 1 is characterized by sources Pe1 and Pc1 in the outlet group 00–24, Pe1 and Pc3 in the outlet group 25–49.)

Amongst the two groups of 600 lines of which the characteristic pulses arrive respectively to the "A" governor via terminals 11 and 9 respectively for each group (Fig. 9), the required group of 600 lines is selected by the one of contacts Rca3A—Rcd3A two by two in parallel which has been closed as a result of the recording of the call detector's identity by the "A" governor, each of those contacts characterizing 300 lines.

The scanning pulses are transmitted via make contacts Oc4A (Fig. 17), Oa8A (Fig. 18), and back contact Wo3A to the comparator regenerator CRG2A (Fig. 20).

All pulses which do not belong to the calling subscriber's group of 100 lines are absorbed by the coincidence network at the right of Fig. 20, said network giving one of reference sources Re1–3 via the one operated of contacts Rea3A/Rec3A and make contact Oc8A, one of reference sources Rc1 and Rc2 via the one operated of contacts Rca1A/Rcd1A and make contacts Oc5A, Oa5A, one of reference sources Rc3 and Rc4 via the one operated of contacts Rca7A/Rcd7A and make contacts Oc3A, Oa7A.

As the combination of operated relays each in groups RcarA, RdarA, ... RearA (corresponding to fires tubes in groups VcA1–4, VbA1–4, VeA1–3) characterizes the identity of the call detector recorded, i.e. the calling subscriber's 100 line group, it can be seen that one Re source combined with two Rc sources (one of group Rc1—Rc2, the other of group Rc3—Rc4) characterize the required group of 100 lines to which belongs the calling subscriber's line in the required 600 line group.

The regenerated impulse which therefore corresponds to the one outlet scanned serving the required group of 100 lines is transmitted to the recorder Fig. 21.

Tube BBVA is again fired and relay YrA and WorA operated, one tube in each group VfA1 ..., VgA1 ..., VhA1 ... is fired, and via the contacts of the corresponding operated anode relays, relay OerA operates via front contacts Od1A, Ob3A, front anode relay contacts, front contact Wo1A to earth.

As no other scanning is to be performed for that call, all the tubes fired in the recorder of Fig. 21 remain lit until the switching through is completed, as relay CmrA can no longer operate.

Therefore, all relays OarA, ObrA, OcrA, OdrA, OerA remain operated.

The ESBO for cord chooser multi-switch operated vertical bar gives access to the cord circuit proper of which the free condition must be verified. This is made by a new sequence test.

The test potential is obtained via the ESBO for cord chooser, and is transmitted via terminal 6 (Fig. 17), front contact Dp6A, back contact Ep4A, front contact Do3A, back contact Eo4A, front contact Co3A, back contact Ho9A to the sequence test circuit (Fig. 18) in the "A" governor.

If the cord circuit is free, tube SVA is fired, relay TrA operates, causing the operation of relay EprA (Fig. 10) via front contact Do4A, back contacts Eo3A, Fo4A, front contact T1A, and is blocked via its own front contact Ep1A and front contact Do2A.

The anode circuit of tube SVA being opened at contact

Ep5A, tube SVA extinguishes, relay TrA releases, the sequence test circuit is disabled.

Relay EorA (Fig. 10) operates via front contact Ep2A, back contact Fp4A, back contact T3A and is blocked via its own front contact Eo2A and front contact Cg3A of operated relay CgrA.

Front contact Eo1A restores the sequence test circuit to the ready condition for the next sequence test.

This sequence test can be started immediately thereupon to verify if the ESBO for 2nd line finder, through which was made the scanning of outlets towards first line finders, is free.

If said ESBO for 2nd line finder is free, a test potential of +24 v. is transmitted via back contacts Ft3II, Ot3II, McII, Af3II (in the ESBO, Fig. 25), terminal 10 (Fig. 9), back contact Fp9A, front contact Oe1A (Fig. 2), Eo4A, Co3A (Fig. 17), back contact Ho9A (in the "A" governor) to the sequence test circuit (Fig. 18).

Tube SVA is fired, relay TrA operates.

Relay FprA (Fig. 10) is operated via front contact Eo3A, back contact Fo4A, front contact T1A to earth. This relay is blocked via its own front contact Fp1A, back contacts Ze5A, Ho10A, front contact H2A, to earth.

The open contact Fp10A disables the sequence test circuit, tube SVA extinguishes and relay TrA releases.

Relay ForA (Fig. 10) operates via front contact Fp4A and back contact T3A to earth and is blocked via its own front contact Fo2A and front contact Cg3A, thus restoring the ready condition of the sequence test circuit for the next sequence test by closure of contact Fo1A.

The front contacts Fp2A, Fp3A, Fp5A close the circuits for: one, two or three of relays ArII to FrII in the ESBO second line finder (Fig. 25) as explained in connection with the ESBO for cord chooser, via terminals 3, 1 and 2, depending on a potential of +24 v. or −48 v. being applied to one, two, or three of said terminals according to the combination of contacts of anode relays FarA/FerA, GarA/GerA of the recorder in Fig. 21, combination which characterizes the identity of the scanned outlet towards the required first line finder group of 100 lines.

The six mentioned relays ArII to FrII thus provide $3^3 - 1 = 26$ combinations, each corresponding to one of the 26 vertical magnets of the multi-switch which is of the type disclosed in U.S. application Serial No. 280,252, filed April 3, 1952.

In the ESBO second line finder, relay AfrII operates, an earth being provided by the front contacts amongst contacts A2II, B2II, ..., F2II.

Figure 9:
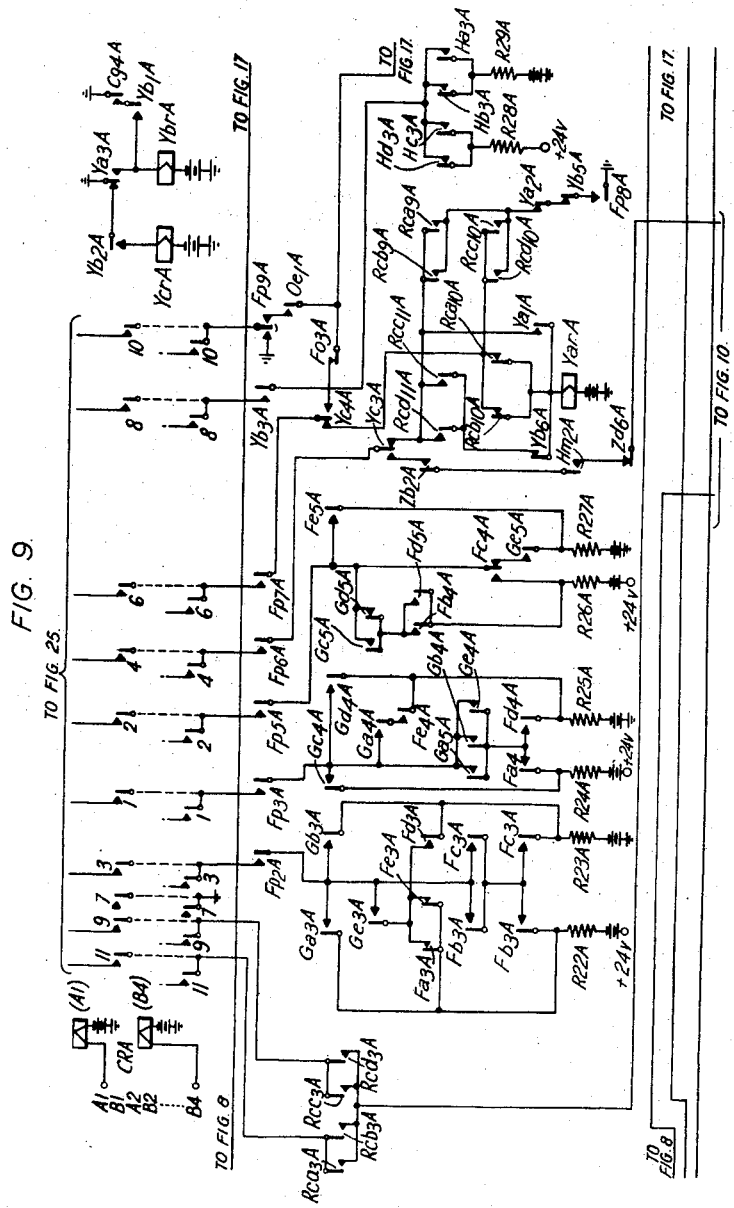

Therefore one of the 26 vertical magnets VII (Fig. 24) is operated via the pyramid of contacts of relays ArII/FrII, front contact Af3II (in the ESBO second line finder), terminal 10 and front contact Fp9A to earth (in the "A" governor at Fig. 9). The operation of the vertical magnet causes the motion of the corresponding vertical bar.

Each of the 25 first vertical magnets VII controls four outlets respectively in groups 00–24, 25–49, 50–74, 75–99, whereas vertical magnet 26 (RT) controls the four test outlets 100, 101, 102, 103, each associated with one of the four mentioned groups of 25 outlets.

A first discrimination between the four groups is carried out by the operation of one of preselecting magnets VPII, VSII (Fig. 25) in the ESBO second line finder via the corresponding back contacts Bf3II or Bf4II, Ot1II or Ot2II, Tf1II or Tf2II, terminal 4 or 6 (Fig. 9) in the "A" governor, front contact Fp6A or Fp7A, back contact Yc3A or Yc4A, one of contacts Rca9A, Rcb9A, or one of contacts Rcc10A, Rcd10A, back contacts Ya2A, Yb5A, front contact Fp8A to earth. The preselecting magnet operated causes the motion of the preselecting vertical bar 27 or 28.

In the ESBO second line finder, Fig. 25, relay BfrII operates in parallel with the one of preselecting magnets VpII, VSII which has operated, via front contact Af4II, and magnet contact vpII or vsII.

Relay BfrII and one of preselecting magnets VPII, VSII are blocked to earth via the two front contacts in parallel Bf1II, Bf2II.

Preselecting vertical bar contacts VBP1II, VBP2II or VBS1II, VBS2II are thus closed, selecting two outlets respectively groups 20–24 and 25–49 or two outlets respectively in groups 50–74 and 75–99 or two test lines 100, 101 or 102, 103.

Relay YarA ("A" governor, Fig. 9) operates either via back contact Yb6A, one front contact Rcc11A or Rcd11A, back contact Yc3A, front contact Fp6A, contact 4, then in ESBO for second line finder back contacts Tf1II, Ot1II, front contact Bf3II to earth, or via one front contact Rca10A or Rcb10A, back contact Yc4A, front contact Fp7A, contact 6, then in the ESBO for 2nd line finder back contacts Tf2II, Ot2II, front contact Bf4II, to earth.

Relay YbrA (Fig. 9) operates via front contact Ya3A and is blocked via its own front contact Yb1A and front contact Cg4A. In the ESBO for 2nd line finder one of relays TfrII, OtrII operates via terminal 8 ("A" governor, Fig. 9), front contact Yb3A, one of anode relay contacts Hc3A, Hd3A to +24 v. for relay TfrII, or one of anode relay contacts Ha3A, Hb3A to −48 v. for relay OtrII.

The operation of relay TfrII or OtrII releases relay YarA in the "A" governor at open contacts Ot1II, Ot2II or Tf1II, Ft2II.

Relay YcrA operates via front contact Yb2A and back contact Ya3A.

By front contact Ot2II or Tf2II a further discrimination is made of a single outlet in group 0–24 and test outlet 100; or in group 25–49 and test outlet 101, or in group 50–74 and test outlet 102, or in group 75–99 and test outlet 103, the corresponding lead being connected to terminal 6 in the "A" governor to test for the free condition of the selected outlet, which test will be explained further on.

In the ESBO for cord chooser upon operation of relay EorA, the horizontal servo magnet HBaIII or HBbIII (Fig. 29) operates via front contact Ot1III or Tf1III, then in the "A" governor (Fig. 17), contact 4, front contact Ep3A, back contact Zb4A, front contact Hm4A, to earth.

Horizontal servo magnet HBaIII or HBbIII are operated according to the required group 1–25 or 26–50 of cord circuits, thus connecting the register to the cord at wires h, f ... c, d.

When said servo magnet has operated, the circuit of relay H1mrA (Fig. 16) is opened in the register (Fig. 32) at contact Lh11R of relay LhrR which operates in the register via make contacts Lb1R, Hb1R.

Relays H1mrA and HmrA therefore release (Fig. 16).

The earth short circuiting relay ZbrA is withdrawn at open contact Hm1A and ZbrA is operated in series with relay ZarA via front contacts Za1A and Do7A (Fig. 16).

The operating circuit of horizontal servo magnet HBaIII or HBbIII is opened at contact Zb4A and Hm4A, the horizontal servo magnet releases but the switch horizontal bars are maintained in contact by the horizontal magnet HmR in the register.

The horizontal magnet HmL in the cord circuit (Fig. 30) operates via the horizontal bar back contact Hb2L, back contact Ca3L, wire g, then in the register (Fig. 32), front contacts Lh2R, Hb2R, wire ½, then in the "A" governor (Fig. 16), the same circuit to earth than for the register horizontal magnet HmR (contact Hm5A being again closed).

In the "A" governor relay H1mrA is again operated in the similar circuit than for its first operation but extended via wires f and g to the cord circuit where it is closed now by front contact Hm1L of the cord circuit horizontal magnet.

Relay HmrA operates again, and relay ZcrA also operates via front contact Zb1A, back contact Zd3A and front contact Hm1A (Fig. 16).

Relay DprA (Fig. 10) releases, its circuit being opened at contact Zc1A. Therefore the ESBO for cord chooser is disconnected from the "A" governor as its function to connect the cord circuit to the register is completed. All the operated relays in said ESBO restore to normal.

Although contacts Za4A and Zc2A are closed, relay ZdrA is prevented from operating, being short circuited by the direct earth at contact Hm1A.

Before proceeding with further connections from cord circuit to first line finders, we will now deal with the calling line scanning which takes place just after the moment when relay CorA has operated as already described, (see column 17, lines 16 et seq.).

In the ESBO first line finder, the subscriber's line circuit scanner output wire is connected to the left grid of the double triode CT1I, CT2I (Fig. 5). At the cathode of triode CT1I is produced a pulse in a time unit characteristic of the calling line, this pulse is transmitted via contact 5 (Fig. 8) in the "A" governor, back contact Pa8A, front contact H5A, back contact Sf3A, back contact Vo5A (Fig. 10) to the grid of triode VT2A in the comparator regenerator CRG1A of Fig. 12, where a pulse is regenerated in the following time unit without comparison with reference pulses, as contact Pa9A keeps the grid of tube CT1A at earth potential in the absence of timing pulses d3.

The regenerated pulse is transmitted to the recorder (Fig. 14) where it fires tube BAVA, which causes the operation of relay XrA, then of relay VorA as already explained, and via back contact Pa4A, front contact Cp4A of operated relay CprA, fires one of tubes VaA1–5 controlled by pulse sources Ra1–5, one of tubes VbA1–5 controlled by pulse sources Rb1–5, one of tubes VcA1–4 controlled by pulse sources Rc1–4, thus operating the corresponding anode relays.

Relay ParA operates via the front contacts of operated anode relays, to earth (Fig. 14).

The tubes remain lit, but relay XrA releases at open contact Pa7A, thus causing the release of relay VorA.

Open contact Pa9A disconnects the earth from grid of tube CT1A thus making it responsive to reference pulses from the coincidence network at the left of Fig. 12 for class of line scanning.

Front contact Pa6A maintains the operation of relay HrA (8).

It is to be noted that relay HrA is a slow releasing relay and therefore cannot release between the opening of its operating circuit at back contact Vo2A and the following closure of same circuit at front contact Pa6A.

In the ESBO for 1st line finder (Fig. 7) are operated relays one, two or three of ArI to FrI as explained in conjunction with the ESBO for cord chooser via contacts 3, 1, 2 (Fig. 8), front contacts Cp2A, Cp3A, Cp5A, a +24 v. or −48 v. potential being applied to one, two or three of said contacts 3, 1, 2 according to the combination of contacts of operated anode relays AarA, . . ., BarA, . . . in the "A" governor.

Relay AfrI in the ESBO for 1st line finder operates and in turn one of the 26 vertical magnets VI (Fig. 26) operates via the pyramid of contacts of relays ArI/FrI, front contact Af3I, contact 10 (Fig. 8) in the "A" governor, front contact Cp9A, relay CwrA in series, to earth.

In the ESBO for 1st line finder preselecting magnet VPI or VSI (Fig. 7) operates in the same manner as described for the ESBO for 2nd line finder, via contact 4 or 6, Fig. 8, in the "A" governor, front contact Cp6A or Cp7A, back contact Xc3A or Xc4A, the one operated of anode contacts Cb5A, Cc5A or the one operated of anode contacts Ca5A, Cd5A, back contact Xa2A, Xb5A, front contact Cp8A to earth.

Thus two lines are selected out of the four lines chosen by the vertical magnet operated, by front contacts VBP1I, VBP2I or VBS1I, VBS2I of the preselecting vertical bar moved (27 or 28).

Relay BfrI operates in parallel with preselecting magnet VPI or VSI via make contacts Af4I and vpI or vsI (Fig. 7).

Relay BfrI and preselecting magnet VPI or VSI are blocked to the earth given by the two front contacts Bf1I, Bf2I.

Earth is given via front contacts Br3I, Bf4I in the ESBO first line finder to relay XarA in the "A" governor, Fig. 8, which operates either via back contact Xb6A, front contact Ca3A or Cd3A, back contact Xc3A, front contact Cp6A, contact 4, then in the ESBO first line finder (Fig. 7), back contacts Tf1I and Ot1I, or via front contact Cc3A or Cb3A, back contact Xc4A, front contact Cp7A, contact 6, then in the ESBO first line finder (Fig. 7), back contacts Tf2I and Ot2I.

Relay XbrA (Fig. 8) operates via front contact Xa3A and is blocked via its own front contact Xb1A and front contact Co6A.

In the ESBO for 1st line finder (Fig. 7) relay TfrI or OtrI operates via contact 8 in the "A" governor, front contact Xb3A, front contact Ca4A or Cc4A to the +24 v. potential for relay TfrI or front contact Cb4A or Cd4A to the −48 v. battery for relay OtrI.

Thus one line only is selected via front contact Tf2I or Ot2I out of the two lines already connected by the operation of preselecting magnet VPI or VSI.

Relay XarA releases, its circuit being opened at contacts Tf1I, Tf2I or Ot1I, Ot2I.

Relay XcrA (Fig. 8) operates via front contact Xb2A and back contact Xa3A. This opens definitively the operating circuits of relay XarA at contacts Xc3A, Xc4A.

A new scanning now takes place for the class of line via the ESBO first line finder.

The class of line indication (regular unrestricted lines, lines in absentee condition, restricted lines, coin-box lines with restricted service, coin-box lines with non-restricted service) is given by two groups of Pd1–11 sources, one applied to lead A 00/99, the other to lead B 00/99 of the scanner in the ESBO for 1st line finder FS (Fig. 5).

The class-of-line scanning pulses are now transmitted from the cathode of the right-hand triode CT2I in said ESBO via contact 9 in the "A" governor, front contact Pa8A (Fig. 8), front contact H5A, back contacts Sf3A, Vo5A (Fig. 10) to the grid of tube VT2A in the comparator regenerator CRG1A (Fig. 12).

Contact Pa9A being opened, the reference pulses of the coincidence network on the left of Fig. 12 control the grid of tube CT1A in conjunction with the timing pulses d3.

There are one reference pulse of sources Ra1–5, one reference pulse of sources Rb1–5, one reference pulse of sources Rc1–5, connected via the corresponding anode relay contact which is closed according to the identity of the calling line.

As the regenerated line scanning pulses are delayed of a time unit with respect to the original line scanning pulse if the latter pulse occurs for instance at time unit corresponding to the coincidence of sources Pa2, Pb3, Pc1 (time unit 37), said pulse is regenerated at time unit 38 corresponding to coincidence of sources Ra3, Rb3, Rc2 in the recorder and fires tubes VaA3, VbA3, VcA2 to which correspond anode relays AcrA, BcrA, CbrA. This explains why, in the coincidence network, sources Ra1–5, Rc1–5 are connected via anode relay contacts Ab2A/Aa2A, Cb2A/Ca2A instead of Aa2A/Ae2A, Ca2A/Cd2A as in the recorder with respect to the same sources and the corresponding anode relays. Anode relay AarA being in that case not operated, sources Rb1–5 are connected via contacts Ba2A/Bd2A and back contact Aa4A, without shift of anode relay contacts.

In the case of a line corresponding to the last source Pa5 of group Pa1–5 for instance at time unit 15 corresponding to the coincidence of sources Pa5, Pb3, Pc3, the pulse is regenerated at time unit 16 which corresponds to control sources Ra1, Rb4, Rc4 in the recorder. Tubes VaA1, VbA4, VcA4 are fired and the corresponding anode relays AarA, BdrA, CdrA are operated.

Since at source Pb3 in the scanner corresponds to source Rb4 in the recorder, it becomes obvious that the anode relay contacts connecting sources Rb1–5 in the coincidence network must also be shifted. As now anode relay AarA is operated, sources Rb1–5 are now connected via anode relay contacts Bb4A/Ba4A and front contact Aa4A.

The two impulses characterizing the class of line are regenerated in the time unit following their coincidence with the reference sources Ra, Rb, Rc and applied to the recorder (Fig. 14) via front contact Pa4A and fires two of tubes VeA1–5 of which the anode circuits are closed via front contact Pa1A and front contact Pa3A for tubes VeA1–3.

Tubes VeA1–3 are controlled by sources Rd9–11, tube VeA4 is controlled by sources Rd1–6, tube VeA5 is controlled by sources Rd7–8.

Accordingly two of anode relays Ear–Edr are operated.

Coming back to the moment when relay YcrA has been operated, the free condition of the first line finder is verified by a last sequence test via the ESBO for 2nd line finder either via front contact VBP1II or VBS1II and Ot2II, or via front contacts VBP2II or VBS2II and Tf2II in said ESBO, contact 6 in the "A" governor, Fig. 9, front contacts Fp7A, Yc4A, Fo3A (Fig. 9), Eo4A, Co3A (Fig. 17), back contact Ho9A, sequence test circuit (Fig. 18).

If the first line finder is free, tube SVA is fired, relay TrA operates.

As relay HmrA is operated since the operation of the horizontal magnet HmL in the cord circuit, horizontal servo magnet HBaII or HBbII is now operated in the ESBO second line finder (Fig. 25) via front contact Ot1II or Tf1II, front contact 4 in the "A" governor, Fig. 9, front contacts Fp6A, Yc3A, Zb2A, Hm2A, back contact Zd6A, front contacts Fo4A and T1A, earth (Fig. 10).

The operation of horizontal servo magnet HBaII or HBbII connects the cord circuit to the required line finder at contacts AL, BL, CL, DL, EL (Fig. 30), by motion of the switch horizontal bar.

The circuit of operation of relay H1mrA ("A" governor) is opened at contact HB2L in the cord circuit.

H1mrA releases causing the release of relay HmrA.

Relay ZdrA can now operate in series with relay ZcrA via front contacts Zc2A and Za4A, the short circuiting earth being withdrawn at open contact Hm1A ("A" governor, Fig. 16).

Horizontal servo magnet HBaII or HBbII releases, the horizontal bar being maintained in contact by horizontal magnet HmL in the cord circuit.

Horizontal magnet HmF operates in the first line finder (Fig. 4) via back contact HB2F, wire c, in the cord circuit contact CL, front contact HB2L, wire g, in the register wire ½ to the earth in the "A" governor (Fig. 16).

Relay H1mrA in the "A" governor re-operates, being connected in parallel via wire ¾ in the register, wire f, contact DL in the cord circuit (Fig. 30), back contact HB1F, front contact Hm1F in the first line finder, to the earth of horizontal magnet HmF (Fig. 4).

Relay HmrA thus also re-operates, causing the operation of relay XerA (in the "A" governor, Fig. 16) via front contact Hm1A.

Relay ZfrA is prevented from operating in spite of front contacts Ze1A, Zd1A, as it is short circuited by the direct earth at contact Hm1A.

Relay FprA releases its circuit being opened at contact Ze5A. The ESBO for 2nd line finder is thus disconnected from the "A" governor, its function of connecting the first line finder to the cord circuit being completed. All the relays operated in said ESBO restore to normal.

In the ESBO first line finder (Fig. 7) horizontal servo magnet HBaI or HBbI operates via front contact Ot1I or Tf1I, front contact 4 in the "A" governor, Fig. 8, front contacts Cp6A, Xc3A, Zd2A, Hm3A, Cw1A and the anode relay contacts characterizing the class of line to earth.

This completes the connection of the first line finder to the subscriber line at contacts AF, BF, CF, DF, EF (in the first line finder, Fig. 4) by motion of the switch horizontal bar.

Via front contact HB2F in the first line finder circuit, the operation circuit of relay H1mrA of the "A" governor is open, this relay releases, and relay HmrA releases.

Horizontal servo magnet HBaI or HBbI releases, the horizontal bar being maintained in contact by horizontal magnet HmF in the first line finder.

Relay ZfrA operates in series with relay ZerA, via front contacts Ze1A, Zd1A, the short circuiting earth being suppressed at open contact Hm1A.

Relay LfrR operates in the register (Fig. 32) from earth (Fig. 16, "A" governor), front contact Zf1A, rectifier G49A, shunting relay LfrA, front contact 5 or 6, then in the register wire 5/6, back contact Rg4R, winding of relay LfrR to the —48 v. battery.

In the register the operation of relay LfrR causes successively the operation of relays LirR, LgrR.

Further, a direct earth is applied to wire 5/6 in the register via front contacts Lb2R, Li3R, Co9R, front contact Is1R of the instepping relay IsrR which has been operated as soon as the first line finder has been connected to the calling subscriber's line.

Thus, in the "A" governor relay LfrA (Fig. 16) operates, a current flowing from the earth in the register via wire 5/6 (in the opposite direction than the one of the current which has operated LfrR), front contact 5 or 6 in the "A" governor (Fig. 16), winding of relay LfrA (rectifier G49A being now blocked) to the junction point of resistors R149A, R150A in the potentiometer between earth and the —48 v. battery.

An earth is given from the "A" governor to the register via the class of line anode relay front contacts (for example Ea4A, Ed2A), front contacts Lf1A, Zf3A, contact 3 or 4, wire 3/4 in the register, front contact Lg4R to terminal 96 in the register, whereas another earth is given in a similar way from the "A" governor to the register via the class of line anode relay contacts (for example Eb1A), front contact Lf3A, Ze4A, back contact Hm5A, wire 1/2 in the register, front contact Lg3R to terminal 97 in the register.

The class of line indication is thus transferred to the register, terminals 96 and 97 being jumpered as convenient to terminals of relays AsrR, CnrR in said register (Fig. 36).

In the "A" governor (Fig. 10), relay BmrA operates via front contact Lf2A, all the tubes in the recorder, Fig. 14, extinguish, the corresponding anode relays release, thus releasing relay ParA.

Relay HrA releases at open contact Pa6A, which causes successively the release of all the relays which had been operated in the "A" governor including relay BurA, so that relay SfrA, Fig. 8, re-operates bringing the "A" governor in the normal rest condition.

In the register circuit (Fig. 32) dialling tone is given to the calling line via back contacts As9R, Fi7R, Lki2R, front contact Lh12R, winding IV of relay IsrR, front contact Lf2R, wire b in the cord chooser, cord circuit, first line finder, subscriber loop, return via wire "a," front contact Lf1R, winding II of relay IsrR to earth.

The calling subscriber can now dial the wanted number.

Relay LmrR (Fig. 33) is released at open contact Li4R.

The "A" governor being released, relay CorR (Fig. 32) also releases and in turn relay TarR (Fig. 33) at open contact Co5R.

The register circuit is held under control of the calling loop, relay L*br*R (Fig. 32) being maintained operated via front contact I*s*1R.

The dial impulses are followed by the instepping relay I*sr*R which transmits them to a group of nine counting relays namely I*ar*R, I*br*R, I*cr*R and J*ar*R to J*fr*R (Fig. 33), via its back contact I*s*1R, front contact L*i*4R, back contacts C*o*3R, L*k*11R, E*i*3R and the combination of contacts I*b*1R, I*c*1R, I*c*2R, I*a*2R, I*a*1R, I*a*2R, J*d*1R, J*b*1R, J*c*1R, J*a*1R, J*a*3R, J*f*1R according to the number of impulses.

Figure 33:
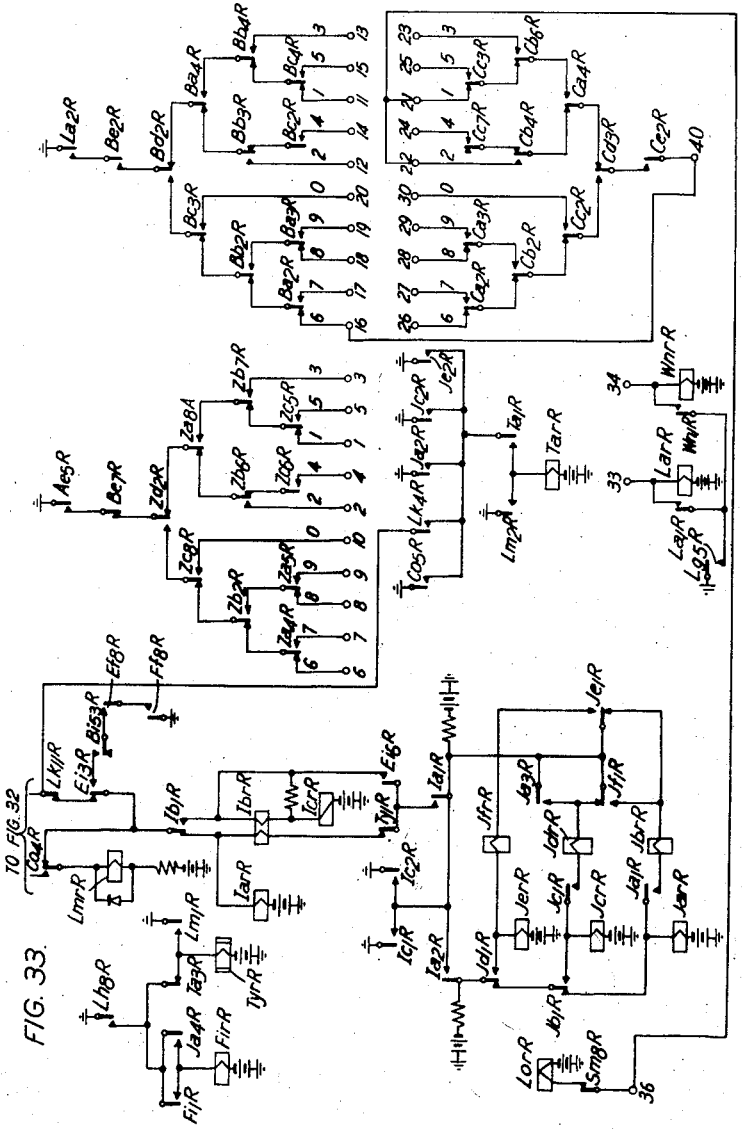

In parallel to these counting relays, relay L*mr*R is operated steadily during each impulse train, and closes in turn the operating circuit of relay T*ar*R (Fig. 33).

Relay T*yr*R (Fig. 33) has been operated when relay T*ar*R has released via back contact T*a*3R and front contact L*h*8R, and is maintained operated when relay T*ar*R reoperates by the front contact L*m*1R.

The first three counting relays I*ar*R, I*br*R, I*cr*R are operated for each cycle of two dial impulses as follows.

When relay I*sr*R releases at the first opening of the calling loop the relay I*ar* is operated via back contact I*b*1R, when relay I*sr*R reoperates the relay I*br* is energized in series with relay I*ar*R via back contact I*c*1R, front contact T*y*1R, as the short circuiting earth at contact I*s*1R is withdrawn.

When relay I*sr*R releases at the second impulse, relay I*cr*R is energized via front contact I*b*1R, the primary winding P of relay I*br*R shunted by the 400 ohm resistor.

At contact I*c*1R the holding circuit for relays I*ar*R and I*br*R is opened, relay I*ar*R releases but relay I*br*R is held operated in series with relay I*cr*R by its winding P.

When relay I*sr*R reoperates the relays I*br*R, I*cr*R release.

The cycles of two dial pulses are counted by the three pair of counting relays: J*ar*R/J*br*R, J*cr*R/J*dr*R, J*er*R/J*fr*R.

When the relay I*ar*R energizes for the first time, it closes an operating circuit for relay J*ar*R via the front contacts T*y*1R, I*a*2R and back contacts J*d*1R, J*b*1R.

Relay F*ir*R (Fig. 33) is energized via front contacts J*a*4R, L*h*8R.

The dialling tone circuit (Fig. 32) is opened at contact F*i*7R, relay F*ir*R is blocked by its own contact F*i*1R.

When relay I*ar*R releases, relay J*br*R operates in series with relay J*ar*R via front contact J*a*1R, back contact J*e*1R, front contact T*a*1R, the short circuiting earth being withdrawn at opened contact I*a*2R.

The second impulse from relay I*ar*R energizes successively the relays J*cr*R, J*dr*R, and the third impulse from relay I*ar*R energizes successively the relays J*er*R, J*fr*R.

When J*er*R operates first at the fifth dialling impulse, relays J*ar*R, J*br*R release at open contact J*e*1R, thus contact J*a*3R is open, however relays J*cr*R, J*dr*R are held in operation via back contact J*f*1R, at the sixth dialling impulse relay J*fr*R operates and relays J*cr*R, J*dr*R release, contact J*f*1R being open.

The relays J*ar*R and J*br*R are then used to count the fourth impulse of relay I*ar*R and in turn the relays J*cr*R and J*dr*R are used to count the fifth impulse from relay I*ar*R.

Fig. 38 shows the relays remaining operated at the end of a pulse train, according to the number of pulses of the train, i.e. the figure dialled from 1 to 0 (counting column).

After the receipt of a figure on the counting relays, the figures are stored successively on a group of four relays provided for each digit as follows.

At the end of an impulse train relay L*mr*R releases, and opens the circuit of relay T*yr*R (Fig. 33) at contact L*m*1R whereby said relay starts to release, at back contact L*m*2R the operating circuit of relay T*ar*R is opened, but the latter relay is held via its own front contact T*a*1R and at least via one of grounded contacts J*a*2R, J*c*2R, J*e*2R.

Figure 34:
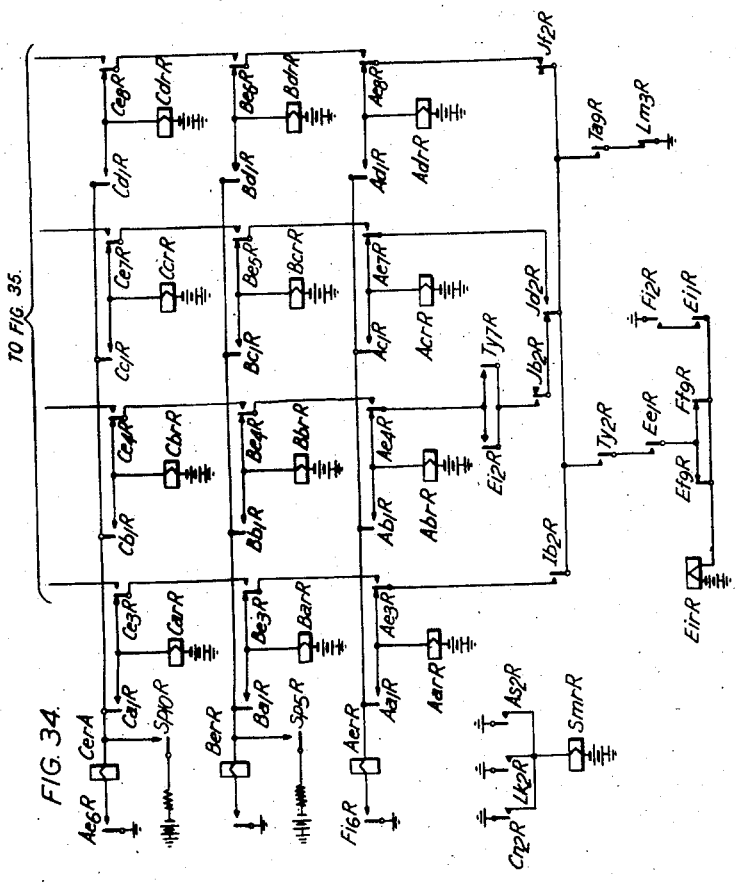

In Fig. 34, via back contact L*m*3R, front contact T*a*9R and the front contacts corresponding to the operated counting relays at the end of the impulse train, one, two or three of relays A*ar*R to A*dr*R is or are operated accordingly to the digit dialled and as shown in Fig. 38 (storing column).

The relay T*yr*R is slow releasing in order to guarantee the operation of the storing relays A*ar*R—A*dr*R. When relay T*yr*R releases the holding circuit of the operated counting relays is opened, thus opening the operating circuits of the storing relays. However, these remain operated by their own make contact to ground via front contact F*i*6R in series with relay A*er*R which at front contacts A*e*3R, A*e*4R, A*e*7R, A*e*8R connects the next group of storing relays B*ar*B/B*dr*R to the counting relay contacts for storing the next digit.

As relay T*ar*R has also released when the counting relays fall back, relay T*yr*R reoperates to prepare again the holding circuit for said counting relays at the reception of next digit.

This digit is stored on the relays B*ar*R to B*dr*R in the same manner as with the relays A*ar*R to A*dr*R for the first digit and at the end of the pulse train, relay B*er*R is operated to switch over to the next group of storing relays C*ar*R/C*dr*R for the third digit, the process is carried out until the fifth digit is stored on relays E*ar*R to E*dr*R, whilst the sixth or last figure remains stored on the nine counting relays I*ar*R/I*cr*R, J*ar*R/J*fr*R of Fig. 33, which are held by the earth at contact E*i*6R replacing the earth at contact T*y*6R. Relay E*ir*R has been operated in parallel with relays E*ar*R/E*dr*R when relay E*er*R has operated via front contacts T*y*2R, E*e*1R, back contact E*f*9R, and is then held via its own make contact E*i*1R and make contact F*i*2R (Fig. 34).

Assuming that the exchange has a capacity for 10,000 lines in the case of a local call, the common hundred thousand digit and ten thousand digit which characterize, the exchange must first be sent (6 digits dialling) and then the thousand digit (a limited number of thousand digit may only be used, for instance 4, if the exchange is not used at full capacity, for instance 4000 lines).

We will suppose that the 10,000 block "86" characterizes the exchange which serves only 4000 lines characterized by the thousand digits 1, 2, 6, 0 (lines 1000–1999, 2000–2999, 6000–6999, 0000–0999).

When the subscriber dials the hundred thousand digit "8," causing thus the storing relays A*br*R, A*dr*R to operate corresponding relays Z*br*R, Z*dr*R operate also (Fig. 35), via front contacts A*b*2R and A*d*2R, back contacts B*e*8R. Relay A*er*R is also operated.

Therefore relay L*ar*R (Fig. 33) is operated via terminal 33 strapped to terminal 8 in the pyramid of contacts of relays Z*ar*R/Z*dr*R, back contact Z*a*5R, front contact Z*b*2R, back contact Z*a*8R, front contact, Z*d*2R, back contact B*e*7R, front contact A*e*5R, to earth.

Relay L*ar*R is blocked via its own front contact L*a*1R and front contact L*g*5R.

When the 10,000's digit "6" is stored (relay B*dr*R, B*er*R operated) the relays Z*br*R, Z*dr*R release at open contact B*e*8R.

An earth is given (Fig. 33) to terminal 16 via make contacts L*a*2R, B*e*2R, B*d*2R, back contacts B*c*3R, B*b*2R, B*a*2R.

Terminal 16 strapped to terminal 40 of the pyramid of contacts of relays C*ar*R/C*er*R (bottom right of Fig. 33), whereas terminals 22, 21 of said pyramid (corresponding to the 1000's digit 2, 1) are strapped in parallel to terminal 36 leading to relay L*or*R (bottom left of Fig. 33).

In this manner when the 1000's digit (either 2 or 1 for an exchange of 2000 lines) is stored on storing relays C*ar*R/C*dr*R, relay C*er*R being also operated, relay L*or*R operates from the earth previously given via terminals 6 and 40, one of terminals 22, 21, terminal 36, back contact S*m*8R, winding of relay L*or*R, battery.

For instance, if the 1000's digit is 2, only relay CbrR is operated amongst storing relays CarR/CdrR, and also relay CerR, therefore a connection is closed between terminal 40 and terminal 22 via front contact Ce2R, back contacts Cd3R, Ca4R, front contact Cb4R.

The operation of relay LorR is an indication of a local call.

A calling potential is connected to point Ef2R (Fig. 37) to seize a "B" governor as follows: +24 v. potential, a 5K resistor, back contacts Es7R, Bs4R, front contacts Lo1R, Ce5R, Ty6R, Ta10R.

This circuit is definitively closed via front contact De2R when the hundred's digit has been stored on storing relays DarR/DdrR and when relay DerR is operated.

The free "B" governors permanently scan for said register calling potential, the register circuits being identified by the time position of their calling potential.

To prevent that two or more "B" governors test on the same calling register, each register circuit is scanned in a different time position by each "B" governor, so that the calling potential can be removed before a second "B" governor scans the same register circuit, although a direct current test is introduced to make the circuits safe against a double seizure.

Figure 41:
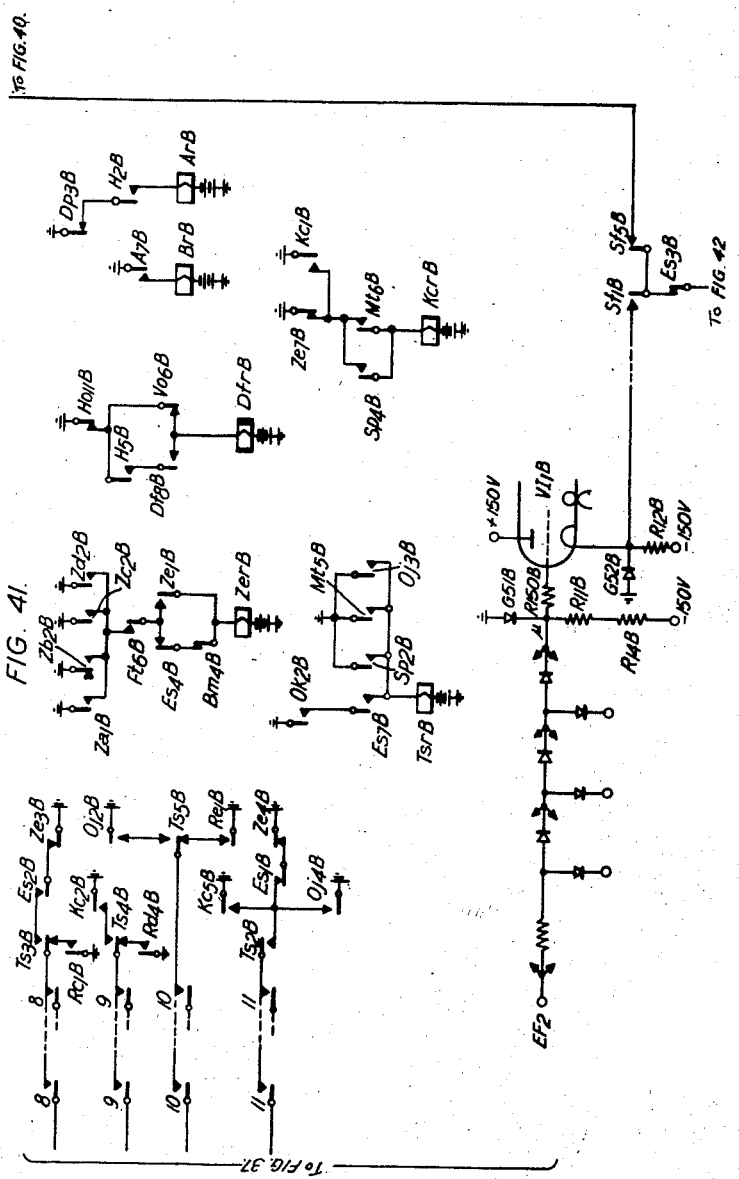

In the "B" governor the scanning for a calling register is performed in the explorer shown in a simplified form at the bottom of Fig. 41, a more detailed form being shown as example in Fig. 69 for three groups of six registers A1, A2, To11, plus two wire chief registers.

The common output point of the explorer is connected to valve VT1B arranged as a cathode follower and the scanning pulse at the output of the explorer produces a positive pulse at the cathode of said tube (Fig. 41).

Normally relay SfrB (Fig. 43) is operated, so that the pulse is transmitted via front contact Sf1B, back contacts Es3B, Bm4B, terminal uB, to the comparator regenerator CRGB (Fig. 42) which operates as explained in conjunction with the "A" governor, Figs. 12 and 13.

The scanning time allocated to said "B" governor is characterized by the required coincidence of pulse sources Rdx, Rex in the coincidence network (top of Fig. 42) and applied respectively to terminal vB via back contacts Ba4B, Pa3B.

A detailed example of connection of sources Rdx, Rex for each "B" governor, according to the total number of "B" governors used is shown in the table of Fig. 70.

Figure 43:
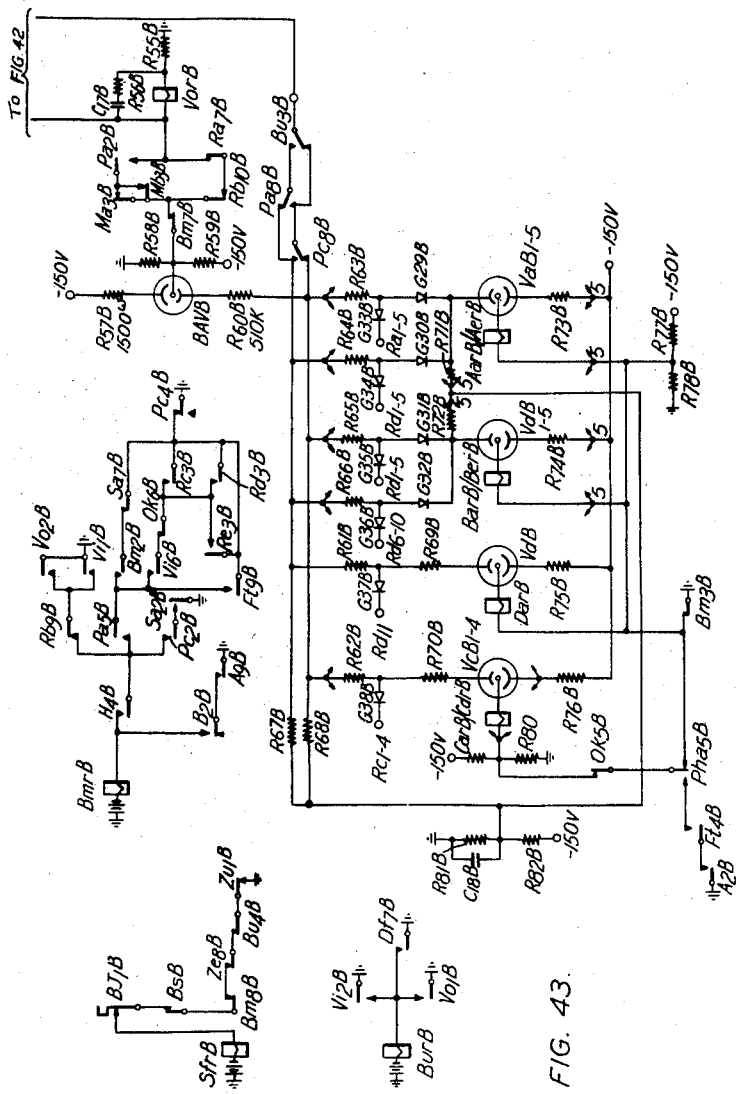

The regenerated pulse at the terminal output xB which occurs in the time unit which follows the one of the scanning pulse, is applied via back contacts Bu3B, Pa8B (Fig. 43) on the one end to the control electrode of cold cathode tube BAVB, on the other end to the control lead of cold cathode tubes VaB1–5 respectively controlled by sources Ra1–5, of cold cathode tubes VbB1–5 respectively controlled by sources Rb1–5, of cold cathode tubes VcB1–4 respectively controlled by sources Rc1–4, in the recorder (Fig. 43).

The anode circuits of cold cathode tubes VaB1–5, VbB1–5 are closed via back relay contact Bm3B, whereas the anode circuits of cold cathode tubes VcB1–4 are closed via back relay contacts Ok5B, Pha5B, Bm3B.

Therefore tube BAVB, one of tubes VaB1–5, one of tubes VbB1–5, one of tubes VcB1–4, are fired in the recorder (Fig. 43).

Thus relay VorB is operated in the anode circuit of tube BAVB; are also operated one of anode relays AarB/AerB, one of anode relays BarB/BerB, one of anode relays CarB/CdrB.

Figure 46:
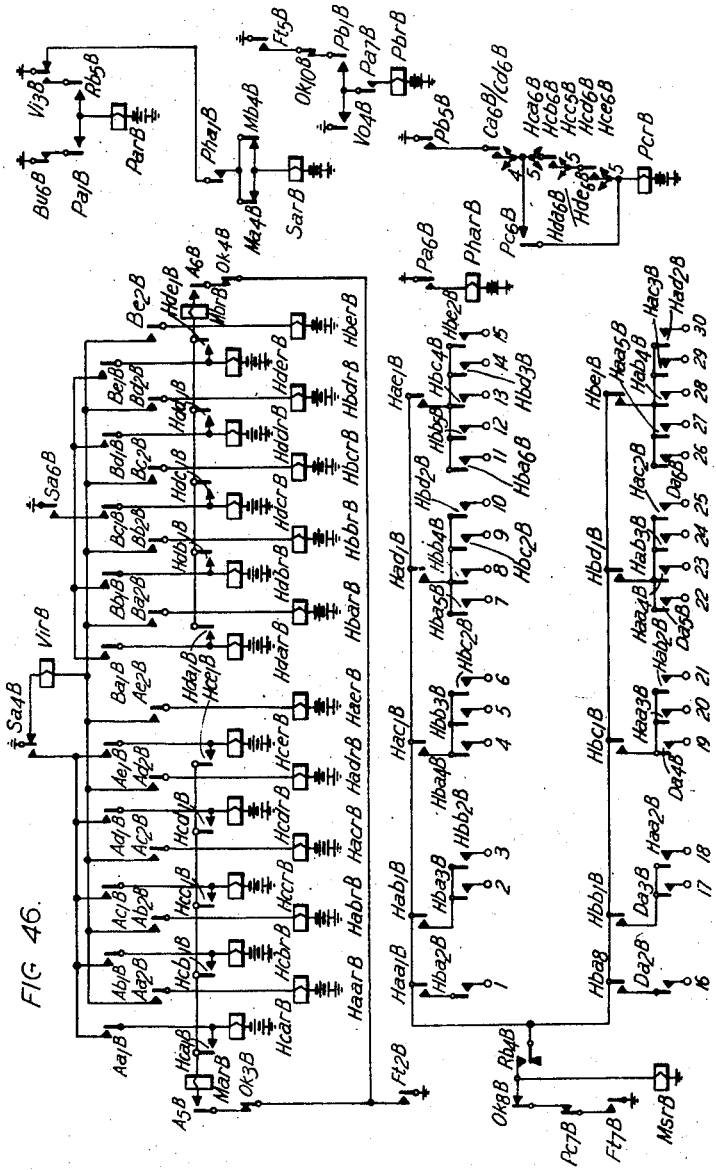

The operation of said anode relays causes the operation of one of relays HaarB/HaerB, of one of relays HbarB/HberB, via one of anode relay contacts Aa2B/Aa2B, one of anode relay contacts Ba2B/Be2B, relay VirB in series (which is also operated) and back contact Sa4B (Fig. 46).

Via the pyramid of contacts of relays HaarB/ . . ., HbarB/ . . . (Fig. 47) one of connecting relays RRB (Fig. 40) corresponding to the calling register is operated in series with relay RarB.

When relay VorB has operated, relay DfrB (Fig. 41) operates via front contact Vo6B and back contact Ho11B, relay BurB (Fig. 43) operates via front contact Vo1B and is held via front contact Df7B.

At front contact Bu4B, the circuit of relay SfrB (Fig. 43) is opened and said relay releases whereas relay FtrB (Fig. 45) operates, an earth being given via back contacts Xd4B, Xc2B, Pha2B, Bu8B.

By closure of contacts 1 to 11 by the operated connecting relay corresponding to the calling register, the calling potential in said register is short-circuited via back contact Bx2R, wire 7 (register, Fig. 37), then in the "B" governor (Fig. 40), contact 7, back contact A4B, front contacts Vo7B, Df4B in parallel, resistor R121B, and the —48 v. battery.

Relay DprB (Fig. 40) is operated from +24 v. potential via contact Lg8R, back contact Bx4R, wire 6 (in the register, Fig. 37), then in the "B" governor (Fig. 40), contact 6, back contact A8B, front contact Df3B, winding of relay DprB, rectifier G63B to earth. Relay DprB is blocked via its own front contact Dp2B, thus preventing relays DprB of other "B" governors to operate.

Figure 40:
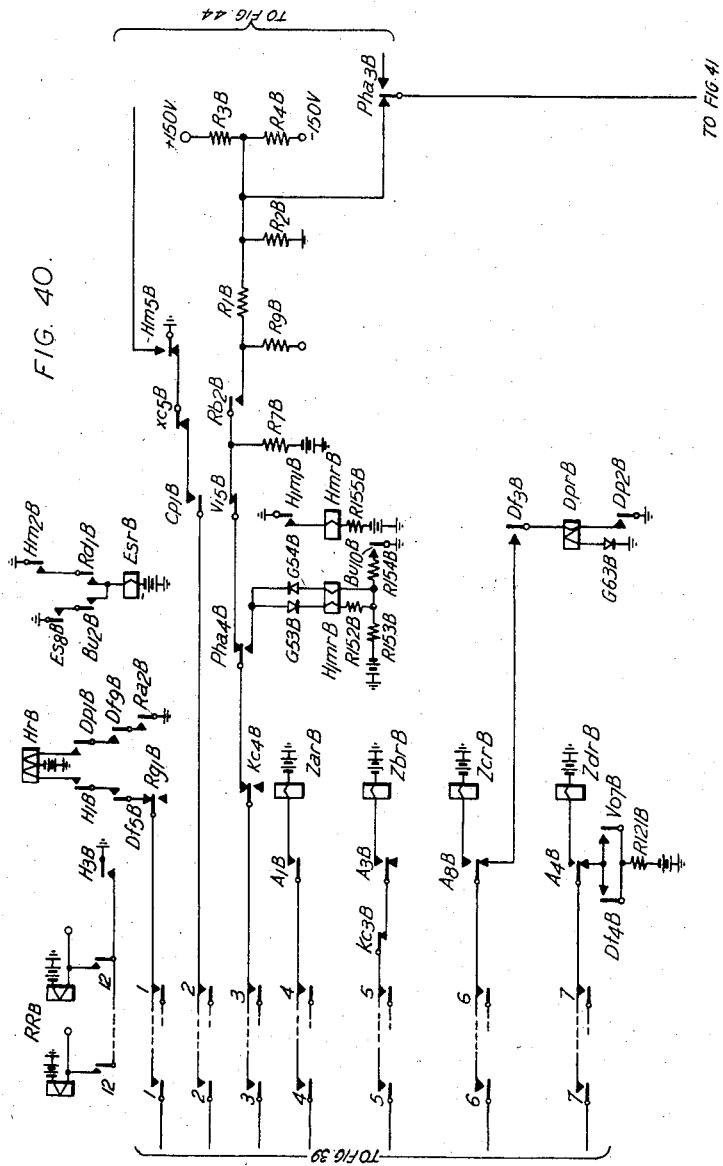

Relay HrB is operated from earth via front contacts Ra2B, Df9B, Dp1B, winding of relay HrB to battery (Fig. 40).

The operated connecting relay RRB is blocked via front contact H3B (Fig. 40) and relay RarB is short-circuited by the earth at front contact H3B and therefore releases.

Relay DfrB is blocked via front contacts H5B (Fig. 41).

Relay HrB is blocked in series with relay AxrR which operates in the register via front contacts H1B, Df5B, contact 1 ("B" governor, Fig. 40), then in the register (Fig. 39), wire 1, front contact Li2R, back contact Bs3R, winding of relay AxrR, earth. Relay AxrR being operated, relay BxrR also operates in the register (32) via front contact Ax2R. At front contact Bx4R (Fig. 37), the circuit of relay DprB (Fig. 40) is opened and said relay releases.

In Fig. 41, relay ArB operates via front contact H2B, back contact Dp3B and relay BrB operates via front contact A7B.

Relay BmrB (Fig. 43) operates via front contact H4B, back contact Rb9B, front contacts Vo2B and Vi1B. The tube BAVB and the recorder tubes which had been fired in the recorder (Fig. 33) extinguish, the anode circuit being opened at front contact Bm7B for tube BAVB and at front contact Bm3B for the tubes of the recorder (Fig. 43).

Relay VorB also releases (Fig. 46), the relays HaarB/HaerB, HbarB/HberB and VirB which had been operated are in turn caused to release. Relay BmrB releases, the earth at contacts Vo2B and Vi1B being withdrawn.

Figure 47:
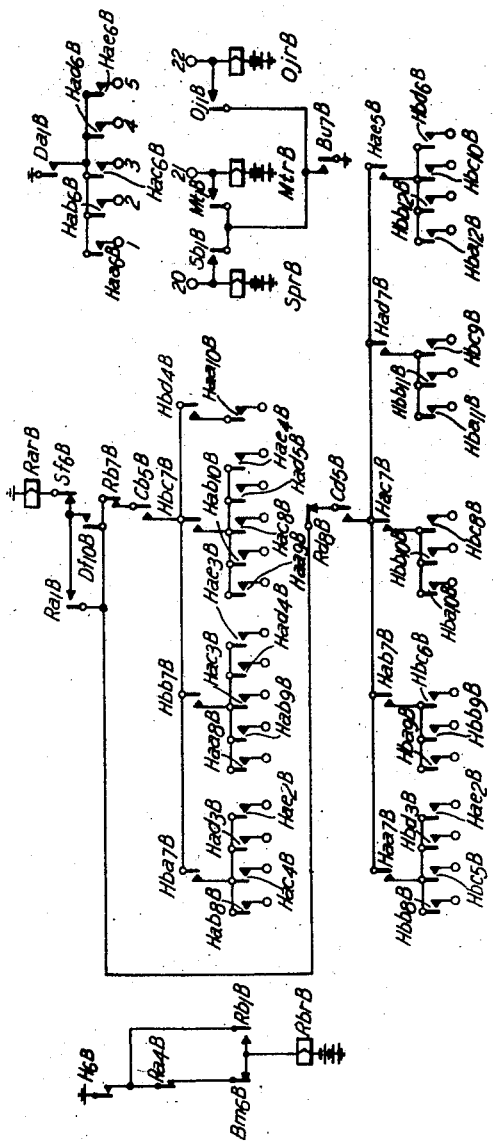

Relay RbrB operates via back contacts Bm6B, Ra4B and front contact H6B (Fig. 47).

Now the recording takes place of the group identity of the first group selector associated with the energized cord circuit.

Figure 42:
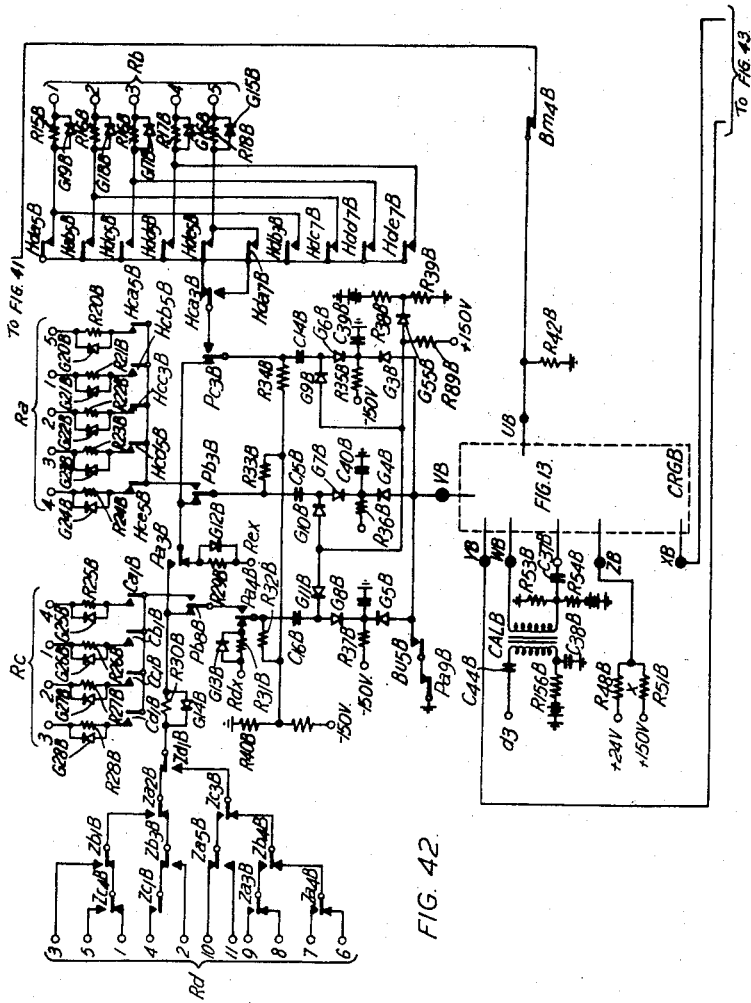

A pulse characterizing said group identity is transmitted from wire Z (Fig. 48) in the ESBO's for first group selector via wire Z (Fig. 31) in the connected cord circuit, back contact Ca4L, wire d (Fig. 32 in the register) front contact Lh7R, back contact Og4R, back contact Sx3R, wire 3, then in the "B" governor, contact 3, back contacts Kc4B, Pha4B, Vi5B, front contact Rb2B, back contact Pha3B (Fig. 40), back contacts Sf5B, Es3B, Bm4B (Figs. 41, 42), to the comparator regenerator CRGB in Fig. 42 (terminal uB).

It is to be noted that the coincidence network (left of Fig. 42) is not used with reference sources, since now terminal vB is earthed via front contact Bu5B and back contact Pa9B.

The impulse characterizing the group identity of said first group selector is regenerated in the same unit following the one corresponding to said first group selector and retransmitted via the output terminal xB of said comparator regenerator, front contact Bu3B to tubes VaB1–5 controlled by sources Rd1–5, tubes VbB1–5, controlled by sources Rd6–10 and tube VdB controlled by source Rd11 (in the recorder, Fig. 43). As a first group selector is characterized by two Pd sources applied to terminals F and G (Fig. 48) in the ESBO for first group selector) two of said tubes are fired. As there are 11 tubes, thus 55 combinations can be obtained to identify 55 groups of first group selectors (maximum capacity). Accordingly, two relays amongst relays HaarB/HaerB, HbarB/HberB are operated in series with relay VirB. One of the connecting relays ERB (Fig. 44) is operated via the corresponding contacts (Fig. 47) thus connecting partially the "B" governor to the ESBO for first group selector required. Relay ParB (Fig. 46) is operated via front contacts Rb5B, and is blocked via its own make contact Pa1B and front contact Bu6B, thus causing relay PharB to operate via front contact Pa6B.

Relay RcrB (Fig. 44) operates via terminal M and the earth at the connecting relay front contact, to characterize a first group selection.

In the register (Fig. 37) relays CgrR and CfrR operate in series via wire 8, then in the "B" governor (Fig. 41), contact 8 of the register connecting relay, back contact Ts3B and front contact Rc1B. In the register, relays ZarR/ZdrR operate according to the 1000th digit stored on the storing relays CarR/CdrR via the corresponding contacts of groups Cf3R, Cf4R, Cg1R, Cg3R of group Ca5R/Cd5R.

Accordingly, earths are given to the corresponding wires 4, 5, 6 and 7 to operate in the "B" governor the corresponding relay ZarB/ZdrB (Fig. 40). At the same time, relay BmrB (Fig. 43) reoperates via front contacts H4B, Pa5B, Vi6B, back contact Ok6B, front contact Rc3B, back contact Pc4B, and is blocked via its own make contact Bm2B (Fig. 43) and the lit tubes in the recorder are extinguished, thus causing the release of relays in groups HaarB, . . . , HbarB, . . . and of relay VirB. Relay SarB operates via back contacts Ma4B, Mb4B in parallel, front contact Pha1B, back contact Vi3B (Fig. 46). Relay BmrB releases, its circuit being open at front contact Sa7B and relay ZerB (Fig. 41) operates via back contacts Bm4B, Es4B, front contact Ft6B, and the operated contacts of group Za1B/Zd2B.

In the register, relay SxrR (Fig. 36) operates via front contacts Cf6R whereas in the cord circuit (first group selector), relay CarL (Fig. 31) operates via wire i, then in the register front contact Lh3R and front contact Sx2R (Fig. 32).

The scanning of a free outlet in the required level now takes place via the ESBO for first group selector in which an explorer is shown at the grid of the tube CT1N (Fig. 48), a more detailed example of source connections being shown in Fig. 73. The pulse characterizing the free outlet is transmitted from the cathode of tube CT1N to contact 11 (Fig. 44) of the ESBO connecting relay, front contact Ze5B, front contact Sa3B, front contact Ft3B (Fig. 44), front contact Pha3B (Fig. 40), back contacts Sf5B, Es3B Bm4B (Figs. 41, 42) to the comparator regenerator CRGB (Fig. 42).

The comparator regenerator is controlled by the coincidence network at the top of Fig. 42, the earth at terminal vB being suppressed at front contact Pa9B.

In the coincidence network the reference sources Rd1–11 are applied via the pyramid of contacts of relays ZarB/ZdrB, front contact Pa3B, back contact Pb3B to terminal vB of the comparator regenerator CRGB.

In the ESBO for first group selector the explorer for free outlet at the grid of tube CTIN is controlled by source Pd1–11 applied to terminal A (Fig. 48), each Pd source corresponding to a level (1000's digit).

Therefore, the level required by the selection, in which a free outlet must be identified and recorded is selected in the coincidence network by the combination of contacts of relays ZarB/ZdrB which characterizes the 1000's digit and accordingly transmits only one Rd source to terminal vB.

The regenerated impulse at the output terminal xB of the comparator CRGB is therefore characteristic of a free outlet in the required level (associated with the 1000's digit). Said regenerated impulse is retransmitted, in the manner already explained to the recorder (Fig. 43) to which it is applied via front contact Bu3B, front contact Pa8B, back contact Pc8B, thus firing tube BAVB, one of the tubes VaB, . . ., controlled by sources Ra1–5, one of the tubes VbB . . ., controlled by sources Rb1–5, one of the tubes VcB . . ., controlled by sources Rc1–4, the anode circuits of tubes VaB . . . and VbB . . . being closed via back contact Bm3B whereas the anode circuit of tubes VcB . . . are closed via back contact Ok5B, front contacts Pha5B, Ft4B, A2B. The corresponding anode relays AarB . . ., BarB . . ., CarB . . . are operated thus causing the operation of the corresponding relays in groups HcarB/HcerB, HdarB/HderB (Fig. 46), via the corresponding anode relay contacts and front contacts Sa4B, Sa6B.

With the firing of tube BAVB relay VorB (Fig. 43) is reoperated, thus causing the operation of relay PbrB (Fig. 46) via front contact Pa7B and front contact Vo4B. Relay PcrB is blocked via front contact Pb1B. In turn relay PcrB (Fig. 46) operates via contacts of the operated relays in groups HdarB . . ., HcarB . . ., anode relay contacts in group Ca6B/Cd6B and front contact Pb5B, and blocks via front contact Pc6B.

Relay BmrB (Fig. 43) reoperates via front contacts H4B, Pc2B, Sa2B. At contact Bm7B, the anode circuit of tube BAVB is open, same tube is extinguished and relay VorB releases. At contact Bm3B the anode circuits of tubes in groups VaB . . ., VbV . . . are opened and the corresponding lit tubes are extinguished whilst the anode relays are released. The anode circuit of the lit tube in group VcB . . . remains closed, this tube remains lit and its anode relay remains operated.

The corresponding contacts in groups Aa1B/Ae1B, Ba1B/Be1B being open, relays MarB, MbrB can now operate in series with relays HcarB . . ., HdarB . . ., via the front contacts of these relays, front contact A5B, A6B, back contacts Ok3B, Ok4B, front contact Ft2B, the short-circuiting earth at front contact Sa4B being withdrawn (Fig. 46). Relay SarB releases, its circuit being open at front contact Ma4B and Mb4B.

Now the scanning takes place for class of outlet to give indication if it is a local call, a special service call or a call for an outgoing junction. This is performed from the ESBO for first group selector (Fig. 48) where at the grid of tube CT2N an explorer is shown in a simplified form, a more detailed example of source connections being shown in Figs. 73–74. At terminals E and D of the explorer shown in Fig. 48, two control sources Pd are applied according to the identity of the next stage selector connected to the outlet scanned by the explorer. The class of outlet scanning impulse reproduced at the cathode of tube CT2n is transmitted to contact 9 in the "B" governor (Fig. 44) and from there via front contact Pc5B, back contact Sa3B, front contact Ft3B (Fig. 44), front contact Pha3B (Fig. 40), back contacts Sf5B, Es3B, Bm4B (Figs. 41, 42), to the comparator regenerator CRGB (Fig. 42) where the impulse is registered in the following time unit in a manner as already explained.

The coincidence network (Fig. 42) is now connected via front contacts Pb3B, Pb8B, Pc3B to pulse sources Ra, Rb, Rc according to the combination of contacts of operated relays in groups HcarB/HcerB, HdarB/HderB which are arranged as explained for the "A" governor, to take into account the delay of one time unit in the comparator regenerator.

The regenerated impulse is transmitted to the recorder (Fig. 43) via front contacts B$u$3B, P$a$8B, P$c$8B, where it fires two tubes among cold cathode tubes V$a$B . . ., controlled by sources R$e$1–5, cold cathode tubes V$b$B . . ., controlled by sources R$d$6–10, cold cathode tube V$d$B controlled by source R$d$11. Accordingly, two of the anode relays A$ar$B . . ., B$ar$B . . ., D$ar$B are operated, thus causing the operation of relays H$aa$B . . ., H$bar$B . . . in series with relay V$ir$B (Fig. 46).

From the pyramid of contacts of the top right of Fig. 47, one or none of relays S$pr$B, M$tr$B, O$jr$B is operated. Relay O$jr$B operates for on outgoing junction, S$pr$B or M$tr$B for a special service call and none of these relays operate for a local call. At the top right of Fig. 47, f.i., terminal 1 can be strapped to terminal 21, terminal 2 can be strapped to terminal 20, terminal 3 can be strapped to terminal 22, so that relays S$pr$B, M$tr$B, O$jr$B receive an earth via front contact D$a$1B, the corresponding contacts H$aa$6B/H$ae$6B, and these relays are blocked via their own contact and front contact B$u$7B to earth.

The operation of relay S$pr$B or M$tr$B or O$jr$B for non local calls causes the operation of relay T$sr$B (Fig. 41) and at front contacts T$s$3B the earth is withdrawn from contact 8 (Fig. 41), thus from wire 8 in the register in which relays C$fr$R, C$gr$R are caused to release. Therefore the relays Z$ar$R/Z$dr$R release in the register and subsequently the relays Z$ar$B/Z$dr$B and also relay Z$er$B release in the "B" governor (Fig. 41).

Therefore, if relay M$tr$B or S$pr$B (special service call) is operated, relay K$cr$B operates (Fig. 41) via front contact S$p$4B or M$t$6B, thus connecting an earth to wires 9 and 11 of the register via front contacts K$c$2B and K$c$5B. If relay O$jr$B is operated (outgoing junction call), relay K$cr$B does not operate and earth is given to wires 10 and 11 in the register via front contacts O$j$2B and O$j$4B (Fig. 41).

The selection is thus continued by means not shown as we are only explaining the process of a local call.

It is however to be stressed that it is a main feature of the "B" governor to be able to discriminate in the course of the selection the class of outlet (outgoing junction, special services, local call) and to cause indirectly the corresponding operation of the register which is purely passive, whereas in previous systems it was one of the functions of the register to perform this discrimination.

In the case of a local call in which we are interested for the present, none of the relays S$pr$B, M$tr$B, O$jr$B is operated, but relay M$sr$B (Fig. 46) operates in series with one of connecting relays ERB for third group selectors (Fig. 44), said connecting relay however does not operate yet, the current being sufficient to operate relay M$sr$B but insufficient to operate the connecting relay.

Coming back to the moment when relay P$br$B has operated, a sequence test can take place to test for the free condition of the ESBO for first group selector. It said ESBO is free, a potential of +24 v. is therein applied (Fig. 49) via contact T$f$3N, O$t$3N, MCN, A$f$3N, then in the "B" governor (Fig. 44), contact 10, back contact C$p$10B, back contact H$o$10B, front contact P$b$2B to the sequence test circuit STB in Fig. 45. The cold cathode tube SVB is fired, its anode circuit being closed via back contact X$a$4B, back contact O$k$9B, front contact D$f$1B to +24 v.

Relay T$r$B is operated in the cathode circuit of said tube.

The sequence test circuit is controlled by pulse sources R$ax$, R$bx$, so that the "B" governor can only test in the time unit allocated to it.

The distribution of said R$ax$, R$bx$ sources for each "B" governor is shown as an example in Fig. 71.

Relay C$pr$B (Fig. 45) operates via front contact D$f$2B, back contact H$o$8B, back contact X$b$3B, front contact T1B. Thus the connection between the "B" governor and the ESBO for first group selector is completed by the contacts of the operated relay C$pr$B.

Figure 44:
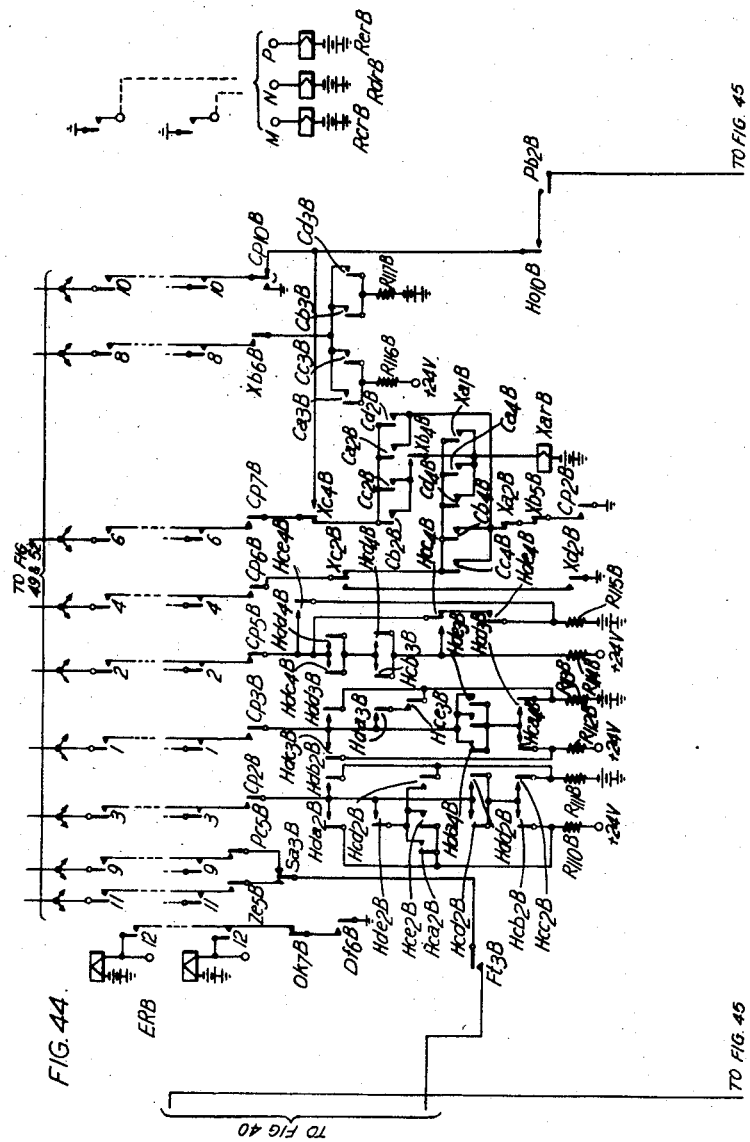

In said ESBO, one, two or three of relays A$r$N to F$r$N, as already explained (Fig. 49) operate or operates respectively via contacts 3, 1, 2 ("B" governor, Fig. 44, respective contacts C$p$2B, C$p$3B and C$p$5B, a +24 v. potential of —48 v. battery, being applied to one, two or three of said contacts 3, 1, 2 via the combination of contacts of relays in groups H$car$B . . . H$dar$B . . . .

Relay A$fr$N (Fig. 49) operates via contact of relays A$r$N/F$r$N.

One of the 26 vertical magnets (Fig. 48) operates via the pyramid of contacts of relays A$r$N/F$r$N, front contact A$f$3N (Fig. 49) contact 10, front contact C$p$10B, to each (Fig. 44).

Each vertical magnet controls four outlets.

Preselecting magnet VPN or VSN (Fig. 49) is operated via back contact B$f$3N or B$f$4N, back contact O$t$1N or O$t$2N, back contact T$f$1N or T$f$2N, contact 4 or 6 (Fig. 44), front contact C$p$6B or C$p$7B, back contact X$c$2B or S$c$4B. Therefore, two out of the four outlets controlled by the operated vertical magnet are selected by the preselecting vertical bar contacts VBP1N, VBP2N or VSP1N, VSP2N.

Relay B$fr$N (Fig. 49) operates via front contact A$f$4N, front contact $vp$N or $vs$N in parallel with preselecting magnet VPN or VSN. Relay B$fr$N is blocked by its own front contacts B$f$1N and B$f$2N in parallel.

Relay X$ar$B (Fig. 44) operates via one of contacts C$a$4B, C$d$4B or one of contacts C$c$2B, C$b$2B, back contact X$c$2B or X$c$4B, front contact C$p$6B or C$p$7B, contact 4 or 6 (Fig. 44), then in the ESBO (Fig. 49), back contact T$f$1N or T$f$2N, back contact O$t$1N or O$t$2N, front contact B$f$3N or B$f$4N to earth.

Tube SVB (Fig. 45) is extinguished and relay T$r$B is released, the anode circuit of the tube being opened at front contact X$a$4B. Relay X$br$B. (Fig. 45) operates via front contact X$a$3B and back contact T1B.

In Fig. 49 relay T$fr$N or O$tr$N operates via contact 8 (Fig. 4) front contact X$b$6B, one of contacts C$a$3B, C$c$3B, or one of contacts C$b$3B, C$d$3B to +24 v. potential or —48 v. battery, thus connecting to the "B" governor only one out of the two outlets selected by preselecting magnet VPN or VSN (via front contact O2N or T$f$2N).

Relay X$ar$B (Fig. 44) releases, its operating circuit being opened at contacts O$t$1N or T$f$1N or at contacts O$t$2N or T$f$2N.

In the first group selector horizontal magnet HgL (Fig. 31) operates from earth in the "B" governor (Fig. 40) via back contacts H$m$5B, X$c$5B, front contact C$p$1B, contact 2, then in the register (Fig. 39 or 32), wire 2, front contact L$h$2R, contact and wire $g$, then in the cord circuit wire $g$, front contact C$a$3L, back contact HB$g$2L and winding of magnet HgL to battery (Fig. 31).

Upon operation of horizontal magnet HgL, relay H1$mr$B ("B" governor, Fig. 40) operates in parallel with said magnet via front contact Hg1L, back horizontal bar contact HB$g$1L (Fig. 31) back contacts S$a$3L, B$c$6L (Fig. 30) wire and contact $f$, front contact L$h$1R, back contact E$f$3R, front contact S$x$3R (register, Fig. 32), wire 3 (Fig. 39), then in the "B" governor (Fig. 40), contact 3, back contact K$c$4B, front contact P$ha$4B, rectifier G53B, primary winding of relay H1$mr$B to —48 v. battery.

Relay H$mr$B operates via front contact H1$m$1B.

When relay H$mr$B has operated, the operating circuit of magnet HgL (first group selector) and relay H1$mr$B ("B" governor) is opened at contact H$m$5B. However, relay H1$mr$B and magnet HgL are held operated in series from earth (Fig. 40), front contact B$u$10B, secondary winding of relay H1$mr$B, rectifier G54B, front contact P$ha$B, back contact K$c$4B, contact 3 (Fig. 40), then wire 3, front contact S$x$3R, back contact E$f$3R, front contact L$h$1R, contact and wire f in the register circuit (Figs. 39 or 32), back contacts Bc6L, Sa3L (Fig. 30, cord circuit), then horizontal bar, back contact HBg1L, front contact Hg1L, magnet HgL to −48 v. battery.

Relay XcrB (Fig. 45) operates via front contact Xb2B, front contact Hm1B, back contact Xa3B and back contact T1B.

Now the sequence test takes place for a free outlet via the ESBO for first group selector. The free potential is applied via the ESBO for first group selecteor to the "B" governor via contact 6 (Fig. 44), it is transmitted via front contact Cp7B, front contact Xo4B, back contact Ho10B, front contact Pb2B, (Fig. 44), to the sequence test circuit (Fig. 45). Tube SVB is fired and relay TrB re-operated as the anode circuit of tube SVB is again closed via back contact Xa4B.

The operation of relay TrB causes the operation of relay XdrB via front contact Xb3B and front contact T1B, and locks via front contact Xd5B.

It is to be noted that relay FtrB (Fig. 45) is a slow releasing relay and remains operated after the opening of its circuit at front contact Xc2B until the closure of the circuit at front contact Xd4B.

In the ESBO for first group selector (Fig. 49) the horizontal servo magnet HAaN or HBaN is energized via front contact Ot1N or Tf1N, contact 4, front contact Cp6B, front contact Xc2B, front contact Xd2B to earth (Fig. 44, "B" governor). Thus the first group selector is connected through to the free outlet towards the third group selector at contacts A'L, B'L, C'L, D'L, E'L (Fig. 31) by motion of the horizontal bar.

Relay H1mrB is caused to release by opening of its circuit at the horizontal bar contact HBg1L (Fig. 31), therefore relay HmrB also releases.

Relay OkrB (Fig. 45) operates via front contact Ms1B of relay MsrB of which the operation has been mentioned before, back contact Sa9B, front contact Xd1B, front contact Xc5B, back contact Hm5B to earth (Fig. 40). The connecting relay which has been operated for the first group selection releases, its circuit being opened at contact Ok7B. Relay RcrB (Fig. 44) releases, its earth being suppressed by the release of the connecting relay. The tube VoB which had remained lit now extinguishes, the anode circuit being opened at contact Ok5B, and the corresponding anode relay CarB/CdrB also releases.

Horizontal servo magnet HAaN or HBaN is released but the horizontal bar remains held in position by the first group selector horizontal magnet HgL.

Relay PbrB (Fig. 46) releases, its circuit being opened at contact Ok10B. Relay PcrB in turn releases, the earth being suppressed at contact Pb5B and also at the anode relay contacts and at the contacts of relay HcarB . . . , HdarB . . . which also release with relays MarB and MbrB. Relays CprB and XbrB (Fig. 45) release, their earth being withdrawn at contact Pb6B. Relay ScrB releases through opening at contact Xb2B.

Tube SVB extinguishes, relay TrB releases, the anode circuit of the tube being opened at contact Ok9B, relay XdrB is thus caused to release, its earth being withdrawn at back contact T1B.

In the register, relays CfrR and CgrR release, the earth in the "B" governor (Fig. 41) being withdrawn from wire 8 at back contact Rc1B.

Figure 35:
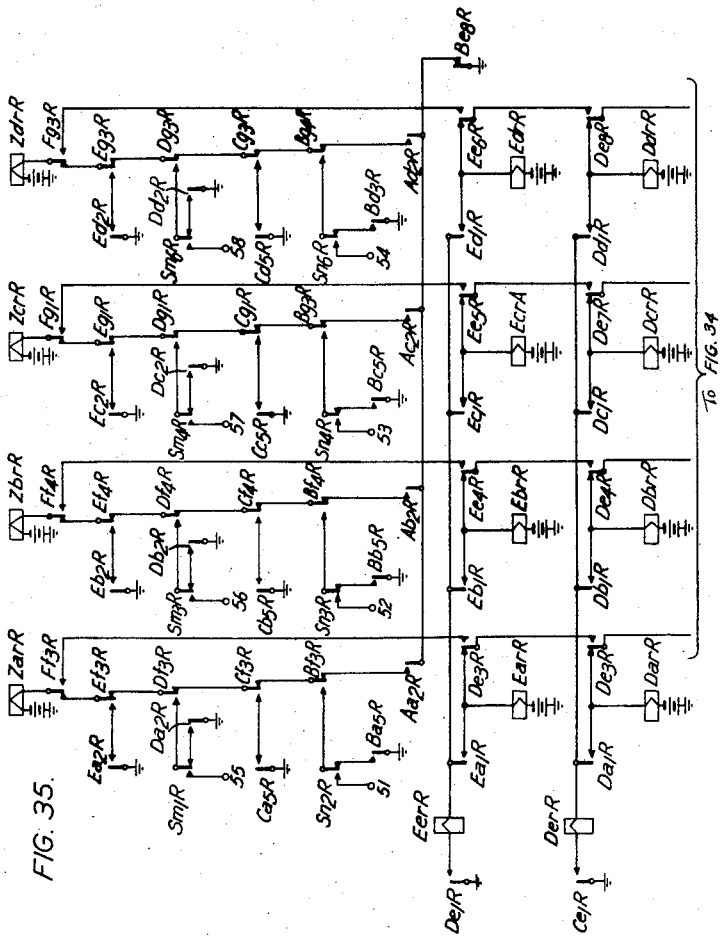
Figure 37:
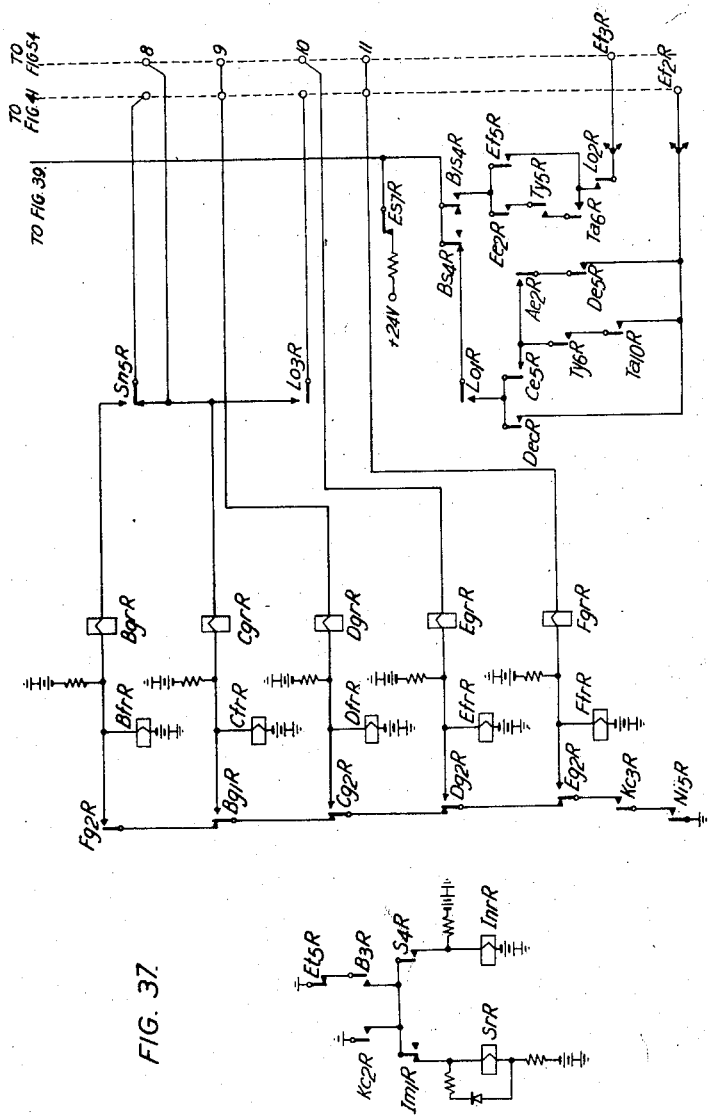
Figure 39:
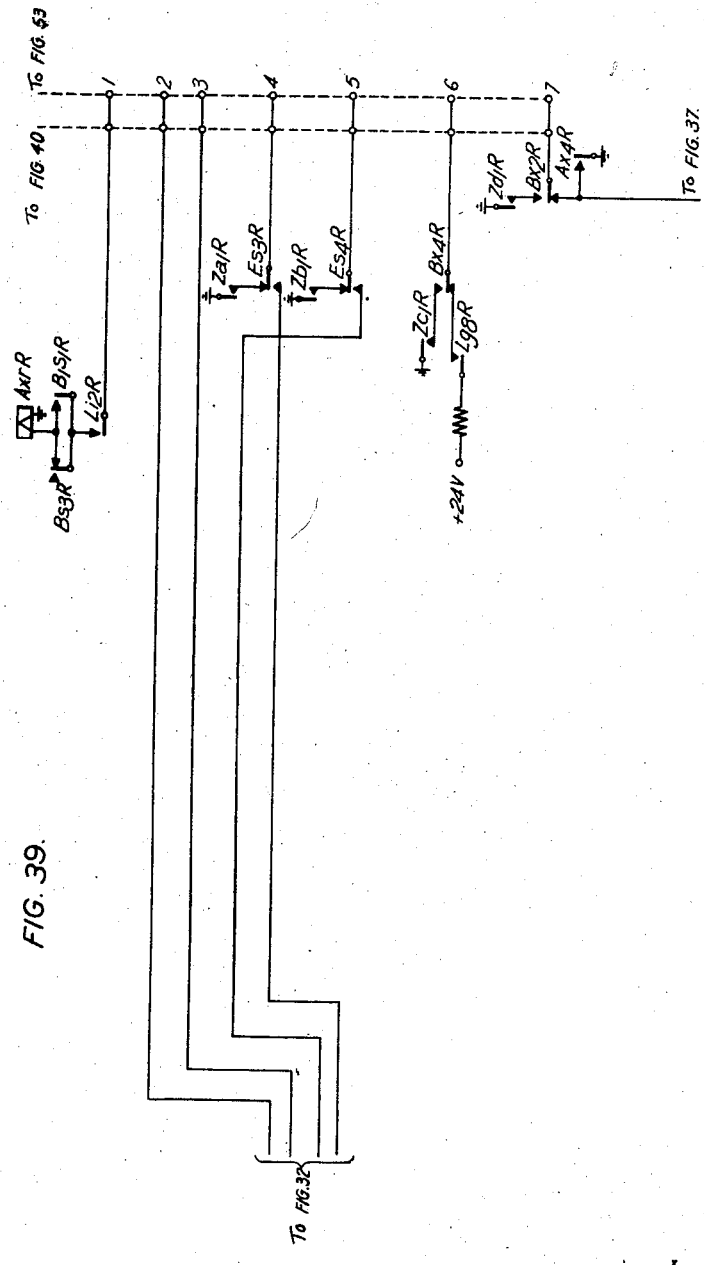

Thus the thousand's digit combination of relays ZarR/ZdrR in the register disappears, these relays being caused to release (Fig. 35). The corresponding relays ZarB/ZdrB in the "B" governor consequently release, causing the release of relay ZerB (Fig. 41).

The release of relay XdrB and of relays XcrB causes the release of relay OkrB. The relay MsrB releases as its short circuiting earth is re-established via back contact Ok8B.

The current in the connecting relay to an ESBO for third group selector which was connected in series with relay MsrB is now sufficient to operate said connecting relay which prepares a connection between the "B" governor and the ESBO for third group selector in view of the next selection stage. Relay RdrB (Fig. 44) is operated via terminal N by the earth given by the connecting relay to characterize the third group selection.

It is to be noted that in Fig. 47, 30 terminals have been shown via which can be operated 30 connecting relays ERB, this is only as an example, less or more can be used.

Amongst these connecting relays ERB, some are used to connect the "B" governor to the ESBO for first group selector, others for connection to ESBO for second group selector if required (second group selection or special services . . .), others for connection to ESBO for third group selection, others for connection to ESBO for spare selectors.

An example of such a distribution of connecting relays ERB (1 to 30) is shown in the table of Fig. 75.

In the register relays DfrR and DgrR (Fig. 37) are operated via wire 9, contact 9 in the "B" governor (Fig. 41), back contact Ts4B and front contact Rd4B.

In the register (Fig. 35) a combination of relays ZarR/ZdrR is operated according to the hundred's digit via the corresponding front contact or contacts in each of groups Df3R, Df4R, Dg1R, Dg2R and Da2R, Db2R, Dc2R, Dd2R, according to the 100's figure stored on relays DarR/DdrR.

The corresponding combination of relays ZarB/ZdrB (Fig. 40) is operated in the "B" governor via wire 4, 5, 6, 7, as described for the 1000's figure.

Relay BmrB (Fig. 43) operates via front contact H4B, front contact Pa5B, front contact Vi6B, back contact Ok6B, front contact Rd3B, back contact Pc4B. All the tubes lit in the recorder (Fig. 43) extinguish and the corresponding anode relays release.

Relays HaarB . . . HbarB . . ., VirB release.

Relay SarB operates via back contact Vi3B, whereas relay BmrB releases at front contact Sa7B. Relay ZerB (Fig. 41) re-operates in the same manner as stated for the first digit.

Now the scanning takes place for a free outlet towards a final selector group. In the ESBO for third group selector (Fig. 51), an explorer is shown in a simplified form and used to scan 100 outlets for free condition. The output for said explorer is connected to the grid of tube CT1Q and the scanning pulse reproduced at the cathode of said tube is transmitted to contact 11 (Fig. 44, "B" governor) and from there to the comparator regenerator CRGB (Fig. 42) in the same manner as described for the free outlet scanning in conjunction with the first group selection (front contact Ze5B, front contact Sa3B . . .).

The required level (associated with the 100's digit) is selected by the coincidence network at the left of Fig. 42, by the new combination of contacts of relays ZarB/ZdrB through which the Rd source corresponding to said level is applied to terminal vB, in the similar manner as for the first group selection, the free outlet pulses of other levels being thus eliminated.

The regenerated impulse at the output of said comparator regenerator is transmitted in a manner already described to the recorder (Fig. 43) where it fires tube BAVD and a combination of tubles VaB . . . , VbB . . . , VcB . . . and operates the corresponding anode relays AarB, . . . , BarB, . . . , CarB, . . . and consequently relays HcarB, . . . HdarB . . . in the manner already described for the first group selection. Relay VorB is also re-operated causing the operation of relay PbrB via front contact Pa7B and front contact Vo4B.

Relay PcrB is operated via the combination of relays mentioned in the preceding paragraph and front contact Pb5B.

Relay BmrB re-operates via front contacts Pc2B and Sa2R. Tube BAVB, tubes in groups VaB, . . . VbB . . . extinguish, their anode relay releases but the tube in group VcB . . . is held as explained with the first group selection.

Relays MarB, MbrB operate in the blocking circuit of relays HcarB . . ., HdarB, . . . Relay SarB (Fig. 46) releases and in turn relay BmrB.

At the moment when relay PbrB releases, takes place the sequence test for the free condition of the ESBO for third group selector. This is done in the same manner as explained in conjunction with the first group selector via contact 10 (Fig. 44), the test potential of +24 v. being given in said ESBO (Fig. 52).

Tube STV (Fig. 45) is fired, relay TrB operates causing the reoperation of relay CprB.

In the ESBO third group selector (Fig. 52) one, two or three of relays ArQ to FrQ is or are operated as already explained, in turn relay AfrQ operates and one of the 26 vertical magnets VQ operates to discriminate four outlets out of the 104 outlets (26×4) by the motion of the corresponding vertical bar.

Two of these four outlets are selected by the operation of preselecting magnet VPQ or VSQ and the motion of the corresponding preselecting bar as explained in conjunction with all ESBO's described until now.

Relay BfrQ operates (Fig. 52) causing the operation of relay XarB (Fig. 44) and in turn the release of relay TrB (Fig. 45, tube SVB is also extinguished). Relay XbrB (Fig. 45) reoperates, causing the operation of relay TfrQ or OtrQ in the ESBO (Fig. 52) and the connection of one outlet only to the "B" governor (via Tf2Q or Ot2Q). Relay XarB releases.

When relay CprB has operated, the horizontal magnet HmP (Fig. 50) in the third group selector operates via the horizontal bar, back contact HB2P (Fig. 50), then wire c in the first group selector (Fig. 31), horizontal bar contact HBg1L, front contact Ca3L (Fig. 30), to the earth in the "B" governor via the register (wire 3) as described for the operation of the first group selector horizontal magnet HgL.

Relay H1mrB reoperates and also relay HmrB.

Relay EsrB (Fig. 40) operates via front contacts Rd1B, Hm2B and is blocked via front contact Bu2B and its own front contact Es8B.

Relay XcrB (Fig. 45) reoperates and a sequence test is now performed for the free condition of the outlet in the known maner. Tube SVB is fired, relay TrB reoperates and relay XdrB operates via front contact T1B.

The horizontal servo magnet HAaQ or HBaQ operates in the ESBO for third group selector (Fig. 32) and completes the connecting through between third group selector and the free outlet towards the final selector at contacts AN, BN, CN, DN, EN (Fig. 50) by motion of the horizontal bar.

Relay H1mrB releases and also relay HmrB. Relay OkrB reoperates.

Thus as a result of this operation, the ESBO connecting relay for third group selector releases and also relay RdrB. The tube VcB which had remained lit extinguishes, the corresponding anode relay CarB/.CdrB releases.

Relay PbrB releases and in turn relay PcrB.

Relays CprB and XprB release and cause the release of relay XcrB. Relays HcarB, . . ., HdarB . . ., MarB, MbrB release.

As a result of the release of the ESBO connecting relay, horizontal servo magnet HAaQ or HBaQ releases, but the horizontal bar is held in position by the third group selector horizontal magnet HmP (Fig. 50).

Relay TrB releases and in turn relay XdrB.

Relay TsrB (Fig. 41) operates via front contact Es7B and front contact Ok2B. The earth at contact 9 (Fig. 41) is withdrawn and thus relays DfrR and DgrR in the register (Fig. 37) release and cause the release of previously operated relays ZarR/ZdrR (Fig. 37) and the corresponding relays ZarB/ZdrB in the "B" governor (Fig. 40) and in turn relay ZerB (Fig. 41). An earth is applied to wires 8 and 11 (Fig. 41) respectively via back contacts Ze3B and Ze4B, front contacts Es2B and Es1B, front contact Ts3B and Ts2B. Therefore, in the register relay CfrR and CgrR are reoperated via wire 8 and relays FfrR and FgrR are operated via wire 11.

This causes the operation of relay BsrR (Fig. 36) via front contacts Cf2R and Ff2R. Relay AxrR (Fig. 39) releases, the circuit being opened at front contact Bs3R and relay BxrR (Fig. 32) releases while in the "B" governor, holding relay HrB releases as it was blocked in series with relay AxrR.

The release of this holding relay causes successively the release of all operated relays in the "B" governor and the restoration of said "B" governor to the initial condition.

The relays DfrB, ParB, RhrB, ArB and the register connecting relays first release.

In turn the ESBO connecting relay, relays BurB, PharB, BrB release.

Then relays CfrR, CgrR, FgrR (register), EsrB, FtrB ("B" governor) release, whilst relay SfrB is reoperated as in the normal condition.

Relays SxrR (register), OkrB, TsrB ("B" governor) then release.

Relay B1sR (register, Fig. 36) operates via back contact Sx8R in parallel with relay BsrR.

In the cord circuit relay CarL is held operated via front contact Bs2R (register, Fig. 32), when the earth disappears at open contact Sx2R.

After the operation of relay EerR (register, Fig. 35) upon completed reception and storing of the 10's digit, the calling potential of +24 v. is now transmitted to terminal Ef3R (Fig. 37) towards the "C" governors via front contact B1s4R, front contacts Ee2R, Ty5R, Ta6R, Lo2R.

The short circuiting earth of said calling potential being withdrawn at back contact Ax4R.

The calling register can now be scanned by the "C" governor for the final selection, in the same manner as was explained for the "B" governor (group selection), each "C" governor being allocated a different scanning period to avoid that two "C" governors are seized by the same calling register (see Fig. 69).

Figure 54:
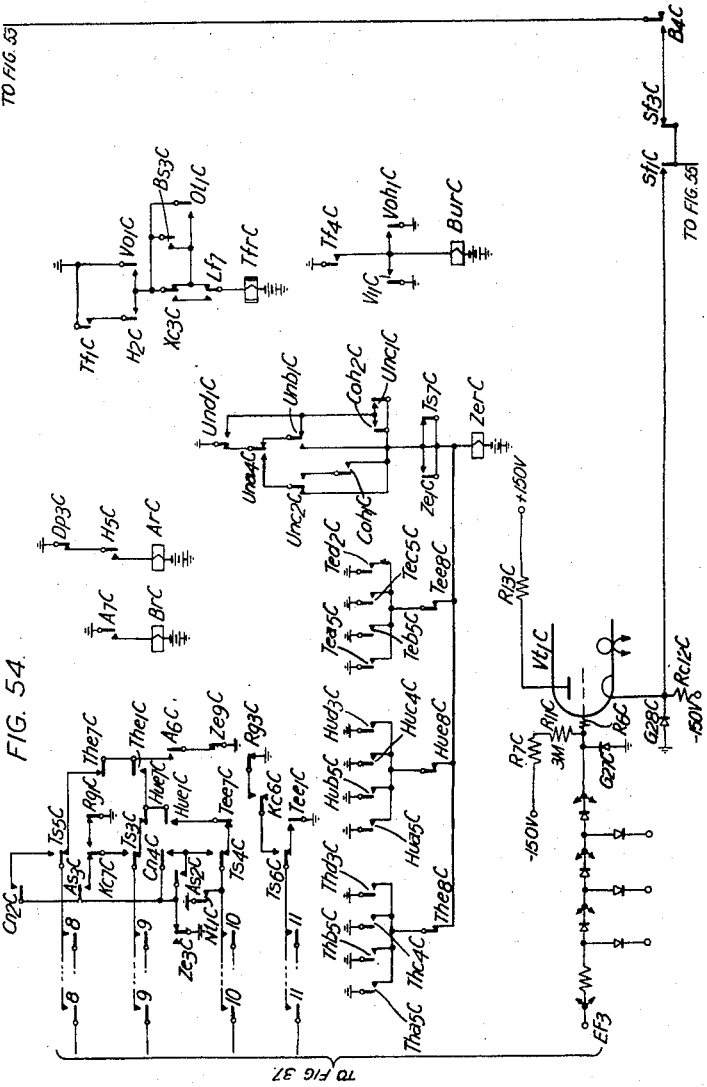

The scanning pulse is regenerated at cathode of tube VT1C (Fig. 54).

Figure 55:
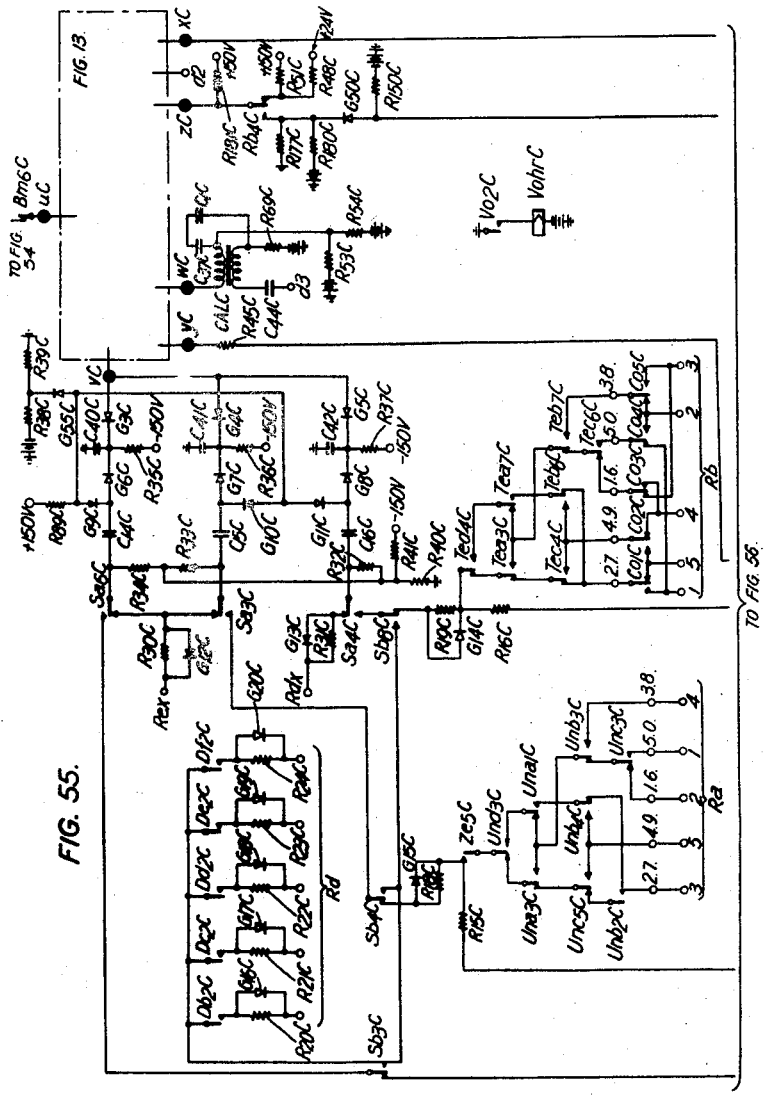

As normally relay SfrC (Fig. 57) is operated via back contacts Sa5C, Bm7C, Ze8C, Bu5C, Cwb4C, front contact Cwa1C of normally operated relay CwarC, the pulse is transmitted via front contact Sf1C (Fig. 54), back contact Bm6C (Fig. 55) to the comparator regenerator CRGC shown in block in Fig. 55 and in detail at Fig. 13.

As the explorer (Figs. 54 and 69) is controlled by P sources (positive), terminal zC, which is leading to the cathode of tube VT2 in the comparator (Fig. 13) is connected to a positive potential via back contact Rb4C.

The comparator regenerator CRGC is controlled by reference sources Rdx, Rex to characterize the scanning period allocated to the "C" governor, the combination of sources Rdx, Rex corresponding to said scanning period being given as an example in the table of Fig. 70.

The regenerated pulse is transmitted via the output terminal xC of the comparator regenerator to the recorder (Fig. 56), in which, in a known manner, are fired cold cathode tube BAVC of which the anode circuit is closed via back contacts Bm5C, Ra4C, Sa8C, winding of relay VorC to earth, one of the five cold cathode tubes VaC1–5 controlled by sources Ra1–5, one of the five cold cathode tubes VbC1–6 controlled by sources Rb1–5, one of the four cold cathode tubes VcC1–4 controlled by sources Rc1–4, the anode circuits of these tubes being closed at back contact Bm3C.

The combination of tubes fired characterizes the identity of the calling register.

None of cold cathode tube VdC1–11 controlled by sources Rd1–11 is fired, their anode circuit being opened at back contact Tee2C.

The corresponding anode relays AarC . . . , BarC . . . , CarC . . . are operated.

Relay VorC is operated thus causing the operation of relay VohrC via front contact Vo2C (Fig. 55).

Relay TfrC (Fig. 54) operates via back contacts Lf7C, Xc3C, front contact Vo1C to earth.

Relay BurC (Fig. 54) operates via front contact Voh1C and is afterwards locked via front contact Tf4C. Relay SfrC (Fig. 57) releases, its circuit being opened at front contact Bu5C.

Figure 59:
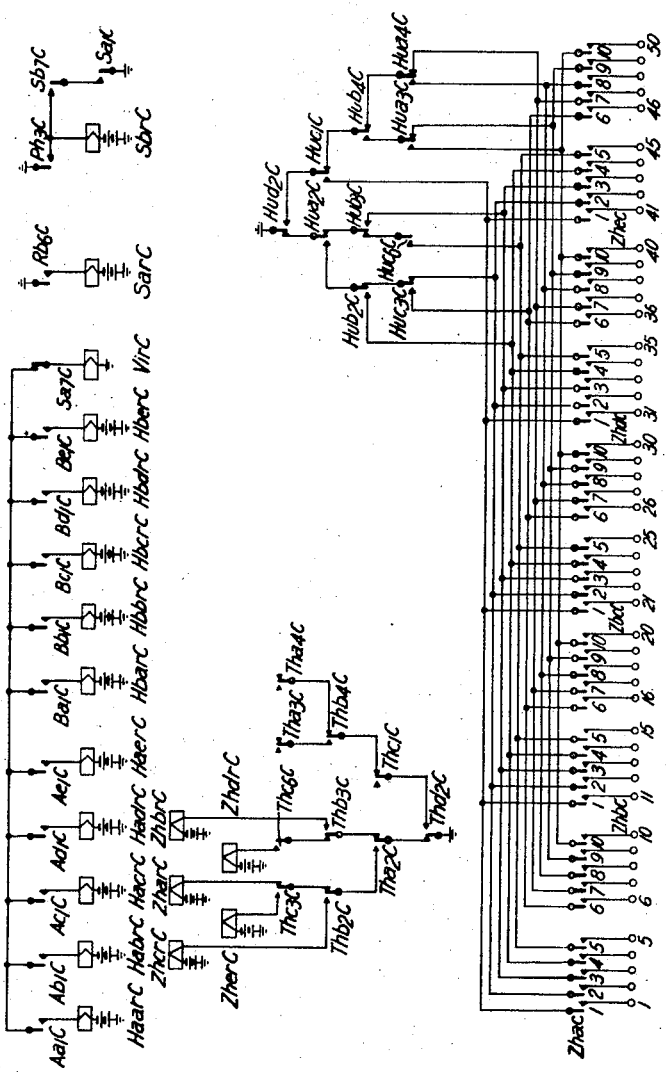

One of relays HaarC/HaerC, one of relays HbarC/HberC are operated in series with relay VirC via the front contacts of the operated anode relays and back contact Sa7C (Fig. 59). Relay AxrC (Fig. 56) operates via the front contacts of the operated anode relays, this however having no effect at that stage.

Figure 60:
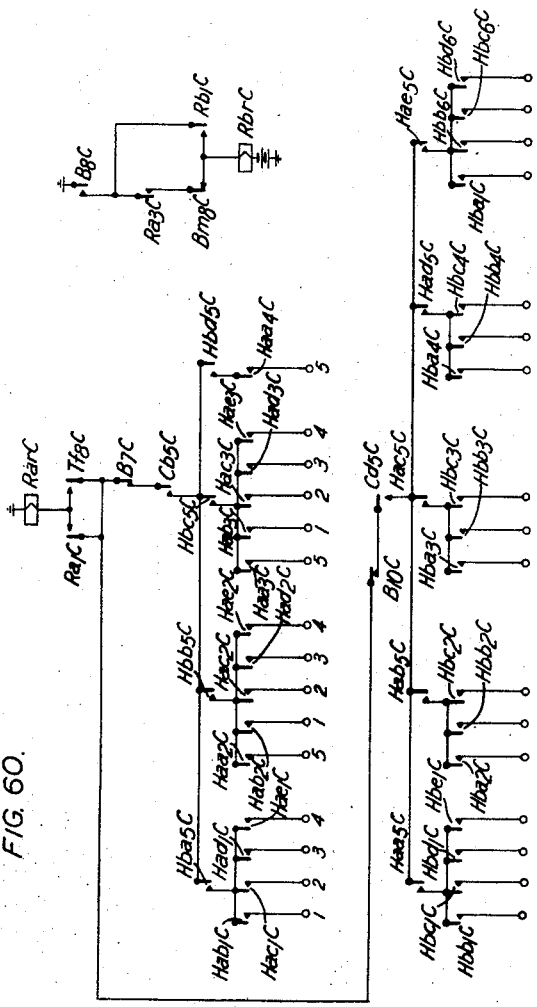

Thus, the connecting relay RRC (Fig. 53) which corresponds to the calling register of which the identity has been recorded on the cold cathode tubes is operated via the pyramid of contacts of relay HaarC . . . , HbarC . . . , in series with relay RarC (Fig. 60).

Figure 53:
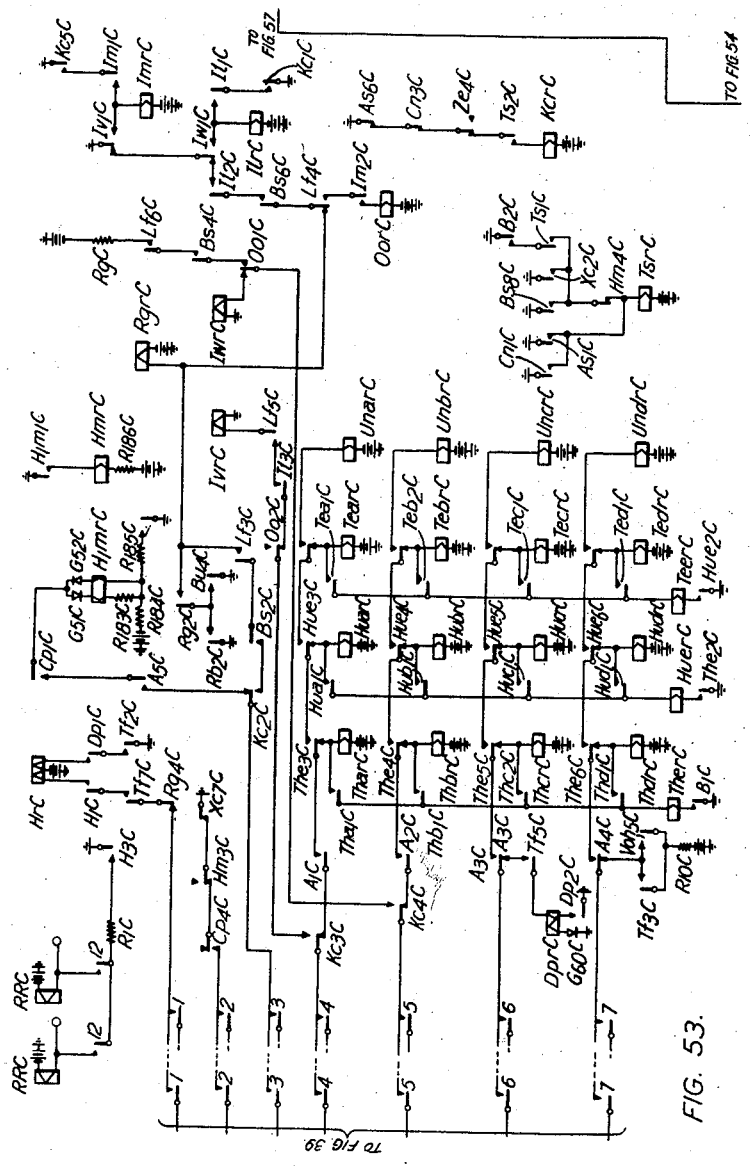

Relay DprC (Fig. 53) operates from the +24 v. potential, front contact Lg8R, back contact Bx4R, wire 6 (register, Fig. 39), contact 6, back contact A3C, front contact Tf5C, winding of said relay to earth ("C" governor, Fig. 53).

The calling potential is short circuited in the register (Fig. 37) via wire 7, back contact A4C, front contacts Tf3C, Voh5C in parallel, resistor R10C to the —48 v. battery in the "C" governor (Fig. 53).

The anode circuit being opened at front contact Ra4C, tube BAVC (Fig. 56) is extinguished, relay VorC releases, thus causing in turn the release of relay VhorC.

The operation of relay DprC causes the operation of relay HrC (Fig. 53) via front contact Dp1C and front contact Tf2C, said relay HrC is then blocked in series with relay AxrC in the register (Fig. 39) via front contacts H1C, Tf7C, back contact Rg4C, contact 1, then in the register, wire 1, front contact Li2R, front contact B1s2R and winding of relay AxrR.

Relay BxrR reoperates in the register (Fig. 32) and in the "C" governor (Fig. 53), relay DprC releases, its circuit being opened at contact Bx4R on wire 6.

Relay ArC (Fig. 54) operates via front contact H5C and back contact Dp3C, thus causing the operation of relay BrC via front contact A7C.

It is to be noted that although contact Vo1C opens the circuit of relay TfrC, the latter being slow releasing, remains operated until its circuit is closed again via front contact H2C.

Figure 56:
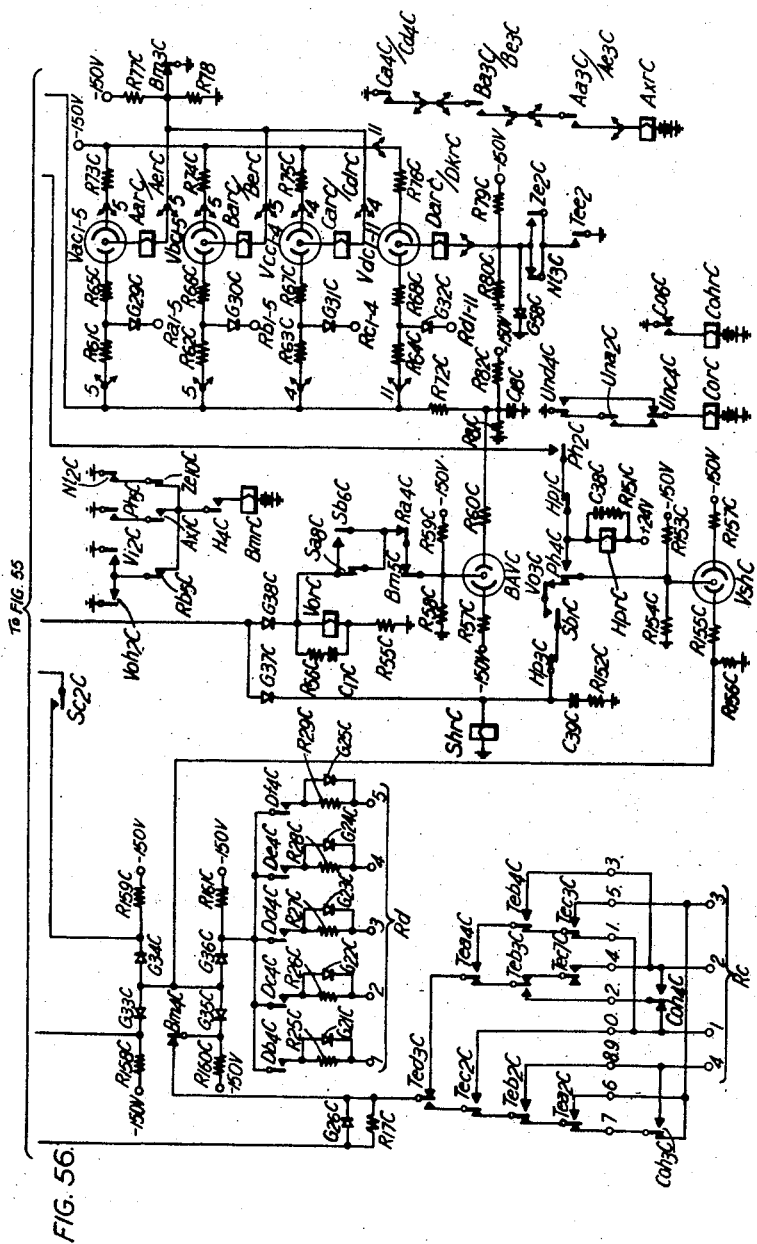

Relay BmrC operates via front contact H4C, back contact Rb5C and front contact Vi2C (Fig. 56).

The operated tubes in the recorder extinguish, their anode circuit being opened at contact Bm3C.

The corresponding anode relays release and in turn the relays HaarC . . . , and relay VirC release.

The register connecting relay is held operated via front contacts 12 and H3C (Fig. 53).

Relays RarC (Fig. 60) and AxrC (Fig. 56) release.

Relay BmrC releases, its circuit being opened at back contact Vi2C.

Relay RbrC (Fig. 60) operates via back contacts Bm8C, Ra3C, front contact B8C.

Relay SarC operates via front contact Rb6C (Fig. 59).

When relay ArC has operated, relays CfrR and CgrR operate in series in the register via wire 8, then in the "C" governor, contact 8, back contact Ts5C, back contact The7C, front contact A6C, back contact Ze9C (Fig. 54).

In the register the combination of relays ZarR/ZdrR operate according to the 1000's figure stored on relays CarR/CdrR.

At the same moment relay SxrR (register, Fig. 36) reoperates.

In the "C" governor, a combination of relays TharC/ThdrC (Fig. 53) is operated according to said 1000's digit via the corresponding wires 4, 5, 6, 7 and the corresponding front contacts A1C, A2C, A3C, A4C. One of relays ZharC/ZherC (Fig. 59) is operated according to the 1000's digit via the front contacts of the operated relays TharC/ThdrC.

Relay ZerC (Fig. 54) is operated via back contact The8C and a combination of front contacts of the relays TharC . . . .

In the register relays CfrR and CgrR release, the earth being withdrawn in the "C" governor (Fig. 54) at front contact Ze9C.

The relays ZarR/ZdrR release in the register, however in the "C" governor, the relays TharC/ThdrC are blocked via their own front contact in series with relay TherR via front contact B1C to earth, the earth from the register which was short circuiting relay TherC being withdrawn.

Relay ZerC releases, its circuit being opened at contact The8C.

In the register, relays DfrR and DgrR operate in series via wire 9, then in the "C" governor, back contact Ts3C, back contact Hue7C, front contact The1C, front contact A6C, back contact Ze9C (Fig. 54).

In the register a new combination of relays ZarR/ZdrR is operated according to the 100's digit stored on storing relays DarR/DdrR.

In the "C" governor (Fig. 53) a combination of relays HuarC/HudrC corresponding to said 100's digit is operated via the corresponding wires 4, 5, 6 and 7, corresponding front contact A1C, A2C, A3C, A4C, corresponding front contacts The3C, The4C, The5C, The6C.

Through the pyramid of contacts of relays ZharC/ZherC and relays HuarC/HudrC (Fig. 59), one connecting relay to the ESBO for final selector is operated, according to the 1000's and 100's digit. In this manner is chosen the ESBO for final selector which corresponds to the final selector group in which by means of same 1000's and 100's digits the required final selector has been connected through at the end of the group selection to the penultimate group selector.

Relay ZerC is reoperated via back contact Hue8C and the combination of contacts of relays HuarC . . . . In the register relay DfrR and DgrR release, the earth being withdrawn in the "C" governor (Fig. 54) at front contact Ze9C.

In the register the combination of relays ZarR/ZdrR releases, thus suppressing the short circuiting earth of relay HuerC (Fig. 53) which operates in the blocking circuit of relays HuarC/HudrC via front contact The2C.

Relay ZerC releases, its circuit being opened at front contact Hue8C.

In the register, relays EfrR and EgrR operate in series via wire 10, then in the "C" governor (Fig. 34), contact 10, back contact Ts4C, back contact Tee7C, front contact Hue1C, front contact The1C, front contact A6C, back contact Ze9C.

In the register a new combination of relays ZarR/ZdrR is operated according to the 10's digit, thus causing the operation of the corresponding combination of relays TearC/TedrC in the "C" governor (Fig. 53) via the corresponding wires 4, 5, 6, 7, corresponding front contacts A1C, A2C, A3C, A4C, corresponding front contacts The3C, The4C, The5C, The6C, corresponding front contacts Hue3C, Hue4C, Hue5C, Hue6C.

Relay ZerC (Fig. 54) reoperates via back contact Tee8C and the combination of front contacts of relays TearC . . . .

In the register relays EfrR and EgrR release, the earth being withdrawn again in the "C" governor at front contact Ze9C.

In the register the combination of relays ZarR . . . release thus suppressing the short circuiting earth of relay TeerC which operates in the blocking circuit of relays TearC . . . , via front contact Hue2C.

Relay ZerC releases, its circuit being opened at front contact Tee8C.

In the register relays FfrR and FgrR operate in series via wire 11, then in the "C" governor (Fig. 54), contact 11, back contact Ts6C, front contact Tee1C.

In the register a new combination of relays ZarR/ZdrR operates according to the unit's figure, thus causing the operation of the corresponding combination of relays UnarC/UndrC in the "C" governor (Fig. 53).

For the units 0–4, relay ZerC is operated directly via back contact Ts7C and the combination of contacts of unit relays UnarC . . . .

For units 5–9 relay CorC (Fig. 56) operates via the corresponding contacts of unit relays causing the operation of relay CohrC (Fig. 56).

In that case, relay ZerC operates via contact Coh1C or Coh2C and the contacts of the unit relays UnarC . . . .

Relay ZerC is blocked via its own front contact Ze1C.

Now the scanning takes place for the required outlet corresponding to the 10's and unit figure.

This is done via the ESBO for final selector. In said ESBO (Fig. 5) an explorer controlled by sources Na, Nb, Nc (negative) is connected to the grid of tube CT2I. This explorer is also controlled at terminals A and B by sources Pd1–11 to characterize the class of line, each class of line being characterized by two Pd sources as indicated in the table of Fig. 72. The scanning pulse at the output of said explorer is regenerated at the cathode of tube Ct21 and is transmitted to the "C" governor via the connecting relay contact 9 (Fig. 57), front contact B4C, back contact Sf3C (Fig. 54), back contact Bm6C to the comparator regenerator CRGC (shown in block at Fig. 55 and in detail at Fig. 13).

As in the ESBO for final selector (Fig. 5), the pulses characterizing the identity of the outlet are N pulses (negative) the terminal zC of the comparator regenerator CRGC is now connected to a negative potential via front contact Rb4C.

Said comparator regenerator is controlled by the reference sources Ra, Rb, Rc in the coincidence network (left of Figs. 55 and 56) of which the output is connected to terminal vC.

This coincidence network has for function to give a pulse upon coincidence of the three sources Ra, Rb, Rc which correspond to the 10's and unit's digits (00–99) required by the selection.

As it can be seen in the table of Fig. 73 which gives the source distribution for a hundred point network that:

Source Rc1 corresponds to the outlets 00 to 24
Source Rc2 corresponds to the outlets 25–49
Source Rc3 corresponds to the outlets 50–74
Source Rc4 corresponds to the outlets 75–100
Source Rb1 corresponds to the outlets 00–04, 25–29, 50–54, 75–79
Source Rb2 corresponds to the outlets 05–09, 30–34, 55–59, 80–84
Source Rb3 corresponds to the outlets 10–14, 35–39, 60–64, 85–89
Source Rb4 corresponds to the outlets 15–19, 40–44, 65–69, 90–94
Source Rb5 corresponds to the outlets 20–24, 45–49, 70–74, 95–99
Source Ra1 corresponds to units 0 and 5
Source Ra2 corresponds to units 1 and 6
Source Ra3 corresponds to units 2 and 7
Source Ra4 corresponds to units 3 and 8
Source Ra5 corresponds to units 4 and 9

For increasing two digit figures, from 00 to 99, corresponding to 100 outlets, a cycle of sources Ra1–5 is completed and a new Rb source starts every five figures, a cycle of sources Rb1–5 being completed and a new Rc source starting every 25 figures.

One Ra source is applied via the combination of front contacts of relays UnarC/UndrC (Fig. 55), front contact Ze5C, back contact Sb4C, front contact Sa3C. Each source terminal corresponds to two units (Ex. Ra1 to units 0 and 5).

One Rb source is applied via one of contacts Co1C to Co5C, the combination of front contacts of relays TearC/TedrC (Fig. 55), back contact Sb8C, front contact Sa4C.

The combination of front contacts of relays TearC . . . , characterize the 10's digit, whereas contacts Co1C to Co5C discriminate between unit 0 to 4 and 5 to 9 in the ten's group, since the Rb source has to be changed every five figures.

One Rc source is applied either via the combination of front contacts of relays TearR/TedrR (Fig. 56), back contact Sb3C (Fig. 55), front contact Sa6C (for tens digit other than 2 or 7), or via one of the front contacts Coh3C, Coh4C, the combination of front contacts of relays TearR . . . (Fig. 56), back contact Sb3C (Fig. 55), front contact Sa6C (for tens digit 2 or 7, since the Rc source must be changed after figures 25 and 75, i.e. for units 5–9 in said ten's group).

The regenerated pulse is transmitted via the output terminal xC to the recorder (Fig. 56) where it fires one of tubes VaC1–5, one of tubes VbC1–5, one of tubes VcC1—4, one or two of tubes VdC1—11 to characterize the outlet identity and the class of line of said outlet.

It is to be noted that the tubes VdC1–11 are now able to light, their anode circuit being closed via front contact Ze2C and front contact Tee2C.

The corresponding anode relays operate and via their contact relay AxrC (Fig. 56) reoperates.

If the outlet is free, at terminals A and B in the ESBO for final selector (Fig. 5) are applied to Pd sources 1–5 and 7–11 so that two tubes are fired amongst tubes VdC1–11. If the outlet is busy a source Pd6 is substituted to the other Pd sources so that only one tube VdC7 is operated.

Several cases may happen: either the outlet is free, or the outlet is busy and corresponds to a single line, or the outlet is busy and belongs to a non-consecutive P.B.X group, or the outlet is busy and corresponds to a small consecutive P.B.X group, or the outlet corresponds to a dead line, a change number line, or an absentee line.

In the case of a free line, as it can be seen from the table of class of line indication (Fig. 72), either a source Pd7 is associated with one of sources Pd1, Pd2, Pd3, Pd4, Pd5, Pd10; Pd11, or a source Pd8 is associated with one of sources Pd1, Pd2, Pd3, Pd4, Pd5, Pd10, Pd11.

Therefore, relay FrrC (Fig. 58) operates via the corresponding anode relay contacts of fired tubes VdC1–11.

A sequence test can now take place for testing the free condition of the ESBO for final selector.

Figure 57:
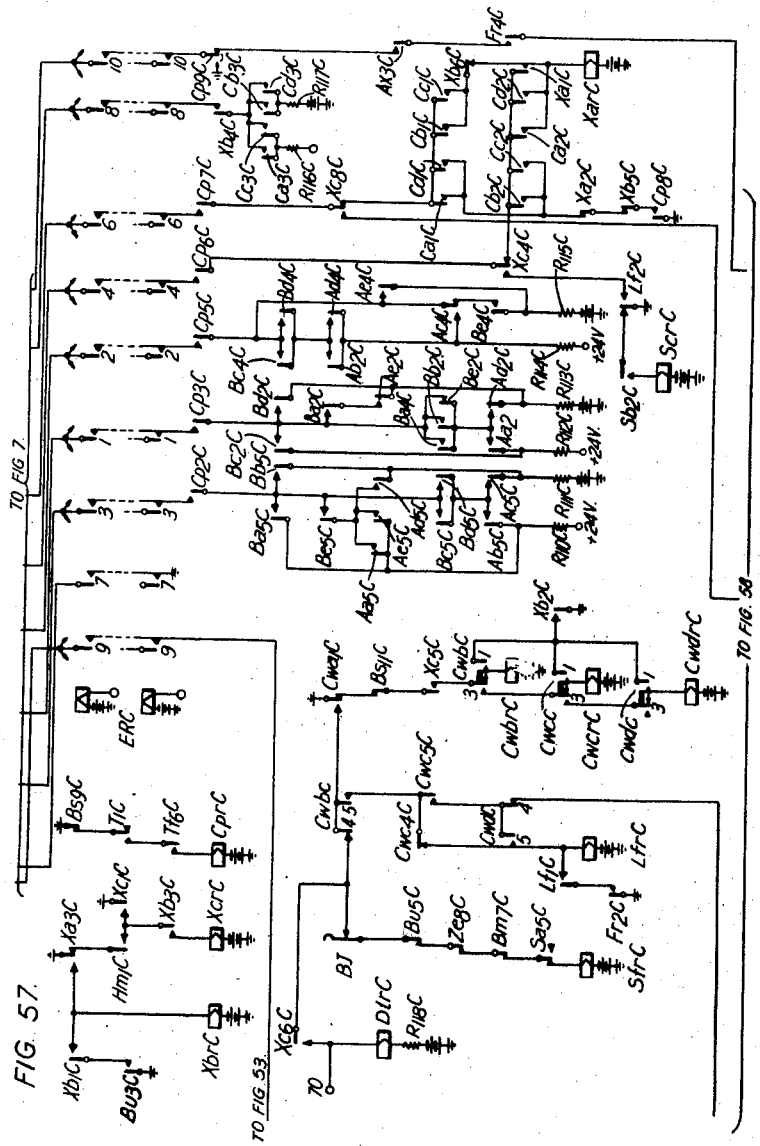

If said ESBO is free, a +24 v. potential is applied (Fig. 7) via front contacts Cf3I, back contacts Tf3I, Ot3I, MCI, Af3I to the contact 10 in the "C" governor (Fig. 57).

From there, it is transmitted via back contact Cp9C, front contact Ax3C, front contact Fr4C to the sequence test circuit STC shown in block in Fig. 58 and in detail in Fig. 19.

This sequence test circuit is controlled by reference sources Rax, Rbx to characterize the testing period allocated to said "C" governor. The distribution of said reference sources for each "C" governor is shown as an example in Fig. 71.

The operation of the sequence test circuit has already been explained in conjunction with Fig. 19 (when describing the "A" and "B" governors) and its operation in the "C" governor is identical.

When the ESBO for final selector is free, tube SVC is fired, its anode circuit being closed via front contact Fr3C (Fig. 58).

In the cathode circuit relay TrC operates. Relay CprC (Fig. 57) operates via front contact Tf6C, front contact T1C and back contact Bs9C, thus completing the connection between the "C" governor and the ESBO for final selector.

In the ESBO for final selector (Fig.7) one, two or three of relays ArI to FrI is or are operated, one relay only or none being operated in each pair ArI and BrI, CrI and DrI, ErI and FrI depending on the combination of contacts of operated anode relays, which via respective contacts 3, 1, 2, and front contacts Cp2C, Cp3C, Cp5C connect a +24 v. potential or a —48 v. battery to at least one of the three pairs of said relays.

Thus can be obtained $3^3-1=26$ combinations, each corresponding to one of the 26 vertical magnets. The 27th combination (no relay at all operated) is used for the normal rest condition.

Relay AfrI in the ESBO for final selector operates and one of the 26 vertical magnets VI (Fig. 6) operates via the pyramid of contacts of relays ArI/FrI, front contact Af3I, contact 10 (Fig. 57) in the "C" governor, front contact Cp9C, to earth. Thus four outlets are selected by the motion of the corresponding vertical bar.

In the ESBO for final selector (Fig. 7) preselecting magnet VPI or VSI operates, as already described with the other ESBO's via contact 4 or 6 (Fig. 57 in the "C" governor), front contact Cp6C, or Cp7C, back contact Xc4C or Xc8C, the one operated of anode contacts Cb2C, Cc2C, or the one operated of anode contacts Ca1C/Cd1C, back contacts Xa2C, Xb5C, front contact Cp8C to earth. Thus two outlets are selected out of the four already selected by the vertical bar, by the motion of the corresponding preselecting vertical bar.

Relay BfrI operates in parallel with preselecting magnet VPI or VSI via make contacts Af4I and vpI or vsI (Fig. 7). Relay BfrI and preselecting magnet VPI or VSI are blocked to the earth given by the front contact Bf1I, Bf2I.

Relay XarC (Fig. 57) operates either via back contact Xb6C, front contact Cc1C or Cb1C, back contact Xc8C, front contact Cp7C, contact 6 in the "A" governor, then in the ESBO for final selector (Fig. 7), back contacts Tf2I, Ot2I, front contact Bf4I, to earth or via front contact Ca2C or Cd2C, back contact Xc4C, front contact Cp6C, contact 4 in the "C" governor, then in the ESBO for final selector, back contacts Tf1I, Ot1I, front contact Bf3I to earth. Relay XarC is blocked via its own front contact Xa1C. Said relay, in case it has been initially operated via back contact Xb6C, is thus prevented from releasing when said contact opens.

Relay XbrC (Fig. 57) operates via front contact Xa3C and is locked via front contact Sb1C and front contact Bu3C.

In the ESBO for final selector (Fig. 7), relay TfrI or OtrI operates via contact 8 in the "C" governor (Fig. 57), front contact Xb4C, front contact Ca3C or Cc3C to the +24 v. potential for relay TfrI or front contact Cb3C or Cd3C to the —48 v. battery for relay OtrI. Thus, only one outlet out of the two is connected via front contact Tf2I or Ot2I.

Relay XarC is also caused to release.

When relay CprC has operated, the horizontal magnet HmS in the final selector (Fig. 61) operates via the wire c, then wire c in the third group selector (Fig. 50), then wire c in the first group selector (Fig. 31), then the wire g in the cord circuit (Fig. 30), then the wire 2 in the register (Figs. 32 and 39), then contact 2 in the "C" governor (Fig. 53), front contact Cp4C, back contact Hm3C and back contact Xc7C to earth. In the manner already explained, relay H1mrC (Fig. 53) operates in parallel with said horizontal magnet via front contact Cp1C, front contact A5C, back contact Kc2C, contact 3, then wire 3 in the register, wire f in the cord circuit (Fig. 30), wire d in the first group selector (Fig. 31), wire d in the third group selector (Fig. 50), wire d in the final selector (Fig. 61), back contact HB1S, front contact H1S of said horizontal magnet.

Relay HmrC operates in turn via front contact H1m1C.

Relay H1mrC remains blocked in series with said horizontal magnet in a manner already explained.

Relay XcrC (Fig. 57) operates via front contact Xb3C, front contact Hm1C and back contact Xa3C and locks via its own contact Xc1C.

A sequence test now takes place to test again the free condition of the final selector outlet.

If the outlet is free, a —48 v. potential is applied via a resistor of 60 K ohm to the wire c of the subscriber's line circuit.

This free potential is transmitted via front contact Ot2I or Tf2I (Fig. 7) in the ESBO for final selector to contact 6 (Fig. 57) in the "C" governor. From there, via front contacts Cp7C, Xc8C, it is transmitted to the grid of tube TtC (Fig. 58) of the double triode consisting of tubes TtC and RtC. Normally, the grid of tube TtC is at —99 v. owing to the action of the potentiometer R163C and R164C, whereas the grid of tube RtC is at —92 v. from the potentiometers R167C and R173C and back contact Cwb2C. The double triode is cathode coupled and arranged as a cathode follower. Normally, tube RtC is conducting and its anode relay CwarC operated, whereas tube TtC is cut off, the cathode potential being at about —84 v.

When the free potential of —48 v. through 60 K ohm is brought in parallel to resistor R164C, the grid of tube TtC is raised to about 75 v. thus rendering tube TtC conducting which raises the cathode potential to such a level that tube RtC is cut off, whereas relay CwarC releases. Relay CwrbC (Fig. 57) operates via front contact Xc5C, back contact Bs11C and back contact Cwa1C.

Relay CwbrC is so arranged that its contact Cwb1C is closed long before the closure of contact Cwb3C. Relay CwbrC is blocked via front contact Xb2C. At front contact Cwb2C the potential of the grid of tube RtC is raised to about —58 v. thus rendering said tube again conducting and relay CwarC reoperates.

The operating circuit of relay CwbrC is reopened before relay CwcrC is able to operate via front contact Cwb3C. Relay LfrC (Fig. 57) operates via back contact Cwc4C, front contact Cwb4C and front contact Cwa1C.

In case the subscriber's line has a line and cut-off relay an earth is connected to the grid of tube TtC if said line is free.

In that case, relay CwarC cannot release before the operation in succession of relays CwbrC, CwcrC, CwdrC, when via front contacts Cwd2C, Cwc2C, Cwb2C, the grid of tube RtC is brought to about +24 v. In that case, relay LfrC operates via front contact Cwd5C, front contact Cwc5C, front contact Cwb5C and front contact Cwa1C. In both cases, relay LfrC locks via its own front contact Lf1C and front contact Fr2C.

In the ESBO for final selector (Fig. 7), the horizontal servo magnet HBaI or HBbI operates via contact 4 ("C" governor, Fig. 57), front contact Cp6C, front contact Xc4C, front contact Lf2C to earth.

In the final selector (Fig. 61), the horizontal bar is thus moved in the corresponding direction and the final selector is connected through to the subscriber's line at contacts AS, BS, CS, DS, ES.

The free condition of the outlet is replaced by the busy condition, therefore the grid potential of tube TtC (Fig. 58) is brought to —48 v. potential and said tube becomes conductive again and relay RtC is cut off and its anode relay CwarC releases.

Relay CwcrC now operates, causing the operation of relay BsrC (Fig. 58) via back contact Sc3C, front contact Cwc5C and front contact Cwa1C (Fig. 57) when relay CwarC reoperates by front contact Cwc2C in the grid circuit of tube RtC.

When the horizontal bar has contacted, the circuit of relay H1mrC is opened is opened at horizontal bar front contact HB1S, said relay releases and in turn relay HmrC. Relay TsrC (Fig. 53) operates via back contact H$m$4C, front contact X$c$2C and locks via its own front contact T$s$1C and front contact B2C.

In the register relays F$fr$R and F$gr$R release, the earth being withdrawn at wire 11. The combination of operated relays Z$ar$R/Z$dr$R releases in the register and the corresponding combination of units relays U$na$R/U$nd$R in turn releases in the "C" governor. Relay Z$er$C releases and relay K$cr$C (Fig. 53) operates via front contact T$s$2C, back contact Z$e$4C, back contact C$n$3C, back contact A$s$6C.

In the register relays D$fr$R and D$gr$R operate via wire 9, then the "C" governor (Fig. 54), contact 9, front contact T$s$3C, front contact K$c$7C, back contact R$g$1C, whereas relays F$fr$R and F$gr$R operate via wire 11, front contact T$s$6C, front contact K$c$6C and back contact R$g$3C.

In the register relay E$sr$R operates via front contact D$f$2R and back contact F$f$5R (Fig. 36).

In the first group selector circuit (Fig. 31) relay S$ar$L operates in series with relay I$wr$C (in the "C" governor, Fig. 53) in the following circuit: earth, winding of relay I$wr$C, back contact O$o$1C, front contact K$c$4C, contact 5 in the "C" governor (Fig. 53), then in the register (Fig. 39) wire 5, front contact E$s$4R, back contact E$t$4R, front contact L$g$6R (Fig. 32), contact and wire $j$ then in the group selector wire $j$, the rectifier shunting the primary winding of relay S$br$L, winding of relay S$ar$L to battery.

In the "C" governor (Fig. 53), relay I$lr$C operates via front contact I$w$1C and back contact I$v$1C and locks via its own front contact K$c$1C. Simultaneously, relay I$wr$C releases being short circuited by the earth given in the first group selector via back contact R11L, front contact S$a$1L, back contact E$a$5L, front contact C$a$7L.

In the cord circuit (Fig. 30) relay S$rr$L operates in series with relay I$vr$C in the "C" governor (Fig. 53) in the following circuit: earth, winding of relay I$vr$C, front contact L$f$5C, front contact I13C, back contact O$o$2C, front contact K$c$3C, contact 4 in the "C" governor, then in the register, wire 4, front contact E$s$3R (Fig. 39), front contact L$g$10R, contact and wire $e$ (Fig. 32), then in the cord circuit (Fig. 30), wire e, back contact B$c$5L, front contact S$a$7L, winding of relay S$rr$L to battery.

In the "C" governor relay I$mr$C (Fig. 53) operates via front contact I$v$1C and locks via front contact I$m$1C and front contact K$c$5C.

Simultaneously relay I$vr$C releases being short circuited by an earth in the cord circuit (Fig. 30) via back contact R$c$1L, front contact S$r$2L.

In the "C" governor (Fig. 53), relay O$or$C operates via front contact I$m$2C, front contact L$f$4C, front contact B$s$6C, front contact I12C, back contact I$w$1C, back contact I$v$1C.

Relay S$br$L in the first group selector (Fig. 31) operates via its primary winding, from the earth at back contact R11L, primary winding of relay S$br$L, wire $j$ in the cord circuit, wire $j$ in the register, wire 5, front contact K$c$4C, front contact O$o$1C, front contact B$s$4C, front contact L$f$6C to the battery via resistance R9 in the "C" governor (Fig. 53). Relay S$br$L (Fig. 51) locks via its secondary winding, front contact S$b$1L, S$a$1L and back contact R11L.

From the moment the relay S$br$L is operated in the cord circuit, immediate ringing current is connected to the called line via the contact E$a$4L, winding of relay R$cr$L, front contact S$r$3L, front contact S$b$4L, wire $b$, wire $a$, front contact S$b$3L, front contact S$r$1L, earth.

At the same time, immediate ringing tone is connected to the calling line via the contacts E$a$3L, front contact S$r$4L, secondary winding of relays D$sr$L, C$sr$L, to earth.

When relay S$br$L has operated, relay R$gr$C in the "C" governor (Fig. 53) operates via front contact L$f$3C, front contact B$s$2C, front contact K$c$2C, contact 3, then in the register (Fig. 3), front contact S$x$3R, back contact E$t$3R, front contact L$h$1R, contact and wire $f$ in the cord circuit (Fig. 30), back contact B$c$6L, front contact S$a$3L and front contact S$b$7L to earth. Said relay locks via its front contact R$g$2C and front contact B$u$2C.

In the "C" (Fig. 53), front contact R$g$4C opens the circuit of operation of relays A$xr$R in the register and H$r$C in the "C" governor in series, both relays release and this initiates successively the restoring of all the initial conditions in the "C" governor.

In the register, relays D$fr$R, D$gr$R, F$fr$R, F$gr$R release, the earth on wires 9 and 11 being withdrawn at open contacts R$g$1C and R$g$3C.

In the register relay B$xr$R (Fig. 32) releases, in turn relay S$xr$R releases. Relay R$gr$R (register, Fig. 32) operates via front contact E$s$6R and back contact S$x$7R initiating the restoring of the register.

In the "C" governor, the release of relay H$r$C causes the release of relays T$fr$C, A$r$C and the register connecting relay.

Relays C$pr$C and B$ur$C are caused to release. Relay S$fr$C reoperates whereas X$br$C releases.

Operated relays C$wbr$C/C$wdr$C release. Successively, relays X$cr$C, T$sr$C, K$cr$C, I$mr$C and I$br$C release.

The release of relay A$r$C releases in turn relay B$r$C and operates relay B$mr$C. The cold cathode tubes in groups V$a$C1–5, B$b$C1–5, V$c$C1–4 in the recorder are extinguished, the corresponding anode relays release and relay A$xr$C releases.

Relays B$mr$C, R$br$C, T$har$C/T$her$C, H$uar$C/H$uer$C, T$ear$C/T$eer$C release, thus causing the release of the ESBO connecting relay, the extinguishing of the tubes in group V$d$C1–11, the release of the corresponding anode relays and the release of relays Z$har$C/Z$her$C. In turn relay F$rr$C releases and then relays L$fr$C and T$r$C whereas tube SVC extinguishes. Relays O$or$C and I$vr$C release.

In the register relay L$fr$R releases, then in turn relays L$ir$R, L$gr$R, L$br$R, L$hr$R (Fig. 32). The release of relay L$hr$R causes the release of relays E$sr$R (Fig. 36), T$yr$R, F$ir$R (Fig. 33), E$ar$L (Fig. 31) and the horizontal magnet H$m$R (Fig. 32, register). The register is disconnected from the cord circuit. In turn, relay R$fr$R operates via back contacts C$o$10R, L$b$4R, E$s$8R, T$y$3R, H$b$1R (Fig. 32), thus connecting again a free potential of +24 v. to the lead E$f$1A of the "A" governor via front contact R$f$1R. The relay B$sr$R releases and in turn relay B1$sr$R (Fig. 36).

The release of the register opens the ground potential connected to wire $i$ in the cord circuit, thus causing relay E$ar$L to operate via front contact C$a$2L, back contacts D$s$2L, M$c$4L, front contact S$a$4L.

When the relay E$ar$L operates, the immediate ringing current and line is replaced by interrupted ringing current and tone by means of front contacts E$a$3L and E$a$4L.

When the called subscriber takes off his receiver, relay R$cr$L (Fig. 31) operates and opens the holding circuit of the relay S$rr$L (Fig. 30) by removing the earth at contact R$c$1L. The release of relay S$rr$L disconnects the ringing current and tone and connects the supervisory relays C$sr$L, D$sr$L (Fig. 31) to the called line, these relays being operated via the closed loop of the called subscriber. The operation of relay D$sr$L causes the opening of the holding circuit of relays C$ar$L and E$ar$L in series, the latter being slow releasing and an impulse is sent to the metering wire DL in order to actuate the message register of the calling line; this impulse is given by means of a +24 v. potential via the contacts C$a$8L, S$a$8L, S$b$5L, E$a$1L. When the conversation is ended and both subscribers have hanged up their telephone, the relays A$sr$L, C$sr$L, D$sr$L (Fig. 31) are released. Relay S$ar$L releases, its circuit being opened at contact A$s$1L. In turn, relay S$br$L releases, its circuit being opened at contact S$a$1L.

The relay S$ar$L opens the wires $a$, $b$, and $c$ of the second line finder switch at contacts S$a$6L, S$a$5L, S$a$9L and also at contact S$a$2L the holding circuit of magnet H1L which in turn opens at contact H13L the holding circuit of the first line finder circuit. The horizontal bar held by the magnet H1L is released and the contacts of the switch are opened, the horizontal bar contacts HB11L, HB12L are also restored to their normal position.

The calling subscriber's line is freed and able to make or receive calls.

The relay SbrL (Fig. 31) opens the conductors a, b, and c of the first group selector at contacts Sb3L, Sb4L, Sb6L and also at contact Sb2L the holding circuit of the magnet HgL which in turn opens at contact Hg3L the holding circuit of the next group selectors. The horizontal bar held by the magnet HgL is released, whereby the switch contacts are opened and the contacts HBg1L, HBg2L are restored to the normal position. Via the contacts H12L and Hg2L, relay BcrL (Fig. 31) is operated whereby the cord circuit is again able to receive another call.

In the case of a busy single line, on terminal A (Fig. 5) of the ESBO for final selector is applied the source Pd6, whereas on terminal B is applied the source Pd7 or Pd8. In this condition when said class of busy outlet has been recorded on the cold cathode tubes of the "C" governor (Fig. 56), relay BsrC (Fig. 58) is closed to operate via anode relay contact Dh2C or Di2C, back contact As5C, front anode relay contact Dg1C, the two first mentioned anode relay contacts corresponding respective to Pd sources 7 and 8 whereas the last anode relay contact mentioned corresponds to Pd source 6.

Relay TsrC (Fig. 53) operates via back contact Hm4C, front contact Bs8C and back contact To3C.

This causes the release of relay FfrR and FgrR in the register, the earth being suppressed at wire 11 and front contact Ts6C. In the register relays ZarR/ZdrR release, causing the release of the corresponding unit relays UnarC/UndrC in the "C" governor (Fig. 53). In turn, relay ZerC releases and relay KcrC (Fig. 53) operates via front contact Ts2C. Relays DfrR, DgrR, FfrR, FgrR (register, Fig. 37) reoperate via wires 9 and 11, to which earth is respectively applied via front contacts Ts3C, Kc7C, and front contacts Ts6C, Kc6C. Relay EsrR (Fig. 36) operates in the register, relay SarL in the cord circuit (Fig. 31) and IwrR in the "C" governor (Fig. 53) operate in series. Relay I1rC (Fig. 53) operates whereas relay IwrC releases, as described for a free line. Relay RgrC operates in the "C" governor and causes the restoring to normal of the "C" governor and of the register as described for a free line.

In the cord circuit which is held via operated relay AsrL (Fig. 31) via contact As1L, the busy tone is given by front contact Ea2L, back contact Sb8L, back contact Sr4L, secondary winding of relays DsrL and CsrL.

In the case of a busy line of a non-consecutive P.B.X group, at terminal A of the explorer in the ESBO for final selector (Fig. 5) is applied source Pd6 (for busy indication) whereas at terminal B is applied one of sources Pd1–5.

When the class of outlet has been recorded on tubes VdC . . . in the recorder (Fig. 56) of the "C" governor, relay PhrC (Fig. 58) is caused to operate via front contact Ax5C, back contact Sb9C, one of anode contacts Db3C to Df3C (corresponding to sources Pd1–5), back contact As5C and front anode relay contact Dg1C corresponding to source Pd6. Via winding of relay HprC, back contact Hp1C, front contact Ph2C (Fig. 56), a potential of +24 v. is applied to the contact Rb4C (Fig. 55) to block the comparator regenerator CRGC.

This is done to prevent the hunting for a free outlet in said P.B.X group from starting at any random moment, but only from the time unit corresponding to the pilot line of the P.B.X group.

Relay SbrC (Fig. 59) operates via front contact Ph3C and locks via its own contact Sb7C and front contact Sa1C. Relay ScrC (Fig. 57) operates via front contact Sb2C and back contact Lf2C. The reference sources Rd1–5 corresponding to the P.B.X lines are now applied to terminal vC of the comparator regenerator via the corresponding anode relay contacts Db2C—Df2C and front contacts Sb3C, Sb4C, Sb8C, Sa4C.

Via front contact Sc2C (Fig. 56) the Rb sources (Fig. 55) which were previously connected to the comparator regenerator CRGC are now connected to the control electrode of the cold cathode tube VshC (Fig. 56), said tube is also controlled by sources Ra (Fig. 55) via front contact Ze5C, by source Rc via back contact Bm4C (Fig. 56), by sources Rd1–5 via one of anode relay contacts Db4C/Df4C.

When relay PhrC has operated, relay BmrC also operates, thus extinguishing the tubes in groups VaC . . ., VbC . . ., VdC . . . and releasing the corresponding anode relays.

This releases relay AxrC and in turn relay BmrC.

When there is a coincidence of sources Ra, Rb, Rc, Rd, which correspond to the pilot line of the P.B.X group of which the number which has been dialled has been found busy, tube VshC (Fig. 56) is fired, its anode circuit being closed via front contact Ph4C, to +24 v. via the winding of relay HprC which operates. Relay PhrC (Fig. 58) which was blocked via front contact Ph1C, back contact Hp4C and front contact B6C now release at open contact Hp4C.

The comparator regenerator (Fig. 55) is now unblocked at open contact Ph2C and scanning can take place again for free outlets in the P.B.X group starting from the next line after the pilot line.

In the recorder, if a free outlet is found in the P.B.X group, tube BAVC (Fig. 56), one of each group of tubes VaC1–5, VbC1–5, VcC1–5 is operated, one of tubes Vd1–5 and a second tube Vd7 are fired and the corresponding anode relays are operated. Relay VorC operates to prevent relay ShrC from preventing at the beginning of the following cycle. In turn, VhorC operates. Relay AxrC operates and relay FrC operates. The operation is then carried out as for a free single line.

If there is no free outlet in a P.B.X group, none of tubes VaC . . ., VbC . . ., VcC . . . is fired in the cycle and relay VorC does not operate. Therefore, at the beginning of the following cycle, tube VshC is fired again, the anode circuit being closed this time via back contact Ph4C, back contact Vo3C, front contact Sb1C, back contact H3pC, winding of relay ShrC which operates.

Relay BsrC (Fig. 58) operates via front contact Sh1C and back contact Vo4C (Fig. 58), thus giving the busy indication and the operation is carried out as for a busy single line.

In the case of a busy line in a small consecutive P.B.X group, the busy indication source Pd6 is applied to terminal A in the scanner of the ESBO for final selector whereas source Pd11 is applied to terminal B. In such consecutive P.B.X group, the register must be given an indication such that the next line of the group is selected.

In the "C" governor (Fig. 58) relay N1rC operates via back contact Bs12C, back contact Fr5C, front anode relay contact Da2C which corresponds to source Pd11, back contact As5C and front anode relay contact Dg1C (which corresponds to the source Pd6 for busy indication) and locks via front contact N14C and front contact Ax2C.

In the register relays EfrR and EgrR operate via wire 10, an earth being given via front contact N11C (Fig. 54). Via front contacts Ff8R, Ef8R, B1s3R, Ei3R an earth is given to the counting relays IarR to IcrR, JarR to JfrR (Fig. 32). In the register relay LmrR (Fig. 33) operates via back contact Co4R, front contact Ei3R and the same earth. The combination of relays ZarR/ZdrR which corresponds ot the unit digit releases at open contact Lm3R in the register, thus causing the release of the corresponding relays UnarC/UndrC in the "C" governor. In turn, relay ZerC (Fig. 54) releases. This opens the anode circuits of tubes VdC1–11 at contact Ze2C since relay N1rC is operated and contact N13C open. The previously lit tubes V*d*C . . . are extinguished. The corresponding anode relays release.

Relay B*mr*C (Fig. 56) operates via front contact H4C, back contact Z*e*10C and front contact N12C.

This extinguishes the tubes in groups V*a*C . . ., V*b*C . . ., V*c*C . . . which were lit in the recorder. Relay A*xr*C releases, relay N1*r*C releases, its blocking circuit being opened at front contact A*x*2C and relay B*mr*C releases again. In the register relays E*fr*R and E*gr*R release, the earth at contact N11C being suppressed. This suppresses the earth at the counting relays.

This means that the counting relays have received a short duration earth, i.e. an impulse which steps these relays to a new combination which corresponds to the following unit digit.

Relay L*mr*R releases and contact L*m*3R being closed again, a new combination of relays Z*a*R/Z*dr*R corresponding to the following unit is now operated and the corresponding combination of relays U*nar*C/U*ndr*C in the register is operated. Relay Z*er*C reoperates via these relay contacts or via the contacts of relays C*oh*1R or C*oh*2R for the units 5–9. The selection is then carried out as for a free line of the preceding number.

In the case of dead lines, dead line indication can be given if:

(*a*) Source P*d*6 is connected to terminal A in the ESBO scanner and source P*d*10 to terminal B;

(*b*) For non existing 100's in which case relay D1*r*C is operated from the non existing 100's combination via terminal 49 or 50 (Fig. 59) and terminal 70 (Fig. 57);

(*c*) When the called subscriber's plug is withdrawn in which case relay D1*r*C can operate via front contact X*c*6C and front contact C*wa*1C before relay C*war*C falls back (which is not possible for a free line, for which relay C*war*C falls back very quickly).

In all three cases of dead lines, relays A*sr*C and C*nr*C (Fig. 58) are operated, relay T*sr*C operates in turn via front contacts A*s*1C, C*n*1C in parallel. The earth on wire 11 to the register is withdrawn and in said register relays F*fr*R and F*gr*R release. Relays Z*ar*R/Z*dr*R release in the register and the unit relays U*nar*C/U*ndr*C release in the "C" governor. Relay Z*er*C in turn releases, relay K*cr*C operates. In the register relays C*fr*R and C*gr*R, D*fr*R and D*gr*R, E*fr*R and E*gr*R operate respectively via wires 8, 9 and 10 to a common earth at back contact Z*e*3C respectively via front contacts C*n*2C, A*s*3C and A*s*2C in parallel with C*n*4C.

In the register relays A*sr*R and C*nr*R (Fig. 36) operate respectively via front contacts D*f*5R and E*f*5R, C*f*5R and E*f*2R and they lock via front contact L*h*9R. Relay S*nr*R (Fig. 34) operates via front contacts A*s*2R, C*n*2R in parallel. Relay B1*s*R in the register (Fig. 36) releases, thus causing the release of relay A*xr*R (Fig. 39) at open contact B1*s*2R. Therefore, relay H*r*C which is connected in series, in turn releases in the "C" governor which is restored to normal as already described. In the register, circuits are prepared for a seizure of a "B" governor towards a special trunk dealing specially with dead line calls.

The same operation takes place when relay C*nr*C operates alone (change numbers) with corresponding P*d* sources 10 and 11. In that case in the register only relays C*nr*R, C*fr*R, C*gr*R, E*fr*R, E*gr*R, C*nr*R, are operated.

The same also happens if relay A*sr*C operates alone in the "C" governor (absentee condition) which corresponds to P*d* sources 7 and 9, or 8 and 9, or 11 and 9. In that case in the register only relays A*sr*R, D*fr*R, D*gr*R, E*fr*R, E*gr*R are operated.

The preferred embodiment in which three different types of "governors" have been described respectively for line finder stages, group selection stages, and the final selector stage has been given by way of example.

Other embodiments can be used in which for instance, only one type of "governors" replaces the "B" and "C" governor types, the same governor serving for the group selections and the final selection, or in which one type of "governors" replaces the "A" and "C" governor types, the same governor serving for the line finding and the final selection stages (solution convenient since some of the ESBO circuits are already common for first line finders and final selectors), or else in which one type of "governors" replaces the "A," "B" and "C" governor types, the same governor serving for the line finding, group selection and final selection stages.

It can be seen that a further advantage resulting from the invention is an economy of connecting equipment. Let us assume, for instance, that 100 registers are provided in common for 50 ESBO circuits.

If each of the 100 registers has to be connected by relays to each of the 50 ESBO's, 50×100=5000 relays are required. If according to the invention, 10 intermediate "governor" circuits are provided in common for said 100 registers and said 50 ESBO's circuits, 100×10 =1000 relays are required for connections between each of said registers and each of said "governors," whereas 10×50=500 relays are required for connections between each of said "governors" and each of said ESBO's, a total number of only 1500 relays being therefore required.

If it is found suitable, "governor" circuits can also be used for the only purpose of economizing connecting equipment, their circuit being simplified for instance without recording means, said recording means being kept in the register circuits according to the known practice.

While the principles of the invention have been described above in connection with specific apparatus, it is to be clearly understood that this description is made only by way of example and not as a limitation on the scope of the invention.

We claim:

1. Automatic telecommunication system comprising subscriber lines, call detector circuits responsive to calls initiated by said lines, stages of line finder switch circuits and selector switch circuits, the line finder switch circuits at each stage being divided into groups and the selector switch circuits at each stage being divided into groups, each group of line finder circuits and each group of selector switch circuits at any one stage comprising a cross-bar multi-switch having outlets leading towards a group of line finder or selector switch circuits at the following stage, a common control circuit for each multi-switch for controlling the establishment of all connections through the respective group of line finders or selectors, means in each common control circuit responsive to the operation of a call detector for hunting for free ones of said outlets, a plurality of register-controllers for storing a code identifying a called subscriber's number, a plurality of further common circuits, some of which are provided in common for all of said common control circuits of one or more line finder stages and others of which are provided in common for all of said common control circuits of said selector stages, first switching means for connecting each common control circuit with any one of the corresponding further common circuits, second switching means for connecting each register-controller to any one of said further common circuits, and means controlled by both said switching means for building up a part of a conversational connection with any one of said line finder or selector stages by operatively interconnecting the relative common control circuit, one of the corresponding further common circuits, and one of the register-controllers.

2. Automatic telecommunication system, as claimed in claim 1, further comprising means for seizing one of said further common circuits by a call detector circuit or by a register controller, and means for storing in said seized further common circuit a code or part thereof characterizing the calling subscriber's line or a code or part thereof characterizing the called subscriber's line and thereafter successively connecting said seized further common circuit to said call detector or said register controller and to the common control circuits at successive line finder or selector stages.

3. Automatic telecommunication system, as claimed in claim 2, further comprising means in each of said further common circuits for detecting and means for recording the identity of the call detector circuit by which said further common circuit by which said further common circuit has been seized.

4. Automatic telecommunication system, as claimed in claim 2, further comprising means in each of said further common circuits for indicating, upon being seized, its engaged condition to other register controller type or call detector circuits.

5. Automatic telecommunication system, as claimed in claim 2, further comprising time segregating means in each of said further common circuits for preventing the simultaneous engagement of two or more free further common circuits of the third type by the same register controllers or call detector circuit and for preventing the simultaneous engagement of the same further common circuit by two or more register controllers or call detector circuits.

6. Automatic telecommunication system, as claimed in claim 2, further comprising means in each of said further common circuits for connecting itself partially to one or more common control circuits, means in each further common circuit for detecting and recording via said one or more common control circuits the identity and the class of free outlets of the corresponding selectors or line finders, said partial connection permitting said detection and recording to be performed by the plurality of further common circuits associated in common with said one or more common control circuits of the first type, irrespective of the free or busy condition of said one or more common circuit(s) control circuits.

7. Automatic telecommunication system, as claimed in claim 6 further comprising means in said further common circuit for testing, upon said recording of a free outlet being completed, the free condition of the common control circuit via which said outlet identity and class indication has been detected and recorded.

8. Automatic telecommunication system, as claimed in claim 1, in which the groups of line finders at each stage each serve a corresponding group of subscriber's lines, each line finder group being further subdivided in subgroups and further comprising a plurality of cord circuits divided into groups and subgroups and a plurality of cord chooser circuits divided into groups and subgroups, and in which the register controllers are also subdivided in corresponding subgroups, each subgroup of register controllers having access to the line finder of the corresponding subgroup only via cord chooser circuits of the same subgroup, each cord chooser subgroup being connected with one or more common control registers, said common control circuits being connected with line finder stages and cord chooser circuits and also associated with a plurality of further common circuits associated with finding stages provided in common control for said common circuits, said call detectors, and said register controllers, means responsive to the seizure of a call detector by a calling line for seizing a free further common circuit associated with finding stages and for storing therein a code characterizing said calling line's number or part thereof, means responsive to said storage in said common circuit for seizing by said further common circuit the common control circuit associated with the line finder group having direct access to the calling line, for seizing a free register controller having free access to the line finder groups at successive stages serving said calling line and belonging to the same subgroup as the free line finders at successive stages, for seizing the control circuit asociated with the cord chooser circuits of said subgroup, and for seizing the common control circuit associated with the line finder subgroup to which said cord choosers have direct access, and means responsive to said storage for successively setting connections between said register controller type and said calling line via the cord chooser circuit and the line finders at successive stages which belong to the subgroup of said register controller.

9. Automatic telecommunication system, as claimed in claim 8, further comprising means in each of said further common circuits associated with finding stages for detecting and means for recording the identity of the call detector by which said further common circuit has been seized.

10. Automatic telecommunication system, as claimed in claim 8, further comprising means in each of said further common circuits associated with finding stages for indicating upon being seized, its engaged condition to other call detectors.

11. Automatic telecommunication system, as claimed in claim 8, further comprising means in each of said further common circuits associated with finding stages for preventing the simultaneous engagement of two or more free further common circuits associated with finding stages by the same call detector and for preventing the simultaneous engagement of the same further common circuit by two or more call detectors.

12. Automatic telecommunication system, as claimed in claim 11, further comprising means in each of said further common circuits associated with finding stages for connecting itself partially to the common control circuit associated with the line finder group having direct access to the calling line, means for detecting and recording, via said common control circuit, the identity and class indication of said calling line, said partial connection permitting said detection and recording to be performed by a plurality of said further common circuits associated with line finding stages and associated in common with said common control circuit associated with said line finder group, irrespective of the free or busy condition of said common control circuit.

13. Automatic telecommunication system, as claimed in claim 1, in which the common control circuits of one or more group selection stages are connected with a plurality of further common circuits provided in common for said one or more group selection stages, each of said further common circuits being connected with a plurality of register controllers, further comprising means responsive to the seizure of a register controller and the storage therein of that part of the code characterizing the called number which concerns the group selection stages for causing the seizure of a corresponding free further common circuit associated with group selection stages, and the successive storage therein of those parts of said code concerning the group selections at successive stages, means responsive to said storage for causing the successive connection of said further common circuits to the control common circuits associated with said successive group selection stages and the successive setting, via said common control circuits of connections between successive group selector stages and between the group selector in the penultimate stage and an outlet towards a final selector.

14. Automatic telecommunication system, as claimed in claim 13, further comprising means in each of said further common circuits associated with group selection stages for detecting and means for recording the identity of a calling register controller.

15. Automatic telecommunication system, as claimed in claim 13, further comprising means in each of said further common circuits associated with group selection stages for permitting the seizure of only one calling register controller by said further common circuit associated with group selection stages and, reversely, for permitting the seizure of only one further register controller of the third type for group selection stages by said calling common circuit.

16. Automatic telecommunication system, as claimed in claim 15, further comprising means in said further common circuit associated with group selection stages for receiving and storing the successive parts of codes necessary to control the group selections at successive stages.

17. Automatic telecommunication system, as claimed in claim 1, in which there are penultimate selector stages and final selector stages and the common control circuits associated with the final selector stage are connected with a plurality of further common circuits provided in common control for said common circuits associated with said final selector stage and for said register controllers, further comprising means for causing the setting of a register controller to the calling condition at the end of the group selections via a common further circuit associated with group selection stages to effect the seizure of a free further common circuit associated with final selector stages and successively to store therein those parts of the code characterizing the called number which concern the group selection stages and the final selection stage, means responsive to the storage therein of the parts of the code concerning the group selection stages for causing the seizure by said further common circuit of the common control circuit associated with the selected final selector group, one of which final selectors has been connected to the penultimate selector as a result of the preceding group selections, and means responsive to the storage therein of the parts of the code concerning the final selection for causing the control by said further common circuit associated with the final selector stage and, via said common control circuit associated with said final selector group, of the connection between said final selector and the called line for causing the control, via said register controller of the connection between the line finder and the 1st group selector in the cord circuit connected to said register controller, and thereafter the release of said further common circuit associated with the final selector stages and said register controller circuit.

18. Automatic telecommunication system, as claimed in claim 17, further comprising means in each of said further common circuits associated with the final selector stages for detecting and recording the identity of a calling register controller and thereupon for connecting itself to said calling register controller.

19. Automatic telecommunication system, as claimed in claim 18, further comprising means in each of said further common circuits associated with the final selector stages for preventing the seizure of two or more register controllers by the same further common circuit, and means for preventing the engagement of two or more of said further common circuits by the same register controller.

20. Automatic telecommunication system, as claimed in claim 8, wherein each of said further common circuits associated with finding stages comprises first means for signalling the free or busy condition of said further common circuit to all call detectors, second means for receiving the seizure pulse emitted by one of said call detectors in response to said free condition signal, and third means for removing immediately said free condition of said further common circuit upon reception of said seizure pulse.

21. Automatic telecommuncniation system, as claimed in claim 1, wherein the common control circuits connected with group selector and final selector stages are connected with a plurality of further common circuits provided in common for said common circuits, each of said further common circuits serving for the control of group selections and the control of the final selection concerning a same call via the corresponding common control circuits.

22. Automatic telecommunication system, as claimed in claim 1, wherein the common control circuits connected with line finder and final selector stages are connected with a plurality of further common circuits provided in common for said common control circuits connected with line finder and final selector stages, each of said further common circuits serving for the line finding control and the control of the final selection concerning a same call via the corresponding common control circuits.

23. Automatic telecommunication system, as claimed in claim 1, wherein the common control circuits connected with line finder and selector stages are connected with a plurality of further common circuits provided in common for said common control circuits connected with line finder and selector stages, each of said further common circuits serving for the line finding control, the control of group selections, and the control of the final selection concerning a same call via the corresponding common control circuits.

References Cited in the file of this patent

UNITED STATES PATENTS

| | | |
|---|---|---|
| 2,619,548 | Lesti | Nov. 25, 1952 |
| 2,660,620 | Gohorel | Nov. 24, 1953 |
| 2,664,467 | Den Hertog | Dec. 29, 1953 |
| 2,668,876 | Gohorel | Feb. 9, 1954 |
| 2,754,367 | Levy | July 10, 1956 |
| 2,774,071 | Trousdale | Dec. 11, 1956 |
| 2,778,878 | Malthaner et al. | Jan. 22, 1957 |